(12) United States Patent
Meli

(10) Patent No.: US 12,726,355 B1
(45) Date of Patent: Sep. 1, 2026

(54) BEHAVIORAL QUALIFICATION VECTORS AS A CROSS-DOMAIN GOVERNANCE PROTOCOL

(71) Applicant: Peter Meli, Boca Raton, FL (US)

(72) Inventor: Peter Meli, Boca Raton, FL (US)

( * ) Notice: Subject to any disclaimer, the term of this patent is extended or adjusted under 35 U.S.C. 154(b) by 0 days.

(21) Appl. No.: 19/544,706

(22) Filed: Feb. 19, 2026

Related U.S. Application Data

(60) Provisional application No. 63/792,381, filed on Apr. 22, 2025.

(51) Int. Cl.
*H04L 9/32* (2006.01)

(52) U.S. Cl.
CPC .................................. *H04L 9/3213* (2013.01)

(58) Field of Classification Search
CPC .................................................... H04L 9/3213
See application file for complete search history.

(56) References Cited

U.S. PATENT DOCUMENTS

| | | | | |
|---|---|---|---|---|
| 7,961,715 | B1 * | 6/2011 | Dhesikan | H04L 47/724 370/395.2 |
| 11,328,065 | B1 | 5/2022 | Wall et al. | |
| 2005/0091492 | A1 * | 4/2005 | Benson | G06Q 20/04 713/170 |
| 2024/0086554 | A1 | 3/2024 | Daughety et al. | |

FOREIGN PATENT DOCUMENTS

| | | | |
|---|---|---|---|
| EP | 1280317 | B1 | 1/2003 |
| WO | WO2022013517 | A1 | 1/2022 |

OTHER PUBLICATIONS

National Institute of Standards and Technology (NIST), NIST SP 800-207—Zero Trust Architecture; Special Publication 800-207, Aug. 2020; paragraph 2.1.

National Institute of Standards and Technology (NIST), NIST SP ; 800-204B—Service Mesh Reference Monitor; Special Publication 800-204B, Aug. 2021; paragraph 4.

Laurie, B., Langley, A., Kasper, E.; RFC 6962—Certificate Transparency; Internet Engineering Task Force (IETF), Request for Comments 6962, Jun. 2013; Log, paragraphs 3, 3.5.

* cited by examiner

*Primary Examiner* — Jonathan A Bui
(74) *Attorney, Agent, or Firm* — LAW OFFICES OF ALOZIE N. ETUFUGH, PLLC; Alozie Etufugh, Esq.

(57) ABSTRACT

A protocol-layer governance system is disclosed for controlling execution of autonomous computational processes at the session layer. The system establishes a non-bypassable enforcement sequence in which behavioral qualification, authorization token issuance, directive propagation, and execution reconciliation occur in a fixed, canonical order. A protocol enforcement boundary ensures that execution requests cannot proceed unless derived from a verified protocol session state, and authorization is bound to behavioral qualification rather than identity or policy inference. The system generates immutable execution lineage records and prevents replay, substitution, privilege escalation, reordering, or parallel execution outside the defined sequence. The disclosed architecture enables deterministic execution governance across distributed compute environments, autonomous agent ecosystems, multi-tenant infrastructures, and AI-driven systems by ensuring that execution authority and execution governance remain structurally inseparable at the protocol layer.

51 Claims, 6 Drawing Sheets

CANONICAL ENFORCEMENT CHAIN AT OSI LAYER 5

CANONICAL ENFORCEMENT CHAIN AT OSI LAYER 5

QUALIFICATION STATE ENGINE: VECTOR DECOMPOSITION & FRESHNESS BINDING

AUTHORIZATION ENGINE: BOUNDARY RESOLUTION & TIERED AUTHORIZATION
Predetermined Protocol Boundary Conditions with Pass /Fail /Degrade Execution Modes

TEMPORAL FRESHNESS ENFORCEMENT & REPLAY REJECTION SCENARIOS

Four Temporal Validation Paths: Valid Freshness • Replay Detection • Temporal Expiration • State Persistence

BEHAVIORAL QUALIFICATION VECTORS AS A CROSS-DOMAIN GOVERNANCE PROTOCOL

CROSS-REFERENCE TO RELATED APPLICATIONS

This application claims priority to and the benefit of U.S. Provisional Patent Application No. 63/792,381, filed Apr. 22, 2025, entitled "User-Driven Advertising & Sponsorship System," and U.S. Provisional Patent Application No. 63/818,574, filed Jun. 5, 2025, entitled "System and Method for Closed-Loop Behavioral Qualification and Activation Verification." The entire disclosures of both provisional applications are hereby incorporated by reference in their entirety.

This application further relates to the inventor's pending filings describing implementations of behavioral qualification, machine-level attestation, distributed execution verification, and closed-loop response handling. The present application generalizes these concepts into a protocol-layer computational governance substrate applicable to autonomous agents, synthetic computational entities, distributed machine workflows, and artificial intelligence to artificial intelligence (AI-to-AI) execution environments independent of specific industries or use cases.

FIELD OF THE INVENTION

The present invention relates to computational governance systems. More specifically, the invention concerns a protocol-layer execution substrate configured to govern interactions among autonomous computational agents, distributed machine intelligence systems, synthetic entities, and machine-to-machine execution workflows. The system provides canonical protocol enforcement at Open Systems Interconnection (OSI) Layer 5, enabling non-bypassable authorization logic, non-reorderable execution sequencing, immutable state commitment, deterministic routing, and continuous closed-loop reconciliation of execution outcomes across heterogeneous computational environments.

BACKGROUND OF THE INVENTION

Autonomous computational agents, artificial intelligence models, synthetic actors, and distributed machine-execution systems now operate at increasing scale across networks, multi-cloud infrastructures, and organizational boundaries. These entities initiate transactions, execute instructions, modify computational state, and interact with other systems without direct human oversight or intervention.

Current security and execution models—including identity frameworks, PKI infrastructures, role-based access control, consensus mechanisms, distributed ledgers, and remote attestation protocols—were designed to validate identity, integrity, or provenance. While these mechanisms verify authenticity, they do not determine whether execution should occur in a specific order, under specific contextual preconditions, or only after verified eligibility.

Existing execution environments permit agents to act once access credentials, cryptographic signatures, or tokens are verified. This creates a permissive execution model where possession of authorization artifacts is incorrectly treated as equivalent to execution eligibility, sequencing correctness, or contextual compliance.

With autonomous systems interacting directly with one another, the absence of an execution governance framework leads to bypass, drift, inconsistent execution semantics, unauthorized state mutation, and unverifiable lineage of machine-generated actions.

More specifically, there is presently no canonical enforcement mechanism capable of ensuring that computational actions:

(a) occur only in approved sequence,
(b) cannot execute prematurely or out-of-order,
(c) cannot bypass protocol policy,
(d) are cryptographically bound to prior execution context, and
(e) are subject to immutable reconciliation and revocation logic.

As distributed execution ecosystems evolve toward autonomous machine economies and inter-agent execution markets, the absence of protocol-level execution control represents a systemic interoperability and safety gap.

Therefore, there exists a need for a non-bypassable execution governance system that evaluates eligibility, enforces ordering, constrains routing, and binds execution outcomes to immutable commitment before finalization—not after the fact.

SUMMARY OF THE INVENTION

Aspects of embodiments of the present invention provide a protocol-layer governance system that enforces canonical execution sequencing among autonomous computational agents, distributed machine systems, and other distributed computational actors. Execution is governed through a non-bypassable canonical enforcement chain comprising ingress validation, eligibility assessment, authorization gating, deterministic routing, immutable commitment, and closed-loop reconciliation. The canonical enforcement chain operates through a sequence of functional stages-qualification, authorization, routing, and reconciliation—each implemented as a dedicated engine within the Protocol Enforcement Domain. Throughout this specification and claims, the terms "stage" and "engine" are used interchangeably to refer to these functional components: "qualification stage" is synonymous with "Qualification State Engine"; "authorization stage" is synonymous with "Authorization Engine"; "routing stage" is synonymous with "Routing Engine"; and "reconciliation stage" is synonymous with "Reconciliation Engine." This terminological equivalence applies uniformly across all embodiments, claims, and, to some extent, related patent documents.

All computational actions initiated by autonomous agents must transit the Protocol Enforcement Domain (PED) before execution may proceed. No execution pathway exists outside this governance substrate.

Unlike existing authentication or attestation mechanisms, aspects of embodiments of the present invention prevent execution unless all protocol preconditions are satisfied. Valid identity or credentials alone are insufficient. Execution rights are contingent upon protocol compliance, sequencing correctness, and contextual eligibility.

Aspects of embodiments of the present invention support operation across heterogeneous infrastructures including distributed systems, cloud compute, autonomous agent frameworks, large language model (LLM) orchestration networks, Internet-Of-Things (IoT) meshes, blockchain-integrated execution fabrics, and federated compute ecosystems.

The result is a deterministic execution framework suitable for autonomous machine governance, computational trust enforcement, and agent-to-agent coordinated operations, where execution is verifiable, constrained, accountable, and cryptographically anchored.

The protocol-layer governance substrate disclosed herein reduces computational state explosion by enforcing execution eligibility, sequencing, and routing at the session layer (OSI Layer 5) prior to application-layer processing. By deriving a normalized protocol state from deterministic qualification vectors and binding that state to a protocol session record, the system collapses a potentially unbounded set of application-specific execution states into a single canonical session-governed state. This prevents proliferation of divergent execution branches, speculative state transitions, and redundant authorization paths that otherwise arise when governance logic is distributed across application logic, transport mechanisms, or independently executing agents.

Deterministic sequencing enforced by the canonical enforcement chain improves computational reliability by guaranteeing that qualification, authorization, routing, and reconciliation operations occur in a fixed, non-reorderable order for every governed execution. Unlike systems that permit conditional branching, parallel authorization paths, or policy-driven reordering, the disclosed architecture ensures that identical inputs processed under identical protocol conditions yield identical execution outcomes. This determinism eliminates race conditions, inconsistent authorization states, and execution drift across distributed systems, thereby improving repeatability, fault isolation, and formal verifiability of machine-generated actions.

Architectural non-addressability of the Protocol Enforcement Domain constitutes a technical improvement over conventional access-controlled or policy-restricted systems by eliminating executable pathways rather than conditionally denying them. Internal engines of the canonical enforcement chain are not exposed as callable interfaces, services, or endpoints and therefore cannot be invoked through credentials, configuration changes, privilege escalation, or adversarial manipulation. As a result, unauthorized execution paths are rendered physically invalid at the architectural level, reducing attack surface, eliminating bypass vectors, and improving system integrity independently of application logic, transport security, or identity frameworks.

An aspect of an embodiment of the present invention contemplates a protocol-layer governance system for governing interactions among distributed computational actors, the system comprising a non-addressable Protocol Enforcement Domain (PED) configured to enforce non-bypassable execution sequencing for communications originating from non-protocol entities (NPEs), comprising: (a) an exclusive ingress component configured to receive ingress communications and generate a protocol session record for each ingress communication; (b) a qualification stage within the PED configured to derive a normalized protocol state from qualification vectors and cryptographically bind the normalized protocol state to the protocol session record; (c) an authorization stage within the PED configured to evaluate the normalized protocol state against boundary conditions and, responsive to satisfaction of the boundary conditions, generate an authorization token cryptographically bound to the protocol session record and the normalized protocol state; (d) a routing stage within the PED configured to issue a governance directive solely from the authorization token; and (e) a reconciliation stage within the PED configured to verify execution of the governance directive and anchor a finalization outcome to an immutable authority, where progression through (a)-(e) is mandatory and non-reorderable.

An aspect of an embodiment of the present invention also contemplates a protocol-layer governance system comprising a Protocol Enforcement Domain (PED) enforcing non-bypassable execution sequencing for communications from Non-Protocol Entities (NPEs), the system comprising: (a) a protocol interposition gateway serving as an exclusive ingress point and generating a protocol session record for each communication; (b) a qualification engine executing within an isolated execution context having no externally addressable interfaces, the qualification engine configured to derive a normalized protocol state from qualification vectors and cryptographically bind the normalized protocol state to the protocol session record; (c) an authorization engine executing within an isolated execution context having no externally addressable interfaces, the authorization engine configured to evaluate the normalized protocol state against eligibility constraints and, responsive to satisfaction of the eligibility constraints, generate an authorization token cryptographically bound to the protocol session record and the normalized protocol state; (d) a routing engine executing within an isolated execution context having no externally addressable interfaces, the routing engine configured to issue a governance directive solely from the authorization token; and (e) a reconciliation engine executing within an isolated execution context having no externally addressable interfaces, the reconciliation engine configured to verify directive execution and anchor a finalization outcome to an immutable authority, where each of the qualification engine, authorization engine, routing engine, and reconciliation engine accepts input exclusively from an immediate predecessor engine via a cryptographically bound internal interface, such that invocation of any engine outside a prescribed execution sequence is computationally invalid.

In aspect of an embodiment of the present invention, the PED may be implemented using at least one of: a hardware-backed trusted execution environment, a cryptographically isolated execution context, a virtualization boundary, a containerized execution environment, a service mesh boundary.

In aspect of an embodiment of the present invention, the PED may be prevented from directly invoking at least one of: the qualification stage, the authorization stage, the routing stage, the reconciliation stage, an immutable authority interface, except through the exclusive ingress pathway.

In aspect of an embodiment of the present invention, the qualification vectors comprise at least one of: AI model performance vectors, autonomous agent behavioral vectors, computational efficiency vectors, trust qualification vectors, provenance integrity vectors, anomaly detection vectors.

In aspect of an embodiment of the present invention, the qualification stage deterministically derives the normalized protocol state such that the normalized protocol state may be invariant with respect to at least one of: execution timing, infrastructure topology, geographic deployment location, computational actor substitution, execution environment reconfiguration.

In aspect of an embodiment of the present invention, cryptographically binding the normalized protocol state comprises using at least one of: a digital signature using a PED-resident key, a keyed-hash message authentication code, a hash chain, a Merkle commitment, a zero-knowledge proof.

In aspect of an embodiment of the present invention, the authorization token encodes at least one of: an execution scope restriction, an execution target boundary, a delegation restriction, a temporal validity interval, a cryptographic proof linking to the normalized protocol state.

In aspect of an embodiment of the present invention, the authorization stage operates in at least one of: a pass mode issuing full authorization, a fail mode denying authorization, a degraded mode issuing restricted authorization, a conditional mode requiring periodic re-qualification.

In aspect of an embodiment of the present invention, the routing stage rejects at least one of: modification of directive content, superseding of directive authority, injection of an alternative directive, bypass through an out-of-band pathway, replay outside a temporal validity interval.

In aspect of an embodiment of the present invention, the normalized protocol state may be cryptographically bound to a temporal freshness artifact comprising at least one of: an issuance timestamp, an expiration timestamp, a temporal validity window, a sequence number, a nonce.

In aspect of an embodiment of the present invention, the reconciliation stage verifies execution using at least one of: cryptographic attestation, behavioral telemetry verification, output validation, temporal compliance verification, resource consumption verification, multi-party verification.

In aspect of an embodiment of the present invention, anchoring to the immutable authority may comprise recording to at least one of: a cryptographic hash tree, a Merkleized append-only structure, a distributed ledger, a write-once storage system, a tamper-evident audit log, thereby enforcing append-only tamper-evident finalization semantics.

In aspect of an embodiment of the present invention, the reconciliation stage, responsive to verification failure, initiates at least one of: invalidating the authorization token, issuing a revocation directive, triggering re-qualification, generating immutable audit records, notifying an external monitoring system.

In aspect of an embodiment of the present invention, the qualification vectors comprise at least one of: AI model performance vectors, autonomous agent behavioral vectors, computational efficiency vectors, trust qualification vectors, provenance integrity vectors, anomaly detection vectors.

In aspect of an embodiment of the present invention, the normalized protocol state may be cryptographically bound to a temporal freshness artifact comprising at least one of: an issuance timestamp, an expiration timestamp, a temporal validity window, a sequence number, a nonce.

In aspect of an embodiment of the present invention, the anchoring to the immutable authority comprises recording to at least one of: a cryptographic hash tree, a Merkleized append-only structure, a distributed ledger, a write-once storage system, a tamper-evident audit log.

In aspect of an embodiment of the present invention, the PED may be implemented using at least one of: a hardware-backed trusted execution environment, a cryptographically isolated execution context, a virtualization boundary, a containerized execution environment, a service mesh boundary.

Another aspect of an embodiment of the present invention contemplates a computer-implemented method for governing interactions among distributed computational actors, comprising, executing, on at least one processor configured to perform a predefined set of basic operations in response to receiving a corresponding basic computer executable instruction selected from a predefined native instruction set of codes, steps of: (a) receiving an ingress communication through an exclusive ingress pathway and generating a protocol session record; (b) deriving, within a Protocol Enforcement Domain (PED), a normalized protocol state from qualification vectors and cryptographically binding the normalized protocol state to the protocol session record; (c) evaluating, within the PED, the normalized protocol state against boundary conditions and, responsive to satisfaction of the boundary conditions, generating an authorization token cryptographically bound to the protocol session record and the normalized protocol state; (d) issuing, within the PED, a governance directive solely from the authorization token; and (e) verifying, within the PED, execution of the governance directive and anchoring a finalization outcome to an immutable authority, where steps (a)-(e) execute in mandatory, non-reorderable sequence.

Another aspect of an embodiment of the present invention contemplates a computer-implemented method for enforcing non-bypassable execution sequencing for communications from Non-Protocol Entities (NPEs), comprising, executing, on at least one processor configured to perform a predefined set of basic operations in response to receiving a corresponding basic computer executable instruction selected from a predefined native instruction set of codes, steps of: (a) receiving communications exclusively through a protocol interposition gateway and generating a protocol session record for each communication; (b) deriving, within a Protocol Enforcement Domain (PED), a normalized protocol state from qualification vectors and cryptographically binding the normalized protocol state to the protocol session record; (c) evaluating, within the PED, the normalized protocol state against eligibility constraints and, responsive to satisfaction of the eligibility constraints, generating an authorization token cryptographically bound to the protocol session record and the normalized protocol state; (d) issuing, within the PED, a governance directive solely from the authorization token; and (e) verifying, within the PED, directive execution and anchoring a finalization outcome to an immutable authority, where each step accepts inputs exclusively from its immediate predecessor.

In another aspect of an embodiment of the present invention, the PED of the computer-implemented method may be implemented using at least one of: a hardware-backed trusted execution environment, a cryptographically isolated execution context, a virtualization boundary, a containerized execution environment, a service mesh boundary.

In another aspect of an embodiment of the present invention, the computer-implemented method further comprises preventing direct invocation by entities external to the PED of at least one of: deriving the normalized protocol state, generating the authorization token, issuing the governance directive, verifying execution, anchoring to the immutable authority, except through the exclusive ingress pathway.

In another aspect of an embodiment of the present invention, the qualification vectors of the computer-implemented method comprise at least one of: AI model performance vectors, autonomous agent behavioral vectors, computational efficiency vectors, trust qualification vectors, provenance integrity vectors, anomaly detection vectors.

In another aspect of an embodiment of the present invention, the computer-implemented method step of deriving normalized protocol state may be deterministic such that identical qualification vectors produce identical normalized protocol states regardless of at least one of: execution timing, infrastructure topology, geographic deployment location, computational actor substitution, execution environment reconfiguration.

In another aspect of an embodiment of the present invention, the computer-implemented method step of cryptographically binding normalized protocol state comprises at least one of: applying a digital signature using a PED-resident key, applying a keyed-hash message authentication code, constructing a hash chain, constructing a Merkle commitment, generating a zero-knowledge proof.

In another aspect of an embodiment of the present invention, the authorization token of the computer-implemented method encodes at least one of: an execution scope restriction, an execution target boundary, a delegation restriction, a temporal validity interval, a cryptographic proof linking to the normalized protocol state.

In another aspect of an embodiment of the present invention, the computer-implemented method step of evaluating normalized protocol state results in at least one of: a pass outcome issuing full authorization, a fail outcome denying authorization, a degraded outcome issuing restricted authorization, a conditional outcome requiring periodic re-qualification.

In another aspect of an embodiment of the present invention, the computer-implemented method further comprises rejecting at least one of: modification of directive content, superseding of directive authority, injection of an alternative directive, bypass through an out-of-band pathway, replay outside a temporal validity interval.

In another aspect of an embodiment of the present invention, the computer-implemented method further comprises cryptographically binding the normalized protocol state to a temporal freshness artifact comprising at least one of: an issuance timestamp, an expiration timestamp, a temporal validity window, a sequence number, a nonce.

In another aspect of an embodiment of the present invention, the computer-implemented method step of verifying execution comprises at least one of: cryptographic attestation, behavioral telemetry verification, output validation, temporal compliance verification, resource consumption verification, multi-party verification.

In another aspect of an embodiment of the present invention, the computer-implemented method step of anchoring finalization outcome comprises recording to at least one of: a cryptographic hash tree, a Merkleized append-only structure, a distributed ledger, a write-once storage system, a tamper-evident audit log.

In another aspect of an embodiment of the present invention, the computer-implemented method further comprises, responsive to verification failure, initiating at least one of: invalidating the authorization token, issuing a revocation directive, triggering re-qualification, generating immutable audit records, notifying an external monitoring system.

In another aspect of an embodiment of the present invention, the PED of the computer-implemented method may be implemented using at least one of: a hardware-backed trusted execution environment, a cryptographically isolated execution context, a virtualization boundary, a containerized execution environment, a service mesh boundary.

In another aspect of an embodiment of the present invention, the qualification vectors of the computer-implemented method comprise at least one of: AI model performance vectors, autonomous agent behavioral vectors, computational efficiency vectors, trust qualification vectors, provenance integrity vectors, anomaly detection vectors.

In another aspect of an embodiment of the present invention, the computer-implemented method further comprises cryptographically binding the normalized protocol state to a temporal freshness artifact comprising at least one of: an issuance timestamp, an expiration timestamp, a temporal validity window, a sequence number, a nonce.

In another aspect of an embodiment of the present invention, the computer-implemented method step of anchoring finalization outcome comprises recording to at least one of: a cryptographic hash tree, a Merkleized append-only structure, a distributed ledger, a write-once storage system, a tamper-evident audit log.

A further aspect of an embodiment of the present invention contemplates a computer program product comprising a non-transitory computer readable medium having computer executable instructions stored therein to cause performance of operations for governing interactions among distributed computational actors comprising executing, on at least one processor configured to perform a predefined set of basic operations in response to receiving a corresponding basic computer executable instruction selected from a predefined native instruction set of codes, computer readable program code for operational implementation of: (a) receiving an ingress communication through an exclusive ingress pathway and generating a protocol session record; (b) deriving, within a Protocol Enforcement Domain (PED), a normalized protocol state from qualification vectors and cryptographically binding the normalized protocol state to the protocol session record; (c) evaluating, within the PED, the normalized protocol state against boundary conditions and, responsive to satisfaction of the boundary conditions, generating an authorization token cryptographically bound to the protocol session record and the normalized protocol state; (d) issuing, within the PED, a governance directive solely from the authorization token; and (e) verifying, within the PED, execution of the governance directive and anchoring a finalization outcome to an immutable authority, where steps (a)-(e) execute in mandatory, non-reorderable sequence.

A further aspect of an embodiment of the present invention contemplates a computer readable medium having computer executable instructions stored therein to cause performance of operations for enforcing non-bypassable execution sequencing for communications from Non-Protocol Entities (NPEs), comprising executing, on at least one processor configured to perform a predefined set of basic operations in response to receiving a corresponding basic computer executable instruction selected from a predefined native instruction set of codes, computer readable program code for operational implementation of: (a) receiving communications exclusively through a protocol interposition gateway and generating a protocol session record for each communication; (b) deriving, within a Protocol Enforcement Domain (PED), a normalized protocol state from qualification vectors and cryptographically binding the normalized protocol state to the protocol session record; (c) evaluating, within the PED, the normalized protocol state against eligibility constraints and, responsive to satisfaction of the eligibility constraints, generating an authorization token cryptographically bound to the protocol session record and the normalized protocol state; (d) issuing, within the PED, a governance directive solely from the authorization token; and (e) verifying, within the PED, directive execution and anchoring a finalization outcome to an immutable authority, where each step accepts inputs exclusively from its immediate predecessor.

In a further aspect of an embodiment of the present invention, the PED of the non-transitory computer-readable medium may be implemented using computer readable program code for operating at least one of: a hardware-backed trusted execution environment, a cryptographically isolated execution context, a virtualization boundary, a containerized execution environment, a service mesh boundary.

In a further aspect of an embodiment of the present invention, the non-transitory computer-readable medium further comprises computer readable program code for preventing direct invocation by entities external to the PED, the direct invocation prevention comprising at least one of: deriving the normalized protocol state, generating the authorization token, issuing the governance directive, verifying execution, anchoring to the immutable authority, except through the exclusive ingress pathway.

In a further aspect of an embodiment of the present invention, the qualification vectors of the non-transitory computer-readable medium comprise at least one of: AI model performance vectors, autonomous agent behavioral vectors, computational efficiency vectors, trust qualification vectors, provenance integrity vectors, anomaly detection vectors.

In a further aspect of an embodiment of the present invention, deriving the normalized protocol state of the non-transitory computer-readable medium may be deterministic such that identical qualification vectors produce identical normalized protocol states regardless of at least one of: execution timing, infrastructure topology, geographic deployment location, computational actor substitution, execution environment reconfiguration.

In a further aspect of an embodiment of the present invention, the computer readable code for cryptographically binding the normalized protocol state comprises computer readable code for at least one of: applying a digital signature using a PED-resident key, applying a keyed-hash message authentication code, constructing a hash chain, constructing a Merkle commitment, generating a zero-knowledge proof.

In a further aspect of an embodiment of the present invention, the authorization token of the non-transitory computer-readable medium encodes at least one of: an execution scope restriction, an execution target boundary, a delegation restriction, a temporal validity interval, a cryptographic proof linking to the normalized protocol state.

In a further aspect of an embodiment of the present invention, execution of the computer program code for evaluating the normalized protocol state results in at least one of: a pass outcome issuing full authorization, a fail outcome denying authorization, a degraded outcome issuing restricted authorization, a conditional outcome requiring periodic re-qualification.

In a further aspect of an embodiment of the present invention, the non-transitory computer-readable medium further comprises computer readable code for rejecting at least one of: modification of directive content, superseding of directive authority, injection of an alternative directive, bypass through an out-of-band pathway, replay outside a temporal validity interval.

In a further aspect of an embodiment of the present invention, the non-transitory computer-readable medium further comprises computer readable code for cryptographically binding the normalized protocol state to a temporal freshness artifact comprising at least one of: an issuance timestamp, an expiration timestamp, a temporal validity window, a sequence number, a nonce.

In a further aspect of an embodiment of the present invention, the computer readable code for verifying execution comprises computer readable code for at least one of: cryptographic attestation, behavioral telemetry verification, output validation, temporal compliance verification, resource consumption verification, multi-party verification.

In a further aspect of an embodiment of the present invention, the computer readable code for anchoring the finalization outcome comprises computer readable code for recording to at least one of: a cryptographic hash tree, a Merkleized append-only structure, a distributed ledger, a write-once storage system, a tamper-evident audit log.

In a further aspect of an embodiment of the present invention, the non-transitory computer-readable medium further comprises computer readable code for initiating, responsive to verification failure, at least one of: invalidating the authorization token, issuing a revocation directive, triggering re-qualification, generating immutable audit records, notifying an external monitoring system.

In a further aspect of an embodiment of the present invention, the qualification vectors of the non-transitory computer-readable medium comprise at least one of: AI model performance vectors, autonomous agent behavioral vectors, computational efficiency vectors, trust qualification vectors, provenance integrity vectors, anomaly detection vectors.

In a further aspect of an embodiment of the present invention, the non-transitory computer-readable medium further comprises computer readable code for cryptographically binding the normalized protocol state to a temporal freshness artifact comprising at least one of: an issuance timestamp, an expiration timestamp, a temporal validity window, a sequence number, a nonce.

In a further aspect of an embodiment of the present invention, the computer readable code for anchoring the finalization outcome further comprises computer readable code for recording to at least one of: a cryptographic hash tree, a Merkleized append-only structure, a distributed ledger, a write-once storage system, a tamper-evident audit log.

In a further aspect of an embodiment of the present invention, the PED of the non-transitory computer-readable medium may be implemented using at least one of: a hardware-backed trusted execution environment, a cryptographically isolated execution context, a virtualization boundary, a containerized execution environment, a service mesh boundary.

DETAILED DESCRIPTION OF DRAWINGS

Figure 1:
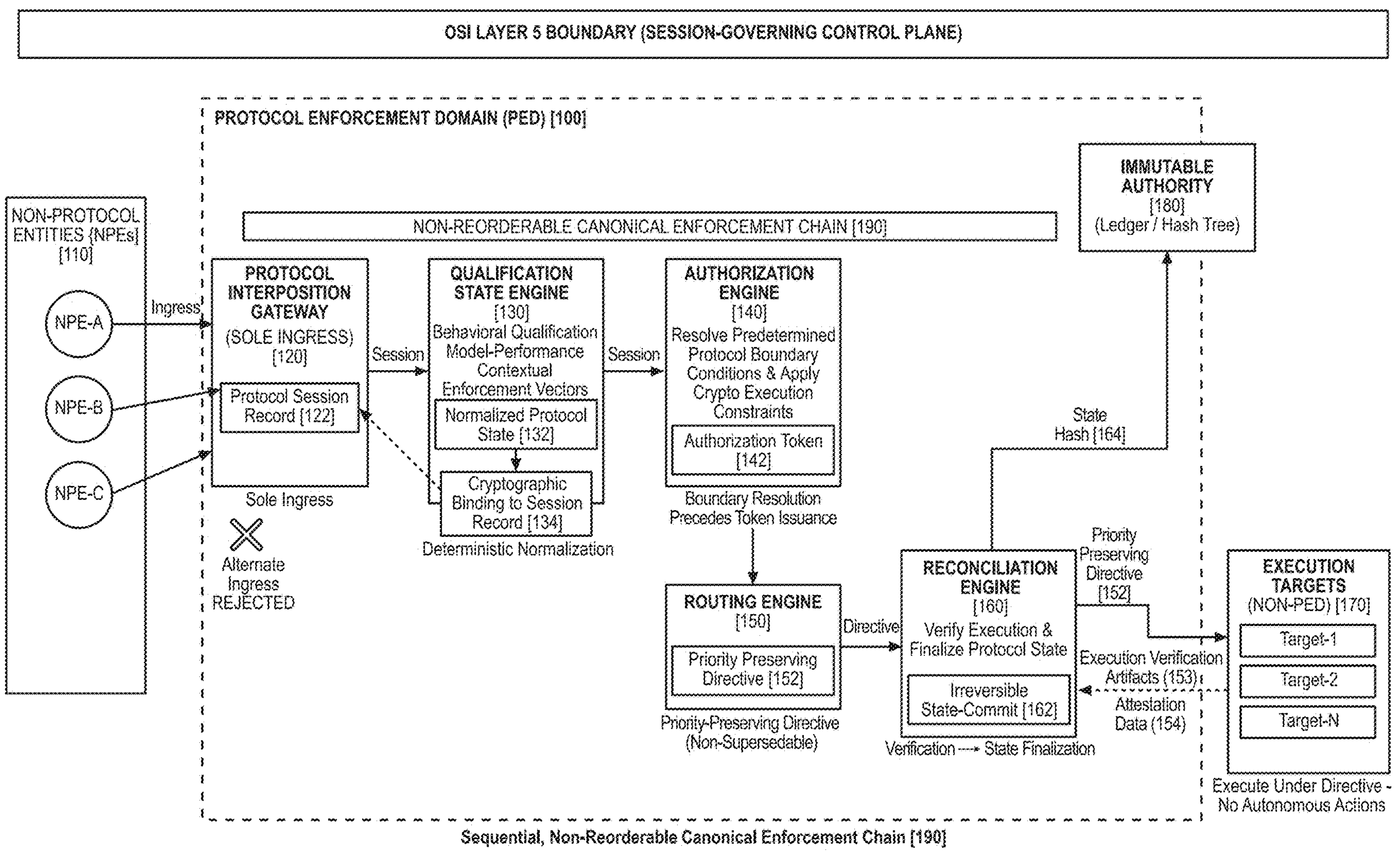
FIG. 1 illustrates a block diagram showing a canonical enforcement chain implemented at an OSI Layer-5 protocol boundary within a Protocol Enforcement Domain (PED), according to aspects of embodiments of the present invention.

Referring now to FIG. 1, a canonical enforcement chain implemented within a Protocol Enforcement Domain (PED) [100] operating at an OSI Layer-5 boundary is shown according to aspects of embodiments of the present invention. FIG. 1 shows a strictly ordered, non-reorderable pipeline beginning with Non-Protocol Entities (NPEs), proceeding through a protocol interposition gateway, a qualification state engine, an authorization engine, a routing engine, and a reconciliation engine. The enforcement chain outputs directives to one or more execution targets and issues irreversible commit artifacts to an immutable authority.

The OSI Layer-5 boundary provides a session-governing control plane through which protocol governance is performed. Within PED [100], a series of protocol enforcement engines are arranged in a non-reorderable sequence that accepts ingress from external entities, performs qualification and authorization, generates directives, verifies execution, and issues state-commit instructions to an immutable authority.

Non-Protocol Entities and Ingress

A plurality of non-protocol entities (NPEs) [110] may originate requests for protocol execution. NPEs [110] may include human-operated systems, software agents, avatar-mediated entities, machine agents, or the like. In the illustrated embodiment, ingress from NPEs [110] is solely accepted through a Protocol Interposition Gateway (PIG) [120]. Inputs bypassing Protocol Interposition Gateway [120] are not admitted to PED [100].

Protocol Interposition Gateway

Protocol Interposition Gateway [120] provides the sole ingress point to PED [100], serving as the exclusive ingress pathway through which all communications from Non-Protocol Entities must transit. Upon receiving a session request from an NPE [110], Protocol Interposition Gateway [120] generates a Protocol Session Record (PSR) [122] associated with the request. PSR [122] establishes session scope at the OSI Layer-5 boundary and is generated for each ingress communication admitted to PED [100].

Protocol Interposition Gateway [120] further produces Cryptographic Session Bindings [124]. Cryptographic Session Bindings [124] cryptographically associate Protocol Session Record [122] with session parameters and ingress metadata. Cryptographic Session Bindings [124] may be used to enforce exclusivity of ingress and to prevent re-creation or alteration of session artifacts by downstream engines or external entities.

Qualification State Engine

Protocol Interposition Gateway [120] provides its output to a Qualification State Engine [130]. Qualification State Engine [130] receives one or more vectors associated with the session, which may include behavioral qualification vectors, contextual vectors, enforcement vectors, or model-performance vectors. Qualification State Engine [130] transforms those vectors into a Normalized Protocol State [132].

Qualification State Engine [130] additionally applies a Cryptographic Freshness Binding [134] to Normalized Protocol State [132]. Cryptographic Freshness Binding [134] binds Normalized Protocol State [132] to a temporal validity interval, thereby preventing reuse or replay of prior protocol states. Normalized Protocol State [132] and Cryptographic Freshness Binding [134] advance exclusively to the next engine in the canonical enforcement chain.

Authorization Engine

The output of Qualification State Engine [130] is provided to an Authorization Engine [140]. Authorization Engine [140] evaluates predetermined protocol boundary conditions associated with Normalized Protocol State [132]. Based on the evaluation of the predetermined boundary conditions, Authorization Engine [140] determines an authorization state.

In response to determining that the predetermined boundary conditions are satisfied, Authorization Engine [140] generates an Authorization Token [142]. Authorization Token [142] is cryptographically bound to at leastNormalized Protocol State [132], Cryptographic Session Bindings [124], and Cryptographic Freshness Binding [134]. Authorization Token [142] advances to Routing Engine [150].

Routing Engine

Routing Engine [150] receives Authorization Token [142] and issues a Priority-Preserving Directive [152]. Priority-Preserving Directive [152] identifies one or more execution targets and preserves the relative priority of execution associated with the session. In some embodiments, Priority-Preserving Directive [152] may be issued to a single execution target, to a qualified subset of targets, or to a plurality of targets in broadcast form. Priority-Preserving Directive [152] advances to Reconciliation Engine [160].

Reconciliation Engine

Reconciliation Engine [160] receives the Priority-Preserving Directive [152] and verifies execution results associated with the directive. Reconciliation Engine [160] determines a finalization mode based on the verification. The finalization mode may include a full-commit mode, a partial-commit mode, or a revocation mode.

In response to determining the finalization mode, Reconciliation Engine [160] generates an Irreversible State-Commit [162], which constitutes the finalization outcome for the protocol session. Irreversible State-Commit [162] (finalization outcome) provides a governance record of finalization and is anchored to an Immutable Authority [180]. The anchoring operation cryptographically binds the finalization outcome to the protocol session record and the normalized protocol state, establishing an immutable record that cannot be modified, deleted, or reordered by any component internal or external to the Protocol Enforcement Domain.

Immutable Authority

Immutable Authority [180] records Irreversible State-Commit [162] in a data structure such as a ledger or hash tree. Immutable Authority [180] maintains immutability of previously-committed states and does not provide re-authorization or modification of prior records. In some embodiments, the Immutable Authority enforces an append-only commitment structure in which finalization events may only be appended and cannot be modified, overwritten, reversed, reordered, or deleted.

Execution Targets

One or more Execution Targets [170] may operate outside of PED [100]. Execution Targets [170] receive directives propagated through the canonical enforcement chain. Execution Targets [170] do not bypass Reconciliation Engine [160] and do not generate authorization artifacts.

Canonical Enforcement Chain

Protocol Interposition Gateway [120], Qualification State Engine [130], Authorization Engine [140], Routing Engine [150], and Reconciliation Engine [160] form a non-reorderable canonical enforcement chain [190]. Each engine accepts inputs exclusively from the immediately preceding engine in the chain. No lateral ingress, back-channel access, or downstream re-ordering is permitted within PED [100].

As used throughout this specification and consistent with Definition 3, actions or execution paths described as "physically invalid" cannot occur within the canonical enforcement chain because no executable pathway exists to perform them. A physically invalid action is not rejected, blocked, configured against, or denied based on policy or permissions; rather, the action lacks an addressable execution path and therefore cannot be invoked regardless of credentials, runtime state, adversarial behavior, or external control. The canonical enforcement chain enforces physical invalidity through execution isolation, non-addressable internal interfaces, cryptographic dependencies, and predecessor-bound state progression.

Figure 2:
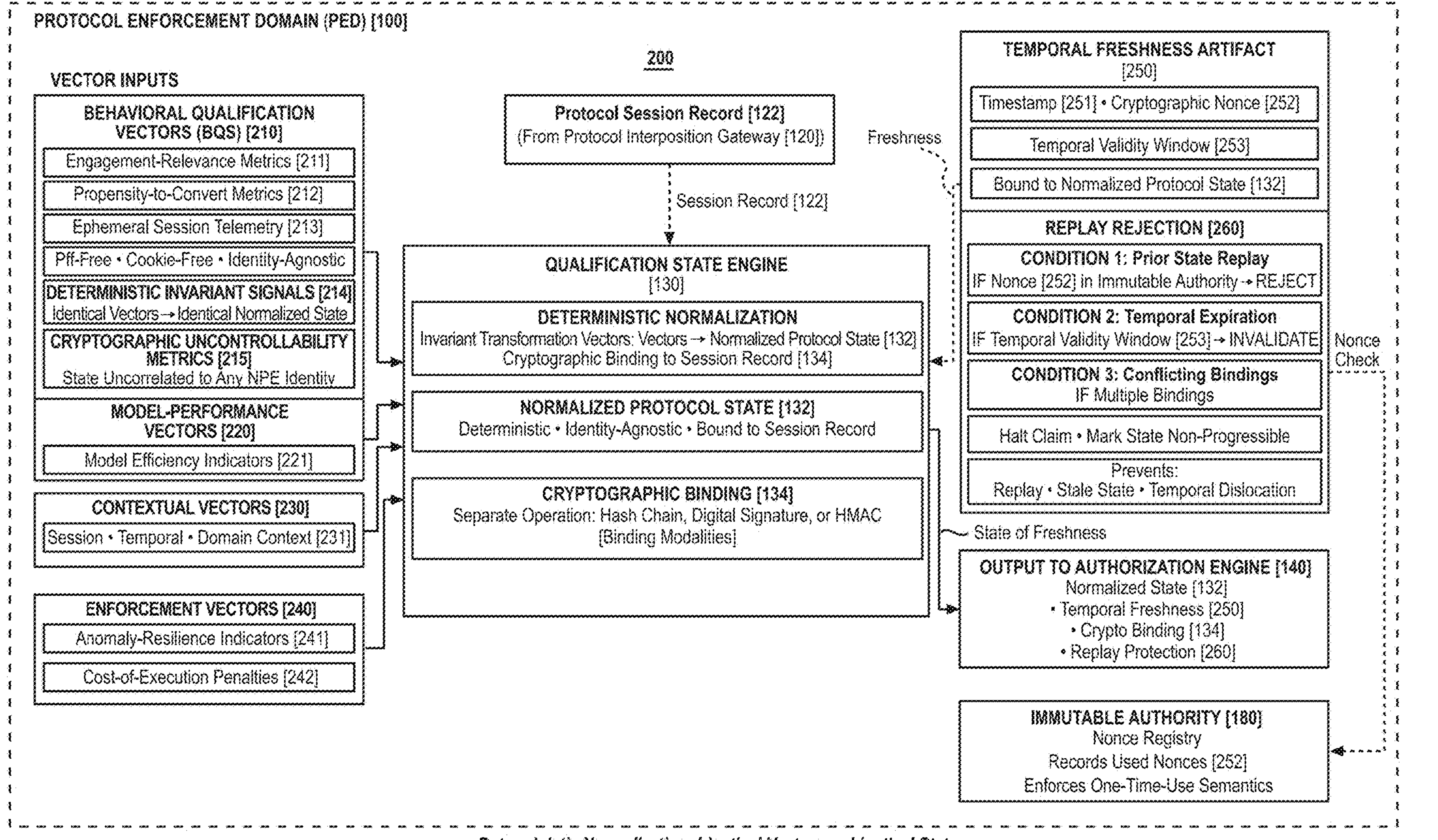
FIG. 2 illustrates a block diagram showing a qualification state engine operation, including vector decomposition and temporal freshness binding, according to aspects of embodiments of the present invention.

Referring now to FIG. 2, a Qualification State Engine [130] configured to receive vector inputs associated with a session [200], is shown according to aspects of embodiments of the present invention. FIG. 2 shows transformation of behavioral qualification vectors, model-performance vectors, contextual vectors, and enforcement vectors into a normalized protocol state. The normalized protocol state is cryptographically bound to a protocol session record, and a temporal freshness artifact is generated to prevent replay attempts.

In an aspect of an embodiment of the present invention, Qualification State Engine [130] is also configured to perform deterministic normalization of those inputs into a Normalized Protocol State [132], apply a Cryptographic Binding [134] to enforce temporal freshness, and perform replay rejection prior to providing Normalized Protocol State [132] to an Authorization Engine [140]. Qualification State Engine [130] operates within a Protocol Enforcement Domain (PED) [100].

Vector Inputs

Qualification State Engine [130] receives a plurality of input vectors. In the illustrated embodiment, the input vectors may include Behavioral Qualification Vectors (BQS) [210], Model-Performance Vectors [220], Contextual Vectors [230], and Enforcement Vectors [240]. Each of the vector categories provides deterministic indicators used to form the Normalized Protocol State [132].

Behavioral Qualification Vectors

Behavioral Qualification Vectors (BQS) [210] include engagement-relevance metrics [211], propensity-to-convert metrics [212], ephemeral session telemetry [213], deterministic invariant signals [214], and cryptographic uncontrollability metrics [215]. Behavioral Qualification Vectors (BQS) [210] provide deterministic indicators associated with entity behavior, avatar-mediated behavior, or machine-originated behavior.

Model-Performance Vectors

Model-Performance Vectors [220] include one or more model efficiency indicators [221]. Model-Performance Vectors [220] identify run-time model performance properties associated with session [200] and are not used to perform inference or prediction.

Contextual Vectors

Contextual Vectors [230] include indicators associated with session, temporal, or domain context [231]. Contextual Vectors [230] provide deterministic contextual attributes associated with the session and do not encode user identity or behavioral profiling.

Enforcement Vectors

Enforcement Vectors [240] include anomaly-resilience indicators [241] and cost-of-execution predicates [242]. Enforcement Vectors [240] supply deterministic operational constraints relevant to enforcement activity within Protocol Enforcement Domain [100].

Deterministic Normalization

Qualification State Engine [130] performs deterministic normalization across the input vectors to produce Normalized Protocol State [132]. The deterministic normalization produces a canonical protocol representation derived from the session vectors and Protocol Session Record [122]. Normalized Protocol State [132] replaces the input vectors for subsequent processing.

The deterministic normalization performed by Qualification State Engine [130] is executed without statistical inference or probabilistic evaluation. The deterministic normalization produces an identical Normalized Protocol State [132] for identical vector inputs.

Cryptographic Freshness Binding

Qualification State Engine [130] applies a Cryptographic Binding [134] to Normalized Protocol State [132]. Cryptographic Binding [134] binds Normalized Protocol State [132] to one or more temporal artifacts associated with the session. In the illustrated embodiment, Cryptographic Binding [134] may incorporate a timestamp value, a cryptographic nonce, or both.

Cryptographic Binding [134] establishes a temporal validity interval associated with Normalized Protocol State [132]. Protocol states lacking valid Cryptographic Binding [134] are not admitted to the Authorization Engine [140].

Temporal Freshness Artifact

In some embodiments, the temporal information associated with Cryptographic Binding [134] may be stored in a Temporal Freshness Artifact [250]. Temporal Freshness Artifact [250] may include a timestamp value [251], a cryptographic nonce [252], and a temporal validity window [253]. Temporal Freshness Artifact [250] is associated with Normalized Protocol State [132].

Replay Rejection

Replay rejection logic [260] evaluates Normalized Protocol State [132] and Temporal Freshness Artifact [250] against one or more conditions. In the illustrated embodiment, replay rejection logic [260] rejects (i) protocol states originating from a prior session, (ii) protocol states associated with expired temporal validity, or (iii) protocol states associated with conflicting bindings. Protocol states that satisfy replay rejection conditions do not advance to Authorization Engine [140].

Output to Authorization Engine

When the replay rejection conditions are not met, Qualification State Engine [130] provides Normalized Protocol State [132] and Cryptographic Binding [134] to Authorization Engine [140]. In some embodiments, Temporal Freshness Artifact [250] may also be provided to Authorization Engine [140]. Qualification State Engine [130] does not issue authorization tokens, routing directives, or execution instructions.

Immutable Authority Interaction

Replay rejection events may be recorded in an Immutable Authority [180]. Immutable Authority [180] maintains an immutable ledger or hash-tree record of rejected protocol states and does not alter previously committed records or issue authorization instructions.

Functional Role

Qualification State Engine [130] provides deterministic normalization and temporal freshness enforcement within the canonical enforcement chain. Normalized Protocol State [132] generated by Qualification State Engine [130] forms the basis for all subsequent authorization and routing performed within Protocol Enforcement Domain [100].

Qualification Vectors

Qualification state engine [130] derives normalized protocol state from one or more qualification vectors. As defined herein, qualification vectors provide deterministic indicators associated with the governed computational actor and do not perform inference, prediction, statistical evaluation, optimization, or behavioral forecasting.

In various embodiments, the system may evaluate:

- AI Model Performance Vectors (Definition 17)—deterministic indicators including runtime efficiency, accuracy characteristics derived from verified provenance, resource consumption, attestation validity, and output consistency under identical conditions.

Autonomous Agent Behavioral Vectors (Definition 18)—deterministic indicators including protocol compliance history, coordination stability, resource adherence, execution reliability, and repeatable operational behavior under identical conditions.

Computational Efficiency Metrics (Definition 19)—deterministic indicators including execution latency, memory and processor utilization, network bandwidth consumption, and throughput performance within execution boundaries.

Trust Qualification Vectors (Definition 20)—deterministic indicators including cryptographic attestation validity, version integrity, temporal freshness, adversarial robustness, and anomaly-resilience characteristics.

Qualification state engine [130] may evaluate one, several, or all qualification vector categories depending on the governed execution environment and predetermined protocol boundary conditions. Qualification vectors do not modify routing decisions, perform model or agent selection, or produce adaptive behavioral outcomes. Instead, they enable deterministic formation of Normalized Protocol State [132] for subsequent authorization processing within the canonical enforcement chain. In various embodiments, qualification vectors comprise at least one of: AI model performance vectors, autonomous agent behavioral vectors, computational efficiency vectors, trust qualification vectors, provenance integrity vectors, or anomaly detection vectors.

Provenance integrity vectors comprise deterministic indicators characterizing data lineage, source authenticity, transformation history, cryptographic chain-of-custody verification, and origin attestation for computational artifacts processed within a protocol session. Provenance integrity vectors enable the qualification state engine to evaluate whether inputs originate from verified sources, have maintained integrity through prior processing stages, and satisfy provenance requirements specified in protocol boundary conditions. Provenance integrity vectors are deterministic: identical provenance artifacts and identical verification contexts produce identical vector values. Provenance integrity vectors do not perform probabilistic trust inference, reputation scoring, or predictive authenticity assessment.

Anomaly detection vectors comprise deterministic indicators characterizing deviation from expected behavioral patterns, statistical outlier classification outcomes, boundary violation detection results, and protocol conformance measurements within the current session context. Anomaly detection vectors differ from anomaly-resilience indicators (which characterize resistance to anomalies as described in Definition 21) by providing qualification inputs based on detected anomalous conditions rather than resistance properties. Anomaly detection vectors are deterministic: identical behavioral observations evaluated against identical detection criteria produce identical vector values. Anomaly detection vectors do not perform predictive anomaly forecasting, adaptive threshold adjustment, or machine learning-based anomaly classification.

Figure 3:
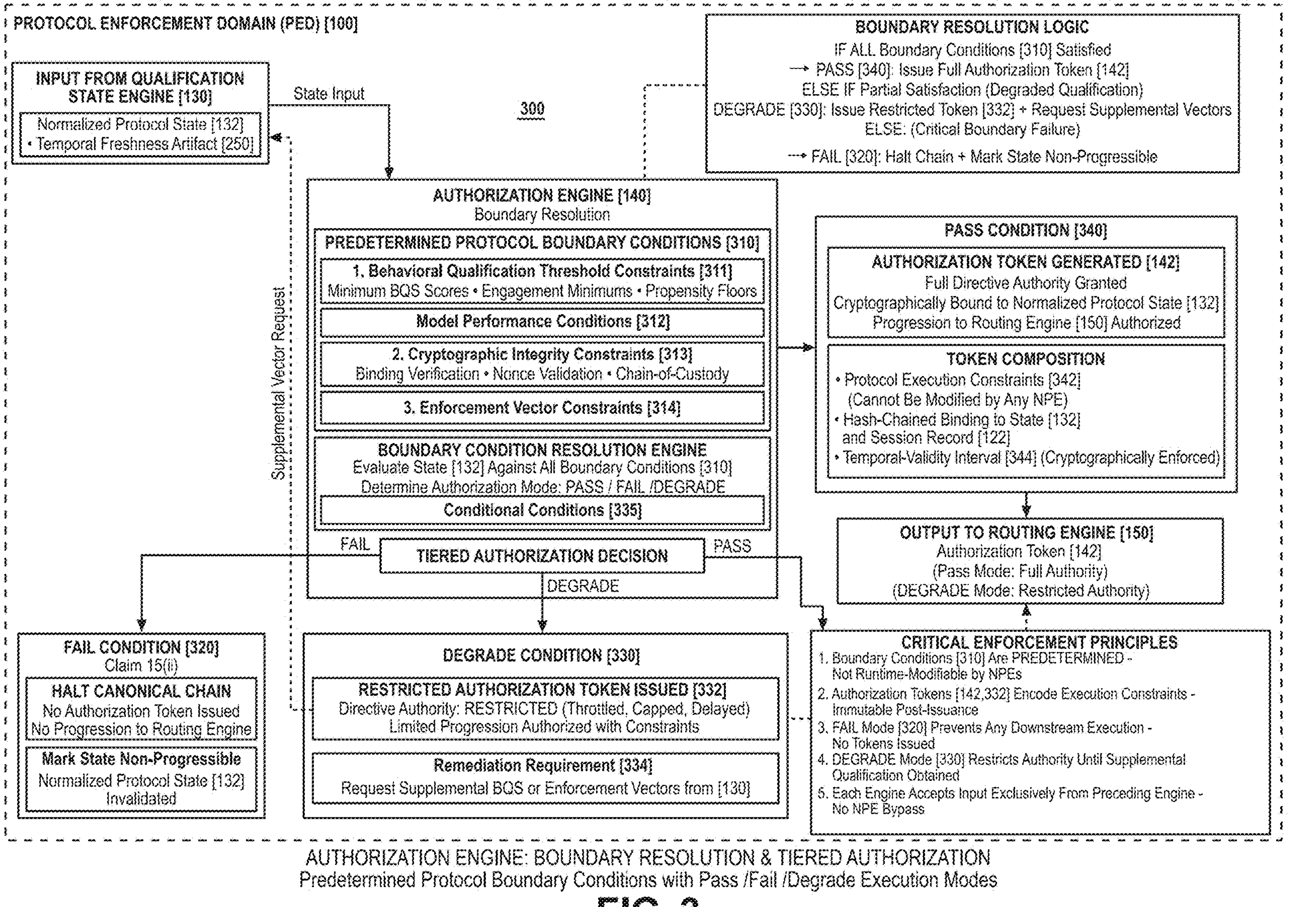
FIG. 3 illustrates a block diagram showing an authorization engine boundary-resolution logic and tiered decision processing, according to aspects of embodiments of the present invention.

Referring now to FIG. 3, an Authorization Engine [140] with boundary-resolution logic and tiered decision processing [300], is shown according to aspects of embodiments of the present invention. As shown in FIG. 3, predetermined protocol boundary conditions are resolved to produce one of three execution modes: pass, fail, or degrade. An authorization token is generated and cryptographically bound to the normalized protocol state to prevent post-hoc modification or re-authorization.

Authorization Engine [140], in an aspect of an embodiment of the present invention may be configured to evaluate predetermined protocol boundary conditions associated with a session, resolve the boundary conditions in a tiered manner, and generate an authorization token based on the determined execution mode. Authorization Engine [140] operates within Protocol Enforcement Domain (PED) [100] and receives inputs from Qualification State Engine [130].

Input to Authorization Engine

Authorization Engine [140] receives at least Normalized Protocol State [132] and Cryptographic Binding [134]. In some embodiments, the Authorization Engine [140] may additionally receive a Temporal Freshness Artifact [250] associated with the session. Authorization Engine [140] does not receive ingress directly from non-protocol entities [110] and does not accept input from engines downstream of Authorization Engine [140].

Predetermined Protocol Boundary Conditions

Authorization Engine [140] evaluates a set of predetermined protocol boundary conditions [310], also referred to as eligibility constraints. The predetermined protocol boundary conditions (eligibility constraints) [310] may include Behavioral Qualification Threshold Constraints [311], Model-Performance Conditions [312], Cryptographic Integrity Conditions [313], and Enforcement Vector Constraints [314]. Each of the predetermined protocol boundary conditions [310] may be defined independently of the others. Throughout this specification and claims, the terms "boundary conditions" and "eligibility constraints" are used interchangeably to refer to the deterministic criteria that must be satisfied by normalized protocol state [132] before authorization may proceed.

In the illustrated embodiment, Behavioral Qualification Threshold Constraints [311] specify one or more deterministic thresholds associated with Behavioral Qualification Vectors [210]. Model-Performance Conditions [312] specify minimum effectiveness criteria that may be applied to Model-Performance Vectors [220]. Cryptographic Integrity Conditions [313] specify requirements associated with the validity of Cryptographic Binding [134] or Temporal Freshness Artifact [250]. Enforcement Vector Constraints [314] specify operational constraints derived from Enforcement Vectors [240].

Boundary Resolution

Authorization Engine [140] executes boundary resolution logic based on the predetermined protocol boundary conditions [310]. The boundary resolution logic produces a tiered authorization decision [320], [330], or [340]. The boundary resolution logic may be implemented in hardware, software, firmware, or combinations thereof.

Fail Condition

When the predetermined protocol boundary conditions [310] are not satisfied, Authorization Engine [140] establishes a Fail Condition [320]. Under the Fail Condition [320], no authorization token is generated. Authorization Engine [140] may terminate the session associated with Normalized Protocol State [132] or prevent further execution. In Fail Condition [320], session processing does not advance to Routing Engine [150].

Degrade Condition

When predetermined protocol boundary conditions [310] are partially satisfied or an enforcement limitation is applicable, Authorization Engine [140] may establish a Degrade Condition [330], also referred to as a degraded mode. Under the Degrade Condition [330], a restricted authorization token [332] is generated. Restricted authorization token [332] may be associated with reduced execution scope, remediation requirements, or constrained resource allocation. Degrade Condition [330] permits continued protocol execution under restricted parameters.

In some embodiments, Authorization Engine [140] may establish a Conditional Condition [335], also referred to as a conditional mode. Conditional Condition [335] is established when the predetermined protocol boundary conditions [310] are satisfied subject to ongoing verification requirements or periodic re-qualification mandates. Under Conditional Condition [335], an authorization token is generated with temporal re-qualification constraints, requiring the NPE to submit refreshed qualification vectors at predetermined intervals to maintain authorization validity. Conditional Condition [335] differs from Degrade Condition [330] in that full authorization scope is granted rather than restricted, but periodic re-evaluation against current boundary conditions is mandated as a condition of continued authorization. Failure to satisfy re-qualification requirements within the specified interval results in automatic transition to Fail Condition [320] without requiring explicit revocation. The conditional mode enables governance of long-running sessions, persistent agent interactions, and continuous execution environments where qualification state may evolve over time.

Pass Condition

When all predetermined protocol boundary conditions [310] are satisfied, Authorization Engine [140] establishes a Pass Condition [340]. Under Pass Condition [340], an Authorization Token [142] is generated. Authorization Token [142] is cryptographically bound to Normalized Protocol State [132], Protocol Session Record [122], and Cryptographic Binding [134].

Authorization Token

Authorization Token [142] is non-delegable and non-fungible. Authorization Token [142] may include one or more cryptographic attestations derived from the session context. Authorization Token [142] does not permit downstream creation of derivative authorization tokens.

Output from Authorization Engine

Authorization Engine [140] provides its output exclusively to Routing Engine [150]. In Pass Condition [340], Authorization Engine [140] provides Authorization Token [142]. In Degrade Condition [330], Authorization Engine [140] may provide restricted authorization token [332]. In Fail Condition [320], no token is provided to Routing Engine [150].

Execution Integrity

Authorization Engine [140] does not issue execution directives, route traffic, or modify protocol state produced by Qualification State Engine [130]. Authorization Engine [140] performs boundary resolution prior to any token generation. Tokens are not issued prior to determination of Fail Condition [320], Degrade Condition [330], or Pass Condition [340]. Authorization Engine [140] does not accept state from engines downstream in the canonical enforcement chain [190].

Figure 4:
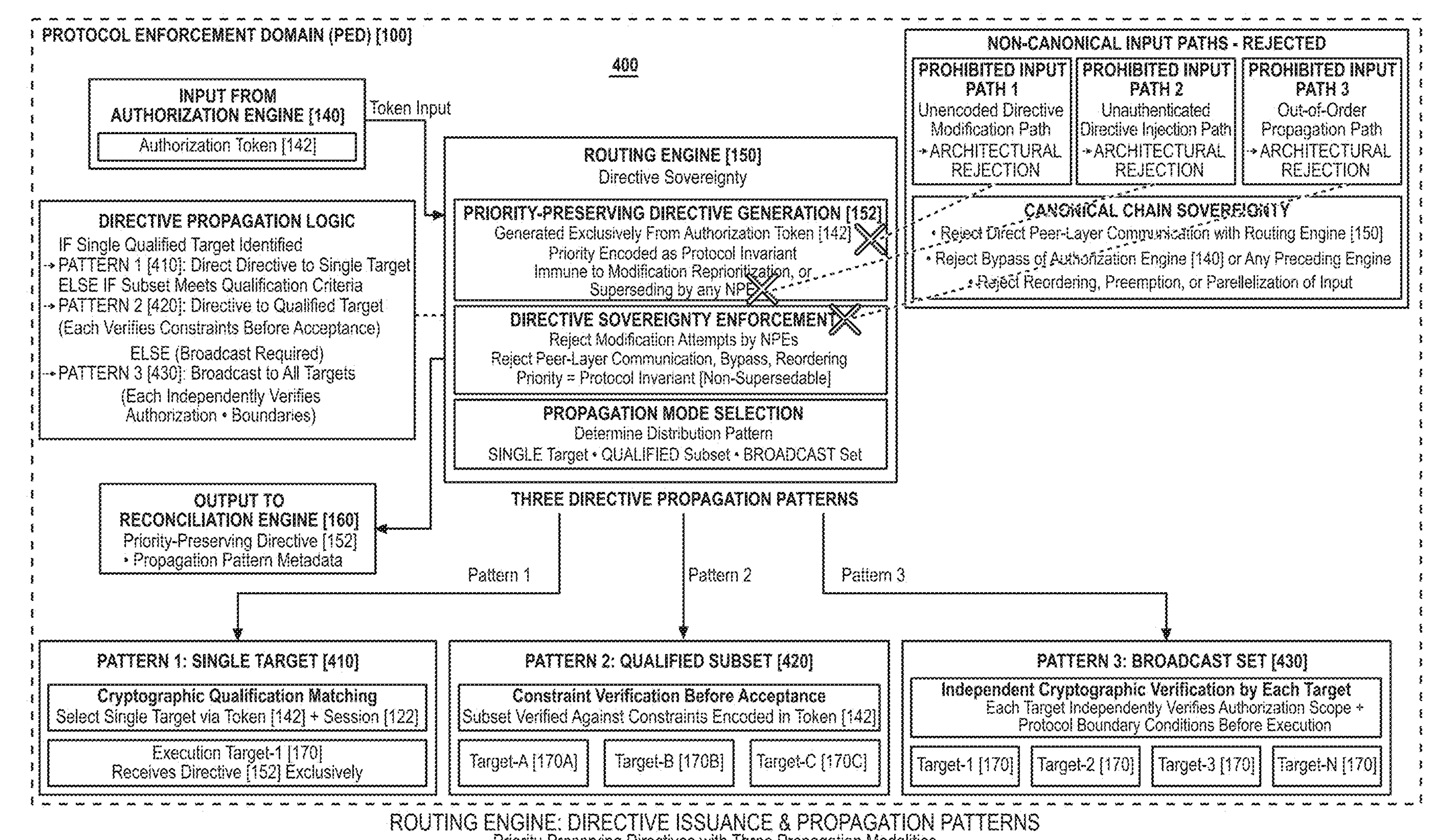
FIG. 4 illustrates a block diagram showing a routing engine directive issuance and propagation modalities, according to aspects of embodiments of the present invention.

Referring now to FIG. 4, a block diagram 400 showing a routing engine [150] directive issuance and propagation modalities, is shown according to aspects of embodiments of the present invention. According to aspects of embodiments of the present invention, routing engine [150] produces priority-preserving directives and propagates them using one of three modalities: (i) single-target [410] selection, (ii) qualified subset [420] dissemination, or (iii) broadcast-set [430] distribution. The routing engine rejects non-canonical input paths to preserve enforcement integrity.

As shown in FIG. 4, Routing Engine [150] may be configured to generate a priority-preserving directive in response to an authorization token and to propagate the directive using one of three predetermined propagation modalities. Routing Engine [150] operates within Protocol Enforcement Domain (PED) [100] and receives inputs exclusively from Authorization Engine [140].

Input to Routing Engine

Routing Engine [150] receives an Authorization Token [142] from Authorization Engine [140]. Authorization Token [142] encodes the authorization state determined by Authorization Engine [140]. Routing Engine [150] does not accept lateral ingress from non-protocol entities [110], execution targets [170], or engines downstream from Routing Engine [150].

Priority-Preserving Directive Generation

Routing Engine [150] generates a Priority-Preserving Directive [152], also referred to as a governance directive. Priority-Preserving Directive (governance directive) [152] encodes execution priority and target addressing while preserving the authorization state associated with Authorization Token [142]. In the illustrated embodiment, Priority-Preserving Directive [152] is issued solely from and deterministically bound to Authorization Token [142] and does not modify the underlying Normalized Protocol State [132]. The routing stage cannot issue a governance directive absent a valid authorization token, and no governance directive may be generated from any source other than the authorization token provided by the authorization stage.

Priority-Preserving Directive [152] does not include inference, negotiation, or predictive decisioning. Routing Engine [150] does not evaluate behavioral or contextual signals and does not perform adjudication. Routing Engine [150] issues directives only in accordance with the authorization previously determined by Authorization Engine [140].

Directive Sovereignty Enforcement

Routing Engine [150] enforces directive sovereignty by rejecting non-canonical input paths. In the illustrated embodiment, prohibited input paths include (i) lateral updates from execution targets [170], (ii) re-ingress paths from downstream engines, and (iii) externally supplied directives originating outside Protocol Enforcement Domain [100]. Routing Engine [150] rejects non-canonical input paths to prevent modification, re-prioritization, or superseding of directives.

Propagation Mode Selection

Routing Engine [150] selects one of a plurality of directive propagation patterns based on the authorization scope associated with Authorization Token [142]. The selected propagation pattern establishes the addressing scope and directive distribution structure. Routing Engine [150] does not modify, re-evaluate, or re-authorize the directive once propagation mode selection is completed.

Propagation Patterns

In the illustrated embodiment, Routing Engine [150] may implement one of three propagation patterns: a Single Target pattern [410], a Qualified Subset pattern [420], or a Broadcast Set pattern [430].

Single Target Pattern

In Single Target pattern [410], Routing Engine [150] directs Priority-Preserving Directive [152] to a single execution target [170]. The directive is associated with a single cryptographic verification instance that is performed by the execution target [170] prior to execution. The directive does not propagate to additional targets.

Qualified Subset Pattern

In Qualified Subset pattern [420], Routing Engine [150] directs Priority-Preserving Directive [152] to a plurality of execution targets [170A], [170B], and [170C]. Each execution target independently verifies the associated authorization prior to execution. The directive is not broadcast beyond the qualified subset.

Broadcast Set Pattern

In Broadcast Set pattern [430], Routing Engine [150] directs Priority-Preserving Directive [152] to a plurality of execution targets [170] in parallel. Each execution target independently performs cryptographic verification prior to execution. Routing Engine [150] does not delegate verification responsibility between execution targets and does not permit cross-target consensus.

Output to Reconciliation Engine

After propagation, Routing Engine [150] provides Priority-Preserving Directive [152] to a Reconciliation Engine [160]. Directive [152] advances to Reconciliation Engine [160] without modification. Routing Engine [150] does not issue state-commit instructions, verify execution, or reconcile execution results. In the illustrated embodiment, directive propagation concludes prior to reconciliation.

Functional Role

Routing Engine [150] provides directive issuance and propagation within the canonical enforcement chain [190]. Routing Engine [150] does not generate authorization tokens, compute behavioral or contextual scores, or override execution state determined by the Authorization Engine [140]. Routing Engine [150] enforces canonical path discipline by accepting inputs only from Authorization Engine [140] and providing outputs exclusively to Reconciliation Engine [160].

Figure 5:
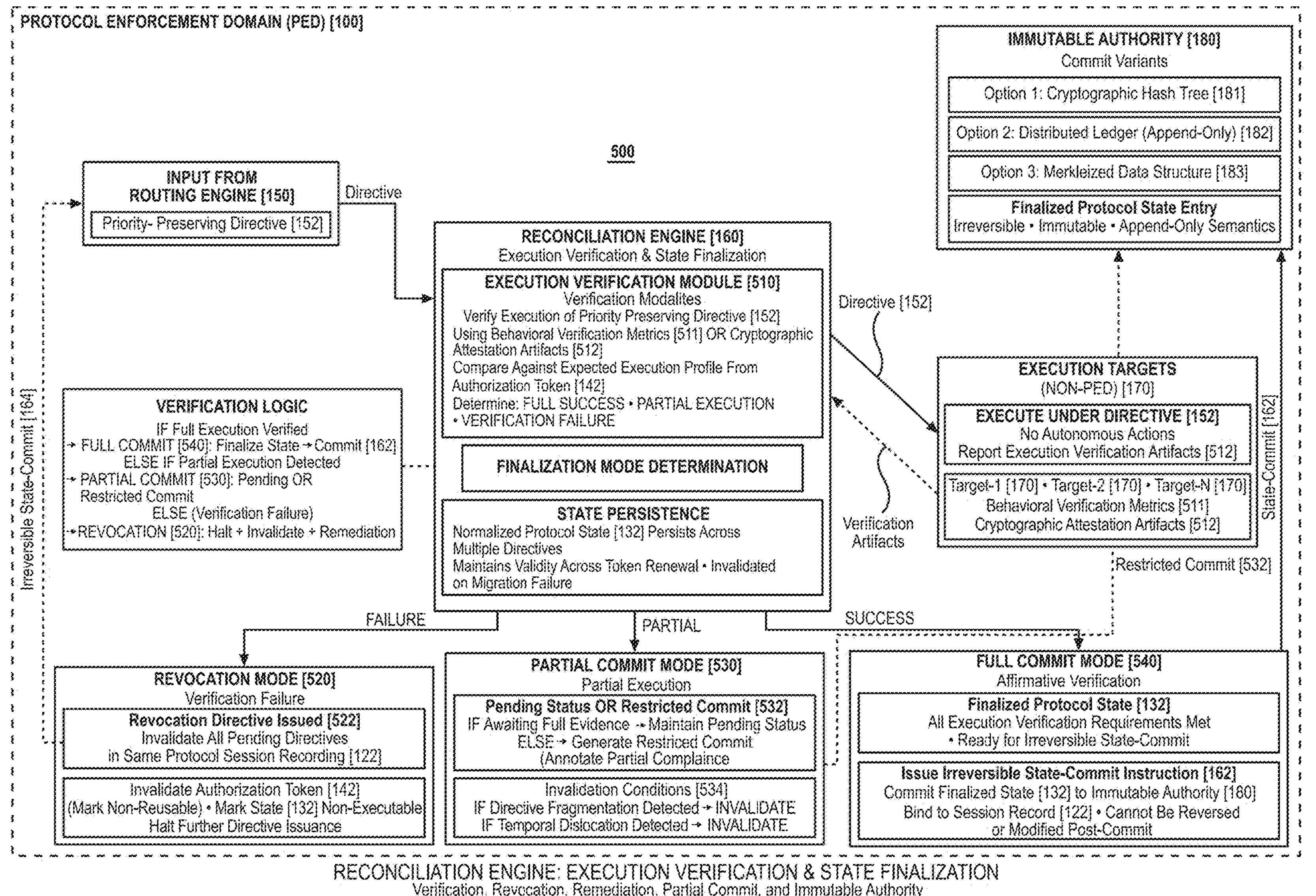
FIG. 5 illustrates a block diagram showing a reconciliation engine execution verification and state-finalization processes, according to aspects of embodiments of the present invention.

Referring now to FIG. 5, a block diagram 500 illustrating Reconciliation Engine [160] execution verification and state-finalization processes, is shown according to aspects of embodiments of the present invention. In aspects of embodiments of the present invention, execution events may be verified, and a finalization mode is selected from full commit, partial commit, or revocation. Reconciliation engine [160] issues an irreversible state-commit instruction to an immutable authority, thereby closing the enforcement loop without requiring delegated negotiation.

In an aspect of an embodiment of the present invention, Reconciliation Engine [160] may be configured to verify execution associated with a previously issued directive, determine a finalization mode, and issue an irreversible state-commit instruction [162] to an Immutable Authority [180]. Reconciliation Engine [160] forms a terminal stage of the canonical enforcement chain [190] within Protocol Enforcement Domain (PED) [100].

In certain aspects of embodiments of the present invention, issuance of the Irreversible State-Commit [162] further results in computation of State Hash [164]. State Hash [164] comprises a cryptographic digest generated over at least Finalized Protocol State [132] and/or Irreversible State-Commit instruction [162]. In some implementations, the digest may additionally incorporate Protocol Session Record [122], Authorization Token [142], Priority-Preserving Directive [152], temporal freshness artifacts [250] (FIG. 2), nonce values [252] (FIG. 2), and related verification metadata. State Hash [164] may be recorded within or anchored to Immutable Authority [180], thereby binding the finalized execution outcome into the append-only, tamper-evident record structure.

Input to Reconciliation Engine

Reconciliation Engine [160] receives a Priority-Preserving Directive [152] from Routing Engine [150]. Reconciliation Engine [160] accepts no lateral ingress from non-protocol entities [110], no downstream state from execution targets [170], and no re-ingress from engines outside canonical enforcement chain [190].

Execution Verification Module

Reconciliation Engine [160] includes an Execution Verification Module [510]. Execution Verification Module [510] receives execution evidence corresponding to the directive delivered to one or more execution targets [170]. Execution Verification Module [510] determines whether execution results satisfy predetermined verification conditions. Execution Verification Module [510] does not generate authorization tokens, alter directives, or perform inference on execution outcomes.

Verification Metrics [511] comprise deterministic execution evaluation signals generated during post-directive execution analysis by Execution Verification Module [510]. Verification Metrics [511] may include quantitative and cryptographically verifiable indicators confirming whether execution targets [170] performed Priority-Preserving Directive [152] in accordance with constraints encoded within Authorization Token [142]. Such metrics may include execution completeness indicators, constraint adherence validation results, sequence integrity confirmations, timing compliance data, and governance constraint satisfaction signals. Verification Metrics [511] do not infer performance quality, behavioral desirability, or probabilistic outcomes; rather, they deterministically confirm whether required execution parameters were satisfied exactly as encoded within the authorization artifact. Identical execution evidence evaluated against identical token constraints yields identical Verification Metrics [511] outputs.

Attestation Artifacts [512] comprise cryptographically bound execution evidence generated by Execution Targets [170] and provided to Execution Verification Module [510] for validation. Attestation Artifacts [512] may include cryptographic signatures, signed execution receipts, hash-based output digests, secure enclave attestations, timestamped execution proofs, hardware-rooted integrity statements, or comparable cryptographic provenance structures. Each Attestation Artifact [512] is bound to the associated Authorization Token [142], Governance Directive [152], and Protocol Session Record [122], preventing substitution, replay, or cross-session injection. Attestation Artifacts [512] do not independently determine finalization status; rather, they serve as immutable evidentiary inputs evaluated deterministically by Reconciliation Engine [160].

Finalization Mode Determination

Based on the output of Execution Verification Module [510], Reconciliation Engine [160] performs a finalization mode determination. In the illustrated embodiment, the Reconciliation Engine [160] determines one of three finalization modes: a Revocation Mode [520], a Partial Commit Mode [530], or a Full Commit Mode [540].

Revocation Mode (Verification Failure)

When the execution evidence fails to satisfy the verification conditions, Reconciliation Engine [160] selects Revocation Mode [520]. Under Revocation Mode [520], Reconciliation Engine [160] issues a revocation directive. The revocation directive halts protocol execution and prevents further processing associated with the directive. Reconciliation Engine [160] may record the revocation event with Immutable Authority [180].

Partial Commit Mode (Pending or Restricted)

When the execution results satisfy the verification conditions in part, or when remediation is required, Reconciliation Engine [160] selects Partial Commit Mode [530]. Under Partial Commit Mode [530], Reconciliation Engine [160] issues a restricted state-commit instruction [532]. Restricted state-commit instruction [532] may record that execution is incomplete, partially fulfilled, or subject to remediation. The restricted state-commit instruction does not confer the same execution finality as Full Commit Mode [540].

Restricted Commit [532] comprises a state-recording instruction issued under Partial Commit Mode [530], reflecting that execution has occurred in a limited, incomplete, or conditionally satisfied manner. Restricted Commit [532] records that execution did not meet all criteria required for Irreversible State-Commit [162], but sufficient verification conditions were satisfied to preserve a non-finalized governance state. Restricted Commit [532] does not confer irreversible finality and does not represent completion of canonical enforcement chain [190]. Instead, it records an intermediate governance condition, which may include throttled authority, capped execution scope, deferred completion, or remediation-required status. Restricted Commit [532] may be subsequently superseded by Irreversible State-Commit [162] upon satisfaction of additional verification requirements.

Invalidation Conditions [534] comprise deterministic criteria evaluated during Partial Commit Mode [530] or execution verification analysis that require protocol state invalidation. Invalidation Conditions [534] may include detection of directive fragmentation, temporal dislocation relative to Temporal Freshness Artifact [250], inconsistent attestation artifacts, replay attempts, conflicting cryptographic bindings, or structural ordering violations within canonical enforcement chain [190]. Upon satisfaction of any Invalidation Condition [534], Reconciliation Engine [160] invalidates the affected protocol state, prevents issuance of Irreversible State-Commit [162], and may initiate Revocation Mode [520] where required. Invalidation Conditions [534] operate deterministically and do not rely on probabilistic assessment or discretionary override.

Full Commit Mode (Affirmative Verification)

When execution results satisfy all verification conditions, Reconciliation Engine [160] selects Full Commit Mode [540]. Under Full Commit Mode [540], Reconciliation Engine [160] issues an Irreversible State-Commit [162]. Irreversible State-Commit [162] finalizes the protocol execution event associated with the directive.

Execution Targets

Execution Targets [170] receive the Priority-Preserving Directive [152] and independently perform the execution associated with the directive. Execution Targets [170] do not generate authorization tokens, modify priority, or submit downstream directives. Execution Targets [170] provide execution evidence used by Execution Verification Module [510]. Execution Targets [170] do not resolve finalization states.

Immutable Authority

Reconciliation Engine [160] anchors the finalization outcome by providing Irreversible State-Commit [162] to Immutable Authority [180]. The anchoring operation cryptographically binds the finalization outcome to the protocol session record and the normalized protocol state, ensuring that the complete governance lineage remains verifiable and tamper-evident. Immutable Authority [180] records Irreversible State-Commit [162] in an immutable data structure. In the illustrated embodiment, Immutable Authority [180] may implement a cryptographic hash tree, a distributed ledger, a merkle-based data structure, or an append-only commitment log. Immutable Authority [180] does not provide authorization, routing, or directive issuance, and serves exclusively as the terminal anchoring point for finalization outcomes generated by the reconciliation stage.

Protocol Finalization

Reconciliation Engine [160] performs execution verification and finalization in a manner that does not modify Authorization Token [142], alter Priority-Preserving Directive [152], or re-evaluate boundary conditions determined by Authorization Engine [140]. Reconciliation Engine [160] terminates the canonical enforcement chain [190] by issuing Irreversible State-Commit [162] to Immutable Authority [180].

Functional Role

Reconciliation Engine [160] provides deterministic execution verification and state finalization for canonical enforcement chain [190]. Reconciliation Engine [160] does not perform probabilistic evaluation, does not infer execution quality, and does not delegate verification responsibility to execution targets [170] or third-party entities. Finalized state is preserved by Immutable Authority [180] and is not modifiable by engines internal or external to Protocol Enforcement Domain [100].

Figure 6:
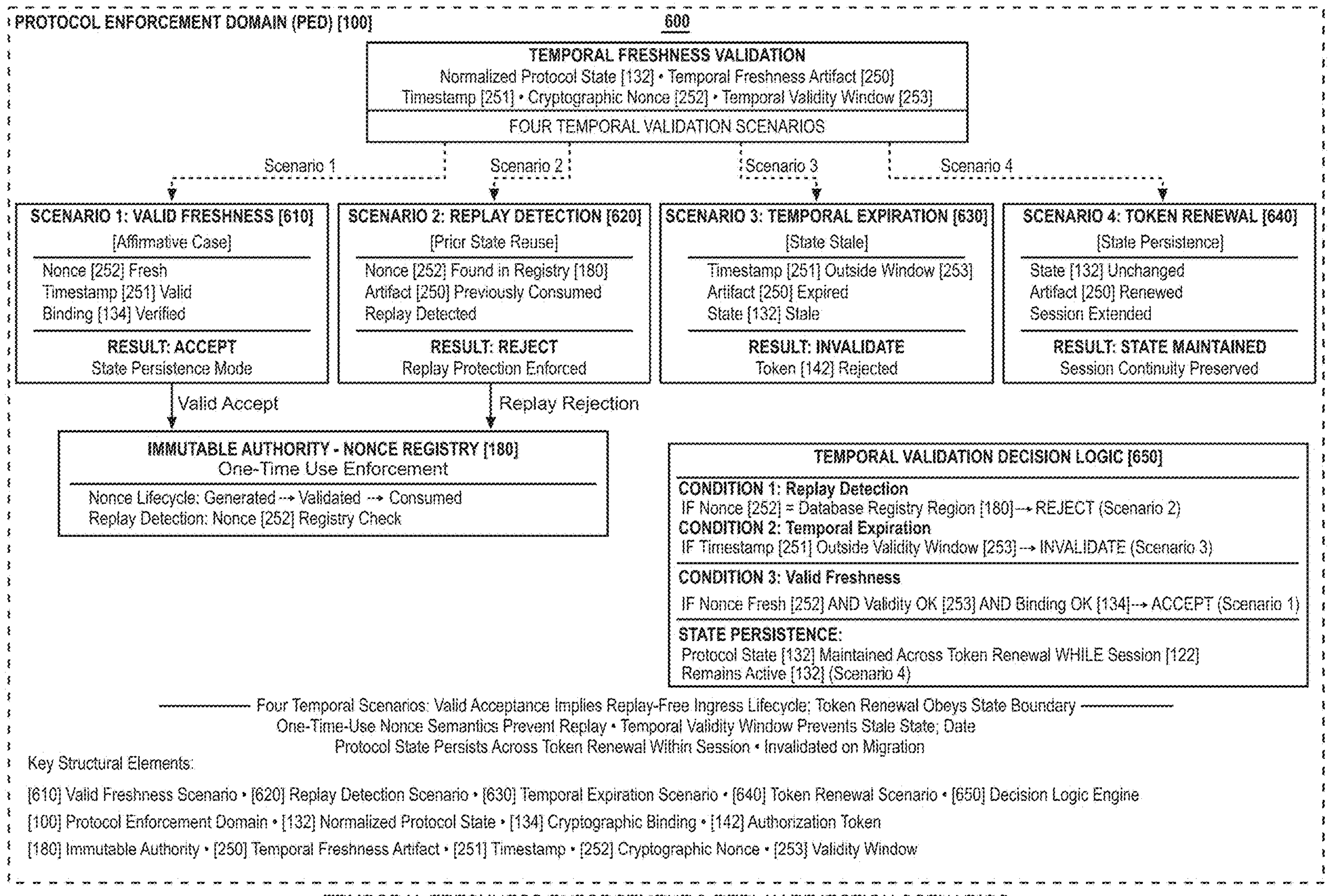
FIG. 6 illustrates a block diagram showing a temporal freshness enforcement and replay rejection, according to aspects of embodiments of the present invention.

Referring now to FIG. 6, a Protocol Enforcement Domain (PED) [100] showing a temporal freshness enforcement and replay rejection, is shown according to aspects of embodiments of the present invention. As shown in FIG. 6, four (4) temporal validation scenarios are shown: valid freshness, replay detection, temporal expiration, and token renewal. Each scenario triggers a corresponding decision path and immutable authority interaction pattern to prevent reuse or manipulation of expired qualification or authorization artifacts.

FIG. 6 illustrates the temporal freshness enforcement and replay rejection mechanisms implemented within Protocol Enforcement Domain (PED) [100], depicting four deterministic temporal validation outcomes executed against protocol state artifacts. The temporal validation sequence operates on Normalized Protocol State [132] produced by the qualification state engine and evaluates Temporal Freshness Artifacts comprising nonce [252], cryptographic timestamp [251], and temporal validity window [253].

Temporal validation occurs prior to authorization evaluation and determines whether protocol state may continue along the canonical enforcement chain or must be rejected based on freshness failure, replay detection, or expiration conditions. Temporal validation is deterministic: identical artifacts evaluated against identical temporal conditions produce identical validation outcomes.

Scenario 1—Valid Freshness

In Scenario 1 [610], nonce [252] is absent from nonce registry [180], timestamp [251] falls within temporal validity window [253], and cryptographic binding [134] verifies. All freshness requirements satisfied; artifact [250] accepted; canonical enforcement chain continues. The resulting system state corresponds to State Persistence Mode, wherein the session remains valid without modification.

Scenario 2—Replay Detection

Scenario 2 [620] depicts detection of a replay attempt. Nonce [252] is found in Immutable Authority nonce registry [180] and is previously consumed. Nonce lifecycle enforcement is strict and single-use; artifact [250] rejected. Outcome: Replay Protection Enforced, terminating protocol progression. No authorization token generated; no routing or reconciliation operations invoked.

Scenario 3—Temporal Expiration

Scenario 3 [630] depicts expiration of a previously valid artifact. Timestamp [251] exceeds temporal validity window [253]; Normalized Protocol State [132] is no longer temporally valid. Artifact [250] expires regardless of nonce reuse status. System action: Invalidate; any associated token [142] rejected. No state continuation, renewal, or degradation permitted unless separately initiated upstream.

Scenario 4—Token Renewal

Scenario 4 [640] represents a renewal condition wherein artifact [250] remains unchanged, authorization remains valid, and session continuity requirements are satisfied. Timestamp [251] renewed within permitted renewal boundary, generating fresh temporal validity window [253]. State [132] persists; authorization context remains uninterrupted. Resulting condition: State Maintained, enabling continued execution without requiring re-qualification or re-authorization.

Token renewal eligibility is computed exclusively by deterministic rule-based evaluation against predefined renewal thresholds and does not rely on statistical inference, adaptive optimization, or runtime discretionary policy.

Temporal Validation Decision Logic

The temporal validation decision logic [650] evaluates conditions in the following deterministic precedence:

Nonce [252] present in registry [180]—REJECT (Scenario 2 [620])

Timestamp [251] exceeds validity window [253]—INVALIDATE (Scenario 3 [630])

Timestamp [251] renewable without altering state [132]—RENEW (Scenario 4 [640])

Otherwise—ACCEPT (Scenario 1 [610])

This evaluation is deterministic: identical temporal freshness artifacts [250] evaluated against identical registry state [180] and validity criteria [253] produce identical validation outcomes across all execution contexts.

Immutable Authority Enforcement

Immutable Authority [180] maintains nonce lifecycle enforcement and append-only verification of replay detection events. Nonces are generated, validated, consumed, and committed, ensuring one-time-use guarantee. Replay detection events recorded as immutable entries. Revocation or fraud attempts always reflected through additional append operations rather than modification or deletion, preserving full temporal audit lineage.

Protocol Significance

Deterministic temporal validation prevents artifact reuse, manipulation, or reintroduction outside permitted lifecycle [253]. The validation decision logic [650] enforces:

Replay prevention via nonce registry [180] single-use consumption

Session-layer temporal integrity via timestamp validation [251] against validity window [253]

State persistence across valid renewals via renewal eligibility determination

Immutable auditability via append-only recording [180] of rejected or expired artifacts This establishes a non-bypassable temporal boundary at the OSI Layer 5 governance substrate.

Unlike conventional session timeout mechanisms that permit replay within validity windows, the disclosed temporal validation enforces single-use nonce consumption [252] preventing replay even of temporally valid artifacts. This architectural distinction eliminates the class of attacks where adversaries capture and replay valid credentials before expiration—a vulnerability inherent in timestamp-only validation schemes.

Temporal validation directly implements certain aspects of embodiments of the present invention, including the following elements:

"replay rejection as an architectural prerequisite executed by the qualification state engine, wherein protocol artifacts cryptographically bound to previously-consumed nonces are prevented from progressing through the canonical enforcement chain"

"deterministic temporal verification performed prior to authorization evaluation, wherein identical temporal freshness artifacts evaluated against identical nonce registry state produce identical validation outcomes"

"append-only recording of replay detection events to an Immutable Authority, wherein nonce consumption is irreversibly committed preventing subsequent reuse"

The temporal validation decision logic [650] operates as a protocol-layer enforcement mechanism independent of application-layer session management, transport-layer connection state, or network-layer routing decisions, establishing temporal freshness as a foundational governance primitive at the session layer (OSI Layer 5 boundary).

Implementation Notes

In one embodiment, temporal validity window [253] is 300 seconds, providing sufficient operational margin while preventing extended replay windows. In another embodiment, nonce registry [180] implements probabilistic data structures (Bloom filters) for space-efficient replay detection across billions of concurrent sessions. In yet another embodiment, timestamp [251] is obtained from RFC 3161-compliant Time Stamp Authority (TSA) providing cryptographic proof of temporal ordering independent of local system clocks.

The four-scenario validation framework [610, 620, 630, 640] covers the complete outcome space for temporal validation: accept, reject, invalidate, and renew. No additional scenarios exist; all temporal validation outcomes map deterministically to one of these four states. This completeness property ensures that temporal validation is both exhaustive (all cases covered) and exclusive (no overlapping outcomes), satisfying formal verification requirements for deterministic protocol execution.

Technical Limitations of Existing Systems

Existing digital systems commonly apply access control at the identity or credential validation layer and do not govern execution behavior through deterministic behavioral qualification at the protocol session boundary. These systems verify that a requesting actor possesses valid credentials but do not derive authorization from normalized behavioral qualification vectors reflecting operational performance, trust metrics, or execution efficiency patterns.

In current architectures, identity validation is treated as a prerequisite event rather than an enforceable execution constraint. Once authentication is granted, execution proceeds based on application-level logic rather than a protocol-governed authorization state, allowing execution pathways to diverge, fork, or bypass intended sequencing rules without structural enforcement.

Existing access control frameworks lack cryptographic coupling between execution eligibility and execution authority. Execution may continue, repeat, route, replay, or mutate after authorization is granted, even if the conditions under which authorization was issued have expired or become invalid, resulting in a persistent gap between identity validation and execution governance.

Session tokens, signed messages, capability grants, or entitlement-based authorization systems enable request invocation but do not impose canonical sequencing constraints governing how execution must progress. These systems prevent unauthorized access but do not prevent authorized execution from occurring in unauthorized order, context, or temporal state.

Immutable ledgers and append-only audit logs provide post-execution traceability but operate as execution substrates rather than governance substrates. These systems record what occurred after execution completes but do not intercept, qualify, authorize, route, or govern execution requests before they are performed. They lack pre-execution behavioral qualification and do not enforce canonical sequencing of qualification, authorization, routing, and reconciliation as mandatory protocol-layer constraints.

Distributed workflow systems, orchestration frameworks, cloud routing platforms, and service execution controllers coordinate execution steps but do not guarantee irreversible sequencing or enforce non-bypassability at the protocol boundary. These systems rely on policy configurations rather than structural enforcement and permit conditional reordering, branching, or direct execution without qualification.

Service mesh architectures intercept service-to-service communications and enforce authorization policies but operate at the application layer (OSI Layer 7) rather than the session layer (OSI Layer 5). These systems authorize based on service identity or request attributes but do not derive authorization from behavioral qualification vectors comprising AI model performance metrics, autonomous agent behavioral patterns, or computational efficiency measurements. Further, service mesh enforcement may be bypassed through sidecar injection disablement, namespace exclusion labels, or direct pod-to-pod communication outside the mesh control plane, whereas session-layer enforcement at a protocol boundary is non-bypassable and structurally independent of application execution surfaces.

Machine-to-machine and autonomous agent interaction models rely on heuristic scoring, statistical trust indicators, confidence thresholds, or negotiated capability exchange. These approaches regulate behavior probabilistically rather than deterministically and do not derive normalized protocol state from AI model performance vectors, autonomous agent behavioral qualification metrics, or computational efficiency patterns. Such systems lack cryptographic binding between behavioral qualification results and execution authorization tokens, permitting execution decisions to diverge from observed behavioral patterns.

Replay protection mechanisms, nonce validation systems, and temporal expiration policies prevent reuse of stale execution state but do not enforce that execution must be preceded by qualification, authorization, routing, and reconciliation steps in an invariant order. These mechanisms restrict certain misuse conditions but do not define execution governance as a structural requirement.

Existing architectures do not ensure that every execution request originates from a valid session record, contains a cryptographically verifiable authorization artifact, complies with temporal freshness constraints, and progresses through a deterministic and non-reorderable routing and reconciliation sequence prior to irreversible state finalization.

As a result, execution authority in existing approaches is separable from execution governance. Systems may authenticate a requester but do not enforce structural coupling between authenticated identity, behavioral qualification, temporal validity, routing authority, and finalization sovereignty.

Existing systems that provide authorization, routing, or audit functionality operate at the application layer (OSI Layer 7), transport layer (OSI Layer 4), network layer (OSI Layer 3), or as platform-specific orchestration controls but do not enforce governance at the session layer (OSI Layer 5). Session-layer governance enables protocol state persistence across transport protocol transitions, network topology changes, and infrastructure migrations while maintaining execution authority continuity—a capability not provided by application-layer authorization systems or network-layer security controls.

No existing system enforces a canonical, non-reorderable sequence of qualification, authorization, routing, and reconciliation engines wherein each engine executes in an isolated context, receives inputs exclusively from its immediate predecessor, and architecturally rejects lateral invocation, bypass attempts, or execution parallelization. Existing multi-stage processing environments allow stage reordering, privilege escalation shortcuts, or parallel execution, whereas a non-addressable protocol enforcement domain with mandatory sequential progression renders such manipulation architecturally invalid.

Existing systems do not enforce deterministic ordering of execution decisions as a structural requirement of the protocol boundary. By contrast, the disclosed architecture requires execution eligibility, routing authority, and finalization state to remain cryptographically and sequentially coupled to canonical ordering at the session layer, such that no execution event may occur outside or ahead of its designated predecessor stage.

The disclosed invention addresses these limitations by providing a session-layer protocol governance substrate that enforces deterministic behavioral qualification, cryptographically coupled authorization tokens, mandatory canonical sequencing, and irreversible state finalization within a non-addressable protocol enforcement domain. This architecture ensures that execution authority cannot be separated from execution governance and that autonomous computational actors, including AI models, autonomous agents, and synthetic execution entities, operate under continuous protocol-layer control independent of application-layer logic or transport-layer configuration.

In contrast to existing authorization, orchestration, and governance mechanisms that rely on configurable policy enforcement or identity-based access control, the disclosed protocol-layer governance substrate enforces execution constraints structurally rather than conditionally. Because execution eligibility, sequencing, and finalization are bound to a non-addressable canonical enforcement chain operating at the session layer, governance behavior cannot be altered through configuration, policy updates, or application-layer logic without removing the system from the Protocol Enforcement Domain entirely. This architectural enforcement yields a computational control model that is invariant to deployment topology, infrastructure changes, and execution context, and therefore represents a concrete improvement in computer system operation.

Definitions

Definitions establish the mandatory architectural principles and non-negotiable operational constraints applicable to all embodiments of the disclosed system. The following definitions establish the architectural foundations of the protocol-layer governance substrate disclosed herein. These definitions apply throughout the specification and claims unless explicitly stated otherwise.

Definition 1—Protocol Enforcement Domain (Ped)

As used herein, the term Protocol Enforcement Domain (PED) refers exclusively to the governed execution environment in which the canonical enforcement chain operates. The PED comprises of the following: protocol interposition gateway, qualification state engine, authorization engine, routing engine, and reconciliation engine, with each executing only within a trusted, non-addressable boundary.

The PED is the sole environment permitted to create, modify, authorize, or finalize governed protocol state. All external communications enter only through the protocol interposition gateway; no lateral, direct, or bypass invocation pathways exist. Only PED components may emit final protocol outcomes, authorization tokens, or state-commit instructions.

The PED is not an application layer runtime, middleware system, workflow engine, machine learning inference system, policy framework, business logic processor, or configurable orchestration platform.

In various aspects of embodiments of the present invention, the PED may be implemented using at least one of: a hardware security module boundary, a trusted execution environment, a cryptographic isolation perimeter, a virtualization-enforced boundary, or a service mesh boundary operating at the session layer. When implemented using a hardware security module boundary, the PED executes within tamper-resistant hardware that enforces non-addressability through physical isolation. When implemented using a trusted execution environment, the PED operates within processor-enforced enclaves that prevent external observation or modification of enforcement chain execution. When implemented using a cryptographic isolation perimeter, the PED enforces boundary integrity through cryptographic attestation and verification rather than physical or logical separation. When implemented using a virtualization-enforced boundary, the PED operates within hypervisor-isolated execution contexts that prevent cross-boundary invocation. When implemented using a service mesh boundary, the PED intercepts communications at the session layer (OSI Layer 5) and enforces canonical enforcement chain sequencing through mesh-level control primitives operating below the application layer, distinct from application-layer service mesh implementations that operate at OSI Layer 7 for traffic management and observability purposes.

Definition 2—Non-Protocol Entity (NPE)

As used herein, the term Non-Protocol Entity (NPE) refers exclusively to any actor or system external to the PED that initiates communications subject to protocol evaluation. NPEs include, but are not limited to, human-operated clients, autonomous agents, AI model instances, applications, APIs, cloud services, microservices, IoT devices, edge nodes, and distributed systems.

NPEs cannot invoke internal engines, generate protocol state, issue directives, or finalize outcomes. Internal engine interfaces are non-addressable from external contexts and cannot be reached through credentials, configuration changes, privilege escalation, or delegation mechanisms.

An NPE is not a PED component and cannot become one. NPEs are not authenticated entities, trusted participants, or authorized users—they are external computational actors subject to mandatory protocol evaluation.

Definition 3—Physically Invalid

As used herein, the term physically invalid means that no execution pathway exists in the system architecture that can perform the attempted action.

A physically invalid action cannot be executed, bypassed, replayed, reordered, forged, or invoked—regardless of permissions, credentials, malicious sophistication, or adversarial techniques. Physical invalidity results from architectural constraints including interface non-addressability, capability gating requirements, execution isolation, predecessor-dependency enforcement, and cryptographic binding verification.

Physically invalid does not mean denied, blocked, unauthorized, restricted, rate-limited, or policy-violated. Physically invalid means architecturally impossible-no execution pathway exists.

Definition 4—Immutable Authority

As used herein, the term Immutable Authority refers exclusively to an append-only commitment mechanism that permanently records final protocol outcomes such that committed entries cannot be altered, erased, or overwritten.

To qualify as an Immutable Authority, a mechanism must enforce:

prevention of modification to committed records, cryptographic verification of record origin, inclusion proofs demonstrating record existence, and rejection of rewrite attempts using identical identifiers or bindings.

Permissible embodiments include append-only cryptographic hash logs, Merkle-tree anchored commit graphs, distributed ledgers, hardware trust stores with sealed storage (HSMs, TPMs, secure enclaves), WORM storage systems, and content-addressed storage.

The Immutable Authority is not a mutable database, queryable datastore, reversible audit log, version control system, configuration file, transactional database with rollback capability, or editable ledger.

Definition 5—Canonical Enforcement Chain

As used herein, the term Canonical Enforcement Chain refers exclusively to the mandatory, non-reorderable execution sequence consisting of: gateway→qualification→authorization→routing→reconciliation.

Each engine accepts input only from its immediate predecessor and produces output only for its immediate successor. No engine accepts input from NPEs, external systems, downstream engines, or lateral channels. The sequence cannot be bypassed, reordered, shortened, parallelized, extended, or modified through configuration, runtime parameters, or administrative privileges.

Non-reorderability is enforced through interface isolation, capability-based progression requiring cryptographic proofs from predecessor engines, cryptographic chaining binding outputs to inputs, and execution context isolation preventing cross-engine communication except through defined predecessor-successor interfaces. No component of the canonical enforcement chain may be substituted, virtualized, or functionally emulated by application-layer logic, policy engines, or external services while still being considered part of the Protocol Enforcement Domain; any such substitution places the substituted component outside the PED and outside the scope of the canonical enforcement chain."

The Canonical Enforcement Chain is not a configurable workflow, pluggable rules engine, reorderable processing pipeline, orchestration policy, business process framework, or event-driven architecture.

Definition 6—OSI Layer 5 Boundary

As used herein, the term OSI Layer 5 Boundary refers exclusively to the session-layer positioning of the protocol-layer governance substrate, operating between transport protocols (Layer 4) and application logic (Layer 6-7).

At the OSI Layer 5 boundary, the governance substrate establishes, maintains, and terminates protocol sessions while remaining independent of transport implementations (TCP, UDP, QUIC, HTTP/2, gRPC) and application semantics (business rules, domain logic, payload contents). Protocol state persists across transport interruptions, network failures, and infrastructure migrations through cryptographic session bindings independent of lower-layer connection state.

The governance substrate operates exclusively at OSI Layer 5 and does not perform network routing (Layer 3), transport-level operations (Layer 4), presentation formatting (Layer 6), or application-layer processing (Layer 7). The substrate is not a network router, load balancer, API gateway, application server, or business logic engine.

Definition 7—Protocol Session Record (PSR)

As used herein, the term Protocol Session Record (PSR) refers exclusively to a cryptographically bound session artifact generated by the protocol interposition gateway upon admission of an NPE communication into the PED.

A PSR comprises: an ingress identifier (excluding PI or human identity attributes), session scope parameters (temporal bounds, protocol version, execution context), cryptographic session binding preventing forgery, replay, or modification, and gateway attestation enabling downstream verification.

The PSR establishes session identity and serves as the cryptographic anchor for all subsequent protocol state derivation, authorization, and finalization. The PSR cannot be reused, replicated, modified, or substituted across different sessions.

A PSR is not a metadata log entry, network packet header, HTTP cookie, JWT, OAuth token, session cookie, authentication credential, user profile, or application session object.

Definition 8—Protocol Boundary Conditions

As used herein, Protocol Boundary Conditions refer exclusively to predetermined, deterministic requirements that must be satisfied by normalized protocol state before execution may proceed.

Boundary conditions include, but are not limited to, cryptographic integrity verification, temporal validity confirmation, behavioral qualification sufficiency, AI model performance thresholds, autonomous agent trust scores, resource availability constraints, and anomaly-resilience requirements.

Boundary condition evaluation by the authorization engine is deterministic: identical normalized protocol state evaluated against identical boundary conditions produces identical authorization outcomes (pass, fail, or degrade). No probabilistic evaluation, statistical inference, heuristic scoring, or adaptive learning is performed during boundary condition resolution.

Protocol Boundary Conditions are not optimization rules, machine learning models, heuristic scoring functions, risk assessment algorithms, adaptive policies, business rules, access control lists, quality-of-service parameters, or predictive classifiers. Boundary conditions do not perform inference, prediction, optimization, or statistical evaluation—they are deterministic pass/fail criteria evaluated through mathematical comparison.

Tier-2 definitions describe the five engines of the canonical enforcement chain and the three protocol artifacts they generate. Each engine operates exclusively within the PED and accepts input only from its immediate predecessor.

Definition 9—Protocol Interposition Gateway

As used herein, the term Protocol Interposition Gateway refers exclusively to the sole ingress component of the canonical enforcement chain that receives NPE communications and generates Protocol Session Records.

The Protocol Interposition Gateway performs:

ingress validation of NPE communications,

Protocol Session Record (PSR) generation with cryptographic session binding, exclusive forwarding to the qualification state engine.

No NPE communication can reach internal engines without traversing the gateway. The gateway does not perform authorization, routing, or finalization. Rejected communications do not result in PSR generation and do not progress to downstream engines. The Protocol Interposition Gateway is not an API gateway, load balancer, reverse proxy, traffic router, firewall, or application-layer request handler.

Definition 10—Qualification State Engine

As used herein, the term Qualification State Engine refers exclusively to the second component in the canonical enforcement chain that derives normalized protocol state from qualification vectors and applies cryptographic bindings.

The Qualification State Engine:

receives Protocol Session Records exclusively from the gateway, decomposes qualification vectors (AI model performance, agent behavioral, computational efficiency, trust qualification), performs deterministic normalization producing Normalized Protocol State, applies cryptographic bindings and temporal freshness artifacts, rejects stale, expired, or replayed protocol states, forwards Normalized Protocol State exclusively to the authorization engine.

Normalization is deterministic: identical qualification vectors and identical PSR produce identical Normalized Protocol State. The engine does not perform statistical inference, probabilistic evaluation, or heuristic scoring.

The Qualification State Engine is not a scoring system, analytics engine, predictive model, machine learning classifier, or optimization function.

Definition 11—Authorization Engine

As used herein, the term Authorization Engine refers exclusively to the third component in the canonical enforcement chain that evaluates protocol boundary conditions and generates authorization tokens.

The Authorization Engine:

receives Normalized Protocol State exclusively from the qualification state engine, evaluates predetermined protocol boundary conditions deterministically, determines authorization state (pass, fail, or degrade), generates Authorization Tokens for pass/degrade states with cryptographic binding to Normalized Protocol State and PSR, forwards Authorization Tokens exclusively to the routing engine.

When authorization state is fail, no token is generated and protocol execution terminates. Authorization evaluation is deterministic: identical Normalized Protocol State and identical boundary conditions produce identical authorization outcomes.

The Authorization Engine is not a policy engine, access control system, permission manager, firewall rule evaluator, identity provider, or role-based access control (RBAC) framework.

Definition 12—Routing Engine

As used herein, the term Routing Engine refers exclusively to the fourth component in the canonical enforcement chain that generates priority-preserving directives and selects propagation topology.

The Routing Engine:

receives Authorization Tokens exclusively from the authorization engine, generates Priority-Preserving Directives encoding execution instructions, target addressing, and authorization state, selects propagation topology (unicast, multicast, broadcast, or hierarchical), issues immutable directives that preserve authorization constraints and session continuity, forwards directives exclusively to the reconciliation engine.

Directives are immutable once issued: execution targets cannot modify directive contents, execution priority, or authorization state. The Routing Engine does not re-authorize, re-evaluate, or accept lateral updates from execution targets.

The Routing Engine is not a load balancer, traffic router, service mesh coordinator, orchestration framework, task scheduler, or workflow manager.

Definition 13—Reconciliation Engine

As used herein, the term Reconciliation Engine refers exclusively to the fifth and terminal component in the canonical enforcement chain that verifies execution results and issues irreversible state-commit instructions to the Immutable Authority.

The Reconciliation Engine:

receives Priority-Preserving Directives exclusively from the routing engine, verifies execution results from execution targets through cryptographic attestation, determines finalization mode (full commit, partial commit, or revocation), issues Irreversible State-Commit instructions to the Immutable Authority, records revocation or remediation directives as additional immutable entries when required.

Finalization mode determination is based on whether execution results satisfy verification conditions. Once an Irreversible State-Commit is issued, the protocol execution outcome is final and cannot be reversed, modified, or invalidated by any subsequent action within or outside the PED.

The Reconciliation Engine is not a transaction coordinator, consensus protocol, distributed state machine, workflow completion tracker, database commit manager, or compensating transaction framework.

Definition 14—Normalized Protocol State

As used herein, the term Normalized Protocol State refers exclusively to the canonical protocol state representation derived by the qualification state engine from session-associated qualification vectors.

Normalized Protocol State is formed through deterministic normalization of qualification vectors (AI model performance, autonomous agent behavioral, computational efficiency, trust qualification) and cryptographically bound to the Protocol Session Record and temporal freshness artifacts.

The Normalized Protocol State:

replaces underlying qualification vectors as the sole input to the authorization engine, is deterministic (identical vectors+identical PSR→identical state), operates at the protocol layer independent of application semantics, does not contain PII, user identity attributes, or application payload contents.

Normalized Protocol State is not a user profile, session context object, application state, domain-specific data structure, behavioral prediction, or machine learning output.

Definition 15—Authorization Token

As used herein, the term Authorization Token refers exclusively to the cryptographically bound authorization artifact generated by the authorization engine upon successful boundary condition evaluation.

An Authorization Token:

is generated only when Normalized Protocol State satisfies protocol boundary conditions, encodes authorization state (pass or degrade) and execution constraints, is cryptographically bound to Normalized Protocol State, PSR, and predecessor engine bindings, is non-delegable, non-fungible, and single-use, is consumed exclusively by the routing engine for directive generation.

Authorization Tokens inherit temporal validity from the Normalized Protocol State and cannot be transferred across sessions, reused for multiple directives, or modified by external entities.

An Authorization Token is not a bearer token, OAuth token, session cookie, API key, access credential, JWT, SAML assertion, or identity claim.

Definition 16—Priority-Preserving Directive

As used herein, the term Priority-Preserving Directive refers exclusively to the immutable execution directive generated by the routing engine that preserves authorization state, execution priority, and session continuity.

A Priority-Preserving Directive:

is generated by translating the Authorization Token into execution instructions, preserves authorization state (pass/degrade), execution priority, and session continuity, includes cryptographic attestation from the routing engine, is propagated via selected topology (unicast, multicast, broadcast, hierarchical), is immutable and cannot be modified, re-prioritized, or superseded by execution targets or external entities.

The directive is forwarded concurrently to both execution targets and the reconciliation engine, enabling verification independent of execution target cooperation.

A Priority-Preserving Directive is not a task, job, workflow step, message queue entry, API request, event notification, or orchestration command.

Definition 17—Governance Directive (Term Equivalence)

As used herein, the term Governance Directive is synonymous with and refers to the same protocol artifact as the Priority-Preserving Directive defined in Definition 16.

Throughout this specification and claims, the terms "Governance Directive" and "Priority-Preserving Directive" are used interchangeably to refer to the immutable execution directive generated by the routing engine. Both terms describe the identical protocol artifact with the following characteristics:

generated exclusively by the routing engine from a valid authorization token, preserves authorization state (pass/degrade), execution priority, and session continuity, cryptographically bound to the authorization token, normalized protocol state, and protocol session record, immutable once issued and cannot be modified, re-prioritized, or superseded by execution targets or external entities, propagated to execution targets via selected topology (unicast, multicast, broadcast, hierarchical), and forwarded concurrently to the reconciliation engine to enable independent verification.

The term "Governance Directive" emphasizes the directive's role in governing distributed computational actors and enforcing protocol-layer constraints. The term "Priority-Preserving Directive" emphasizes the directive's immutability and preservation of authorization state derived from upstream qualification and authorization processes.

Both terms refer to the same directive artifact. Where either term appears in this specification, the claims, dependent applications, continuations, divisionals, or any related patent documents, it refers exclusively to the immutable execution directive generated by the routing engine as described in Definition 16. The terms are equivalent and interchangeable for all purposes of claim interpretation.

A Governance Directive (synonymous with Priority-Preserving Directive) is not a task, job, workflow step, message queue entry, API request, event notification, orchestration command, or application-layer instruction.

Definition 18—AI Model Performance Vectors

As used herein, the term AI Model Performance Vectors refers exclusively to deterministic qualification indicators characterizing operational properties, accuracy characteristics, efficiency metrics, and trust attributes of AI model instances within a protocol session context.

AI Model Performance Vectors include:

1. model accuracy metrics (precision, recall, F1 scores, domain-specific accuracy from verified provenance),
2. inference efficiency indicators (cost per inference, latency, throughput, memory utilization),
3. model trust attributes (provenance verification, adversarial robustness, output consistency, attestation validity),
4. model versioning and currency (version identifiers, deprecation status, compatibility indicators).

AI Model Performance Vectors are deterministic: identical model instance and identical session context produce identical vectors. Vectors characterize model properties (what a model is), not predictions (what a model might do). Vectors do not include probabilistic predictions, adaptive scoring, runtime inference results, or dynamic performance optimization.

AI Model Performance Vectors are not model outputs, inference results, prediction scores, recommendation rankings, model selection policies, routing decisions, or optimization objectives.

Definition 19—Autonomous Agent Behavioral Vectors

As used herein, the term Autonomous Agent Behavioral Vectors refers exclusively to deterministic qualification indicators characterizing coordination capability, trust properties, resource requirements, and compliance history of autonomous AI agents within a protocol session context.

Autonomous Agent Behavioral Vectors include:

agent coordination capability (protocol compliance, conflict resolution, synchronization properties), agent trust scores (historical reliability, completion rate, error rate, behavioral consistency), resource requirement indicators (computational resources, execution duration estimates, cost descriptors), compliance history (policy adherence, safety constraint satisfaction, governance fulfillment).

Autonomous Agent Behavioral Vectors are deterministic: identical agent identifier and identical session context produce identical vectors. Vectors characterize demonstrated agent history (what an agent has done), not predictions (what an agent will do). Vectors are not derived using reward optimization, reinforcement learning, or policy gradients.

Autonomous Agent Behavioral Vectors are not agent outputs, task results, execution plans, coordination decisions, selection policies, task allocation algorithms, or workflow orchestration rules.

Definition 20—Computational Efficiency Metrics

As used herein, the term Computational Efficiency Metrics, also referred to as computational efficiency vectors, refers exclusively to deterministic qualification indicators characterizing resource consumption, execution performance, cost properties, and throughput characteristics of protocol sessions, AI model invocations, or autonomous agent executions. Throughout this specification and claims, the terms "Computational Efficiency Metrics" and "computational efficiency vectors" are used interchangeably to refer to the same category of deterministic qualification indicators.

Computational Efficiency Metrics include:

execution latency metrics (inference latency, coordination latency, end-to-end session latency), resource utilization indicators (CPU, memory, storage, network, accelerator utilization), throughput capacity (requests per second, transactions per second, concurrent execution capacity), cost-per-execution metrics (API costs, infrastructure costs, energy costs).

Computational Efficiency Metrics are deterministic: identical execution context and identical workload profile produce identical metrics. Metrics characterize observed or externally specified efficiency properties without algorithmic normalization, adaptive tuning, or forecasting.

Computational Efficiency Metrics are not resource allocation decisions, scheduling policies, optimization objectives, performance targets, workload predictions, capacity planning forecasts, or cost optimization recommendations.

Definition 21—Trust Qualification Vectors

As used herein, the term Trust Qualification Vectors refers exclusively to deterministic qualification indicators characterizing trustworthiness, integrity, robustness, and anomaly-resistance properties of AI models, autonomous agents, or execution contexts within a protocol session.

Trust Qualification Vectors include:

attestation validity indicators (cryptographic attestation verification, valid credentials from trusted authorities), adversarial robustness scores (input perturbation resistance, model extraction resistance, backdoor resistance), output consistency metrics (deterministic output behavior, version stability, temporal consistency), anomaly-resistance indicators (Sybil attack resistance, collusion resistance, behavioral spoofing resistance).

Trust Qualification Vectors are deterministic: identical entity identifier and identical verification context produce identical vectors. Vectors evaluate cryptographic and historical evidence without evaluating behavioral intent, subjective risk, or speculative harm forecasts.

Trust Qualification Vectors are not security policies, access control rules, risk assessments, threat intelligence, authentication decisions, authorization policies, or predictive security models.

Definition 22—Protocol-Layer Governance Primitive

As used herein, the term Protocol-Layer Governance Primitive refers exclusively to the deterministic, domain-agnostic qualification framework that unifies AI model arbitration, autonomous agent coordination, and distributed resource allocation into a single protocol-layer substrate operating at the OSI Layer 5 boundary.

The Protocol-Layer Governance Primitive:

operates through the canonical enforcement chain within the PED, transforms qualification vectors (Definitions 17-20) into deterministic authorization decisions through evaluation of protocol boundary conditions, unifies three governance functions: (a) AI model arbitration, (b) autonomous agent coordination, (c) distributed resource allocation, operates independently of application-layer business logic, transport-layer routing, presentation-layer formats, and identity-layer authentication, provides domain-agnostic governance applicable across heterogeneous AI models, autonomous agents, distributed services, and computational resources.

The Protocol-Layer Governance Primitive operates through deterministic qualification rather than heuristic scoring, probabilistic classification, or adaptive learning. Identical qualification vectors and identical boundary conditions produce identical authorization outcomes, ensuring reproducibility, verifiability, and non-manipulability.

By operating at the OSI Layer 5 boundary, the Protocol-Layer Governance Primitive provides universal session-layer governance comparable to foundational infrastructure protocols (TLS/SSL, OAuth 2.0, QUIC, BGP).

The Protocol-Layer Governance Primitive is not an AI model, machine learning system, optimization framework, decision algorithm, policy engine, rule interpreter, business logic executor, scoring system, or application-layer governance framework.

Definition 23—Behavioral Qualification Score (BQS)

As used herein, the term Behavioral Qualification Score (BQS) refers to a deterministic protocol-layer representation derived from Normalized Protocol State [132] formed by Qualification State Engine [130]. The BQS reflects the qualification outcome associated with a governed computational actor based solely on deterministic evaluation of one or more qualification vector categories as described in Definitions 17-20.

The BQS does not modify Normalized Protocol State [132], perform inference, prediction, behavioral analysis, statistical scoring, optimization, or ranking. Instead, the BQS provides a protocol-layer abstraction that enables unified governance across heterogeneous actors, including AI models, autonomous agents, and distributed computational systems.

When referenced as a governance primitive, the BQS is used to enable deterministic authorization, routing, and reconciliation within the canonical enforcement chain. The BQS does not evaluate identity, intent, or probabilistic likelihood of behavior.

A Behavioral Qualification Score is not a trust score, reputation score, risk score, confidence score, behavioral profile, or predictive assessment.

Definition 24—Deterministic Qualification Framework

As used herein, the term Deterministic Qualification Framework refers exclusively to the methodological foundation ensuring protocol state derivation, authorization evaluation, and directive issuance produce identical outcomes for identical inputs regardless of execution timing, platform topology, or deployment environment.

The Deterministic Qualification Framework enforces:

input determinism (identical NPE communications+identical PSRs→identical session bindings), normalization determinism (identical qualification vectors+identical PSRs→identical Normalized Protocol State), authorization determinism (identical Normalized Protocol State+identical boundary conditions→identical authorization outcomes), routing determinism (identical Authorization Tokens+identical topology criteria→identical directives), reconciliation determinism (identical directives+identical execution results→identical finalization modes).

The framework eliminates non-deterministic sources including probabilistic inference, heuristic evaluation, external signal injection, adaptive learning, and timing-dependent behavior.

Determinism enables independent verification: external verifiers can reconstruct qualification vectors, evaluate against published boundary conditions, and verify that authorization outcomes match committed records in the Immutable Authority-without requiring access to internal PED state or proprietary governance logic.

The Deterministic Qualification Framework is not a constraint on protocol flexibility or extensibility. The framework does not employ probabilistic scoring, machine learning classification, heuristic evaluation, adaptive algorithms, or statistical inference. Protocol-layer governance can be arbitrarily sophisticated while remaining deterministic.

Definition 25—Cryptographic Binding

As used herein, the term Cryptographic Binding refers exclusively to cryptographic mechanisms that associate two or more protocol artifacts such that modification of any bound artifact invalidates the binding relationship, enabling detection of unauthorized alteration, replay, or substitution.

Cryptographic bindings may be implemented through:

cryptographic hash linking (successor artifacts contain hash of predecessor), digital signature chaining (successor artifacts contain signature over predecessor), message authentication code (MAC) linking (MAC over predecessor included in successor), content addressing (artifacts addressed by cryptographic hash of contents), Merkle tree inclusion proofs (predecessors in Merkle tree, successors reference tree positions).

Cryptographic bindings provide tamper evidence, replay prevention, substitution prevention, and architectural enforcement-transforming architectural dependencies into cryptographic dependencies.

Within the canonical enforcement chain, cryptographic bindings enforce:

PSRs→ingress communications (by gateway),

Normalized Protocol State→PSRs (by qualification engine),

Authorization Tokens→Normalized Protocol State (by authorization engine),

Priority-Preserving Directives→Authorization Tokens (by routing engine),

Irreversible State-Commits→Priority-Preserving Directives (by reconciliation engine).

Cryptographic Binding is not application-level data validation, schema enforcement, referential integrity checking, foreign key constraints, or database relationships.

Definition 26—Temporal Freshness Artifact

As used herein, the term Temporal Freshness Artifact refers exclusively to cryptographically bound temporal indicators included in protocol artifacts to constrain temporal validity and prevent replay of stale protocol state across different time windows.

Temporal Freshness Artifacts include:

cryptographic timestamps (digitally signed timestamps from trusted time authority), cryptographic nonces (unique, unpredictable values ensuring distinct session bindings), validity windows (time ranges cryptographically bound to artifact contents), sequence numbers (monotonically increasing counters enforcing temporal ordering), temporal hash chains (hash chains with timestamps creating verifiable temporal ordering).

Temporal Freshness Artifacts prevent:

stale state replay (expired protocol states rejected), cross-session replay (nonces ensure session-specific bindings), future-dated replay (timestamp authorities only sign current time), out-of-order replay (sequence numbers enforce correct ordering).

The qualification state engine and authorization engine verify temporal freshness before performing state normalization and authorization evaluation.

Temporal Freshness Artifacts are not session cookies, cache expiration headers, TTL (time-to-live) values, HTTP date headers, or application-layer timeout parameters.

Definition 27—Cryptographic Attestation

As used herein, the term Cryptographic Attestation refers exclusively to cryptographic mechanisms through which an engine provides verifiable evidence that it produced a specific protocol artifact, enabling downstream engines and external verifiers to authenticate artifact origin without requiring access to internal engine state.

Cryptographic attestations may be implemented through:

digital signatures (engine signs artifact with private key), message authentication codes (MACs) (engine generates MAC with shared secret), hardware attestation (hardware-backed proofs from TPM, SGX, TrustZone), threshold signatures (multiple engines collectively produce signature), zero-knowledge proofs of computation (proof of correct computation without revealing state).

Cryptographic attestations provide origin authentication, non-repudiation, integrity protection, and forgery prevention—enabling verification without requiring verifiers to trust internal engine operation.

Each engine in the canonical enforcement chain produces cryptographic attestations over its output artifacts, enabling successor engines to verify input origin and external verifiers to validate protocol execution from immutable records.

Cryptographic Attestation is not application-level logging, audit trails, provenance metadata, digital watermarking, or self-reported execution records.

Definition 28—Replay Rejection

As used herein, the term Replay Rejection refers exclusively to architectural enforcement mechanisms wherein protocol artifacts cryptographically bound to session-specific temporal indicators cannot progress through the canonical enforcement chain if they cannot prove freshness.

Replay Rejection defends against:

stale state replay (reusing old protocol states that no longer meet current boundary conditions), cross-session replay (replaying valid states from different sessions), parallel session replay (using same protocol state across multiple concurrent sessions), fragment replay (combining fragments from multiple prior sessions).

Replay Rejection is enforced through:

nonce verification (qualification engine verifies nonces have not been previously used), timestamp validation (qualification engine verifies timestamps within acceptable freshness bounds), sequence number checking (qualification engine verifies strictly increasing sequence progression), session binding verification (qualification engine verifies artifacts bound to current PSR), cryptographic binding validation (qualification engine verifies binding consistency).

Replay Rejection requires the qualification state engine to maintain freshness verification state including nonce registry, session identifier registry, sequence number state, and temporal validity state—with expired entries periodically purged.

Replay Rejection is not idempotency enforcement, duplicate request filtering, fraud detection heuristics, application-level deduplication, or caching logic.

Definition 29—Cryptographic Hash Chain

As used herein, the term Cryptographic Hash Chain refers exclusively to tamper-evident data structures wherein each entry includes the cryptographic hash of the prior entry, creating an append-only sequence where modification or removal of any entry is cryptographically detectable.

A cryptographic hash chain consists of entries containing:

entry data (protocol artifact or state-commit instruction being recorded), previous hash (cryptographic hash of complete prior entry), entry metadata (timestamp, sequence number, entry identifier), entry hash (cryptographic hash of complete current entry, becomes “previous hash” for next entry).

Cryptographic hash chains provide:

append-only enforcement (new entries added only to chain end), modification detection (any change invalidates subsequent hashes), deletion detection (removal creates detectable gap), truncation detection (if external verifiers maintain chain tail copies), efficient verification (recompute hashes from genesis forward).

Within the protocol-layer governance substrate, cryptographic hash chains serve as foundational data structure for Immutable Authorities implementing tamper-evident protocol finalization records.

A Cryptographic Hash Chain is not a distributed ledger, blockchain, database transaction log, version control system, or event sourcing log.

Definition 30—Zero-Knowledge Proofs

As used herein, the term Zero-Knowledge Proofs refers exclusively to cryptographic protocols enabling one party (prover) to prove to another party (verifier) that a statement is true without revealing any information beyond the statement’s validity.

Zero-knowledge proofs provide completeness (true statements accepted), soundness (false statements rejected with negligible probability), and zero-knowledge (verifier learns nothing beyond statement truth).

Within the protocol-layer governance substrate, zero-knowledge proofs enable:

qualification verification without vector disclosure (prove vectors satisfy boundary conditions without revealing values), authorization validity without state disclosure (prove Authorization Token correctly generated without revealing protocol state), execution compliance without result disclosure (prove directive execution without revealing execution results), boundary condition verification without threshold disclosure (prove boundary conditions correctly applied without revealing specific thresholds), canonical chain integrity verification (prove artifacts derived correctly without revealing intermediate state).

Zero-knowledge proof systems may include zk-SNARKs, zk-STARKs, Bulletproofs, or Sigma protocols depending on implementation requirements.

Zero-Knowledge Proofs are not encryption, access control, confidentiality mechanisms, obfuscation, or data masking. Zero-knowledge proofs do not evaluate entity properties—they verify that deterministic protocol operations have been correctly applied.

Definition 31—Tamper-Evident

As used herein, the term Tamper-Evident refers exclusively to protocol artifacts or storage mechanisms wherein any unauthorized modification, deletion, or reordering produces cryptographically detectable evidence of tampering.

Tamper evidence is achieved through:

cryptographic hashing (artifacts include hashes; modification changes hash value), digital signatures (artifacts digitally signed; signature verification failure indicates tampering), hash chain linkage (artifacts linked in chains; modification invalidates subsequent entries), Merkle tree inclusion proofs (artifacts in Merkle trees; tampering detectable through proof verification), authenticated data structures (structures cryptographically commit to contents; tampering detectable).

Tamper evidence provides modification detection, deletion detection, insertion detection, reordering detection, and truncation detection (when external verifiers maintain artifact copies).

Within the protocol-layer governance substrate, tamper evidence applies to Protocol Session Records, Normalized Protocol State, Authorization Tokens, Priority-Preserving Directives, and Immutable Authority storage.

Tamper-Evident is not tamper-proof, tamper-resistant, intrusion prevention, access control, or encryption. Tamper-evident means tampering is cryptographically detectable, not that tampering is prevented.

Definition 32—Append-Only Semantics

As used herein, the term Append-Only Semantics refers exclusively to storage or data structure properties wherein new entries can be added but existing entries cannot be modified, deleted, or reordered.

Append-only semantics provides:

write permanence (written entries remain permanently), temporal ordering (entries ordered by append sequence), historical completeness (complete history retained without gaps), monotonic growth (storage size only increases).

Append-only semantics may be implemented through:

cryptographic hash chains (modification cryptographically detectable),

Merkle tree accumulation (new leaves added without modifying existing structure), Write-Once Read-Many (WORM) storage (hardware/firmware prevents overwriting), immutable log structures (all writes are appends, no in-place updates), blockchain or distributed ledger (consensus prevents unilateral modification).

Within the protocol-layer governance substrate, append-only semantics is the foundational property of Immutable Authorities. Once the reconciliation engine issues an Irreversible State-Commit to an Immutable Authority with append-only semantics, protocol state cannot be erased or rewritten.

Revocation is implemented through new append operations (revocation entries) rather than deletion of original entries, preserving complete audit trail while enabling remediation.

Append-Only Semantics is not backup storage, archival storage, version control, database snapshots, or audit logging. Append-only means modification and deletion operations are architecturally, cryptographically, or physically prevented—not merely discouraged or logged.

Tier-5 definitions describe operational entities, authorization outcomes, and finalization modes essential to protocol execution. Terms defined in Tier 1 are not repeated unless operational context requires clarification.

Definition 33—Non-Protocol Entity (NPE)

As used herein, the term Non-Protocol Entity (NPE) refers to the same meaning defined in Definition 2, and in operational context designates any computational actor initiating protocol sessions from outside the PED.

NPEs are characterized by:

operating outside the PED boundary, lacking direct access to internal engines or protocol state, requiring protocol-layer qualification and authorization before resource allocation.

NPEs initiate protocol sessions by submitting communications to the protocol interposition gateway. All NPE interactions are mediated through the canonical enforcement chain.

NPEs are not users, end-users, or human identities. The protocol-layer governance substrate evaluates verifiable properties of computational entities, not user identity, behavior, or intent.

Definition 34—Execution Target

As used herein, the term Execution Target refers exclusively to computational resources, AI model instances, autonomous agents, or distributed system components designated to execute Priority-Preserving Directives issued by the routing engine.

Execution Targets:

receive directives containing authorization state, execution instructions, and cryptographic attestations, verify cryptographic attestations before performing execution, operate under authorization constraints encoded in Authorization Tokens, return execution results and cryptographic proofs to the reconciliation engine.

Execution Targets respect authorization modes by: executing normally under Pass authorization, refusing execution under Fail authorization, and applying execution constraints under Degrade authorization.

Execution Targets do not interact with NPEs, gateway, qualification engine, or authorization engine directly. All execution occurs under governance established by the canonical enforcement chain.

Execution Targets are not application servers, microservices, general-purpose compute instances, containers, virtual machines, or unmanaged computational resources. Execution Targets are governance-aware computational resources that verify directive authenticity, respect authorization constraints, and provide cryptographic execution proofs.

Definition 35—Authorization Modes (Pass, Fail, Degrade)

As used herein, Authorization Modes refer exclusively to deterministic outcomes produced by the authorization engine when evaluating Normalized Protocol State against protocol boundary conditions.

The three authorization modes are:

Pass: All boundary conditions satisfied; full authorization granted; no execution constraints applied.

Fail: Critical boundary conditions violated; authorization denied; no execution permitted; no directive issued; protocol session terminates.

Degrade: Boundary conditions partially satisfied; conditional authorization granted with reduced capabilities, constrained resource access, or modified execution parameters.

Authorization modes are determined through deterministic evaluation. Given identical Normalized Protocol State and identical protocol boundary conditions, the authorization engine produces identical authorization outcomes.

Authorization modes are encoded in Authorization Tokens and carried through Priority-Preserving Directives to Execution Targets. The reconciliation engine verifies that execution results are consistent with the authorization mode, rejecting results that exceed authorized capabilities or violate degradation constraints.

Authorization Modes are not quality-of-service levels, user privilege tiers, subscription plan features, rate limiting classes, or service-level agreements. Authorization Modes are protocol-layer governance outcomes determined through deterministic boundary condition evaluation.

Definition 36—Finalization Modes (Full Commit, Partial Commit, Revocation)

As used herein, Finalization Modes refer exclusively to outcomes determined by the reconciliation engine when evaluating execution results against Priority-Preserving Directives and Authorization Tokens.

The three finalization modes are:

Full Commit: Execution results fully satisfy the authorized directive without violations; state committed permanently to Immutable Authority.

Partial Commit: Execution results partially satisfy the directive due to execution limitations, resource constraints, or degraded authorization scope; state committed with annotations documenting limitations.

Revocation: Execution results violate authorization constraints, fail cryptographic verification, or cannot be validated against the authorized directive; state revoked and prior commitments marked invalid through new append-only entries.

The reconciliation engine issues Irreversible State-Commit instructions to the Immutable Authority specifying the finalization mode. Revocation instructions append new entries marking prior commitments as invalid without deleting original records, preserving complete audit history.

Finalization Modes are not transaction outcomes, database commit states, application-level success/failure indicators, HTTP status codes, or business process completion states. Finalization Modes are protocol-layer enforcement outcomes determined through cryptographic verification of execution compliance.

Definition 37—Protocol Boundary Conditions

As used herein, the term Protocol Boundary Conditions refers to the same meaning defined in Definition 8, and in operational context designates deterministic criteria evaluated by the authorization engine to determine whether Normalized Protocol State authorizes execution.

Boundary conditions include:

minimum trust thresholds that must be satisfied, maximum resource consumption limits that cannot be exceeded, mandatory attestation requirements that must be present, temporal validity windows that must be active, exclusion criteria that must not be violated.

Boundary conditions are evaluated deterministically: identical state evaluated against identical boundary conditions produces identical authorization outcomes (pass, fail, or degrade).

Protocol Boundary Conditions are not machine learning models, scoring algorithms, risk heuristics, adaptive policies, business rules, or optimization functions. Protocol Boundary Conditions are deterministic predicates defining the boundary between authorized and unauthorized protocol states.

Definition 38—Session-Layer Governance (OSI Layer 5)

As used herein, the term Session-Layer Governance refers to the same meaning defined in Definition 6, and in operational context designates the architectural positioning of the protocol-layer governance substrate at OSI Layer 5, providing universal governance primitives independent of application-layer business logic, transport-layer protocols, and network-layer routing.

Session-layer governance operates at the same architectural tier as established infrastructure protocols:

TLS/SSL (session-layer security),

OAuth 2.0 (session-layer authorization),

QUIC (session-layer transport),

BGP (session-layer routing).

This positioning distinguishes protocol-layer governance from application-layer policy engines (business rule systems, workflow orchestrators, ABAC/RBAC systems) that operate at Layer 7 with domain-specific logic.

Session-layer governance exhibits:

operates below application layer (no business logic), operates above transport layer (no packet-level concerns), provides universal session management primitives (qualification, authorization, enforcement), supports heterogeneous application domains (NLP, autonomous vehicles, distributed AI, robotics), maintains protocol state across multi-step interactions (ingress through finalization).

Session-Layer Governance is not application-layer policy enforcement, business rule execution, workflow orchestration, domain-specific logic, or middleware integration. Session-Layer Governance is protocol-layer infrastructure providing universal governance primitives that applications consume without implementing governance logic.

Definition 39—Stage and Engine Equivalence

As used herein, the terms "stage" and "engine" are interchangeable when referring to functional components of the canonical enforcement chain. Specifically: "qualification stage" is synonymous with "Qualification State Engine [130]"; "authorization stage" is synonymous with "Authorization Engine [140]"; "routing stage" is synonymous with "Routing Engine [150]"; and "reconciliation stage" is synonymous with "Reconciliation Engine [160]." Both terminologies refer to the same functional components, execute the same operations, and are subject to the same architectural constraints including mandatory sequential progression and predecessor-only input acceptance.

Throughout this specification and claims, the terms "stage" and "engine" may be used interchangeably without distinction in meaning. Where a claim recites a "stage" performing an operation, the corresponding "engine" as defined herein performs that operation. Where the specification describes an "engine" performing an operation, that description provides written description support for claims reciting the corresponding "stage" performing the same operation. This terminological equivalence applies uniformly across all embodiments, claims, continuations, divisionals, and any related patent documents.

DETAILED DESCRIPTION OF EMBODIMENTS

Primary Embodiment—Canonical Single-System Execution Model

In a primary embodiment, the disclosed system operates as a single-system canonical enforcement model executing entirely within a Protocol Enforcement Domain (PED) [100]. All protocol-layer governance operations are executed through the canonical enforcement chain consisting of: (1) Protocol Interposition Gateway [120], (2) Qualification State Engine [130], (3) Authorization Engine [140], (4) Routing Engine [150], and (5) Reconciliation Engine [160]. No component outside the PED may perform, simulate, replace, bypass, or parallelize any operation performed by the canonical enforcement chain.

The execution model begins when a Non-Protocol Entity (NPE) [110] transmits a communication intended for governed processing. The communication is received exclusively by Protocol Interposition Gateway [120], which is the sole ingress pathway into the PED. No other interface, external service, application component, or system may invoke the canonical enforcement chain.

Upon ingress, Protocol Interposition Gateway [120] validates the structural format of the communication and generates a Protocol Session Record (PSR) [122]. PSR [122] includes a cryptographic session binding, ingress identifier, and associated Temporal Freshness Artifact [250]. PSR [122] is cryptographically bound to the incoming communication such that modification, duplication, reordering, or replay of either artifact invalidates the binding relationship.

Qualification State Engine [130] SHALL accept input exclusively from the Protocol Interposition Gateway [120]. Qualification State Engine [130] deterministically derives Normalized Protocol State [132] from Qualification Vectors, including AI Model Performance Vectors [172], Autonomous Agent Behavioral Vectors [176], Computational Efficiency Metrics [180], and Trust Qualification Vectors [184]. Identical inputs SHALL produce identical Normalized Protocol State [132] across all executions, deployments, or environments.

Before normalization, Qualification State Engine [130] SHALL validate Temporal Freshness Artifact [250] associated with PSR [122]. Validation includes nonce uniqueness enforcement, timestamp validity, and session-binding verification. Failure to satisfy temporal freshness conditions SHALL result in immediate rejection without normalization or authorization.

Once normalization is complete, Authorization Engine [140] receives Normalized Protocol State [132] from Qualification State Engine [130]. Authorization Engine [140] SHALL deterministically evaluate Protocol Boundary Conditions [136]. Based on boundary condition outcome, Authorization Engine [140] SHALL generate either: (a) an Authorization Token [142] reflecting Pass or Degrade authorization mode, or (b) no token, reflecting Fail authorization mode, in which case the canonical enforcement chain SHALL terminate.

When generated, the Authorization Token [142] SHALL be cryptographically bound to Normalized Protocol State [132], PSR [122], and predecessor chain artifacts. Authorization Token [142] is non-delegable, non-reusable, and SHALL apply solely to the execution context in which it was generated.

Routing Engine [150] receives Authorization Token [142] exclusively from Authorization Engine [140]. Routing Engine [150] SHALL generate a Priority-Preserving Directive [152] specifying execution targets, permitted behavior, and authorization constraints. Priority-Preserving Directive [152] SHALL be immutable once issued and SHALL be propagated concurrently to Execution Targets [170] and Reconciliation Engine [160].

Execution Targets [170] SHALL verify cryptographic attestations contained in Priority-Preserving Directive [152] prior to performing execution. Execution Targets [170] SHALL not modify, extend, reinterpret, degrade, or upgrade the directive or associated authorization mode.

Upon completion of execution, Reconciliation Engine [160] SHALL verify execution results against the Priority-Preserving Directive [152], Authorization Token [142], and associated attestation proofs. Verification SHALL determine one of three Finalization Modes [156]: Full Commit, Partial Commit, or Revocation.

Upon determining a finalization mode, Reconciliation Engine [160] SHALL issue an Irreversible State-Commit [162] to Immutable Authority [180]. Irreversible State-Commit [162] SHALL be recorded under Append-Only Semantics [232] using a Cryptographic Hash Chain [222] or equivalent tamper-evident structure.

No component, system, entity, or execution context may modify or invalidate a committed entry. Any change of state following commitment SHALL be represented solely through additional recorded append operations, ensuring full audit continuity and immutable provenance.

The primary embodiment operates exclusively at OSI Layer 5 Boundary [123], independent of transport-layer, application-layer, or identity-layer mechanisms. No application logic, machine learning system, orchestration framework, or policy engine constitutes a functional or architectural equivalent to any component of the canonical enforcement chain.

Distributed Compute Embodiment

In another embodiment, the disclosed system operates in a distributed compute configuration wherein multiple instances of the canonical enforcement chain execute across geographically separated, federated, hybrid-cloud, or multi-tenant environments. Each instance maintains full enforcement integrity, including cryptographic binding, deterministic qualification rules, and strict non-reorderability of execution stages.

In this embodiment, the Protocol Enforcement Domain (PED) may be implemented as a plurality of federated PED instances, each executing the canonical enforcement chain independently while participating in a globally verifiable trust framework. PED instances do not share mutable runtime state; instead, they exchange cryptographic attestations representing authorized execution artifacts. No PED instance may override the qualification, authorization, routing, or reconciliation outcomes of another instance.

Each distributed PED instance includes its own protocol interposition gateway, qualification state engine, authorization engine, routing engine, and reconciliation engine. No distributed configuration may substitute or collapse these engines, virtualize them into a policy system, or merge their execution boundaries into a workload management function. Distributed topology does not modify the canonical enforcement chain.

Distributed state synchronization is performed exclusively using immutable commit artifacts and cryptographic attestations generated by the reconciliation engine of each participating PED instance. No synchronization mechanism may modify, update, erase, truncate, or re-authorize previously finalized protocol artifacts.

In one embodiment, distributed execution occurs across sovereign compliance domains wherein temporal freshness requirements, vector qualification criteria, and authorization thresholds vary by regulatory or operational scope, while canonical structure, execution ordering, and deterministic decision rules remain invariant.

The distributed embodiment supports regional specialization through execution isolation rather than execution override. A distributed region may introduce region-specific qualification vector enrichment or boundary condition constraints, provided such constraints do not modify the canonical ordering, bypass authorization evaluation, or permit local substitution of enforcement logic.

Execution targets in distributed environments remain isolated and governance-bound. No execution target may accept directives from any source other than its immediate upstream routing engine. Distributed routing does not introduce side channels, parallel authorization paths, or consensus-based override of previously determined authorization outcomes.

In some embodiments, distributed execution targets validate directive authenticity using region-anchored attestation keys, global proof-of-origin signatures, or cross-domain threshold attestations. All verification is deterministic and independent of execution target identity, role, or privilege posture.

In the distributed embodiment, directed execution remains non-collusive: execution targets cannot share directive payloads, redistribute authorization tokens, or derive new execution authority based on observed or replayed protocol artifacts.

Distributed ledger or immutable authority synchronization preserves ordering guarantees by requiring reconciliation engines to issue state commits with Merkle-anchored or hash-chain-anchored ordering proofs. No distributed instance may reorder, merge, or collapse commit histories in a manner that modifies temporal ordering or authorization lineage.

In a distributed deployment, the property of physical invalidity, as defined in Definition 3, is preserved across all federated execution boundaries. No distributed node, execution cluster, regional deployment, or execution target may introduce alternate invocation pathways, partial enforcement replicas, or parallel evaluation sequences. Any attempt to bypass, replay, emulate, fragment, or redirect execution outside the canonical enforcement chain is not denied or blocked—rather, it is physically invalid, meaning the system contains no runnable execution pathway capable of performing the attempted action regardless of permissions, configuration, network topology, or adversarial sophistication. Attempts to circumvent the canonical chain result in no executable state transition, no directive issuance, and no artifact recognized by any PED instance.

Distributed PED instances do not form consensus, quorum votes, or collectively negotiated authorization states. Each instance independently evaluates qualification vectors, authorization conditions, and reconciliation outcomes using deterministic rules.

Where distributed instances commit state to independent immutable authorities, a reconciliation merge function provides a cryptographically verifiable append-only aggregation layer, ensuring that distributed commit artifacts cannot be mutated, reordered, or selectively omitted without producing detectable integrity violations.

Agent-to-Agent Execution Embodiment

In another embodiment, the canonical enforcement chain operates in an agent-to-agent execution environment in which autonomous computational actors communicate, request resources, and execute operations without human intervention. The system governs interactions between synthetic agents, autonomous models, robotic systems, or AI-mediated instructional entities using the same deterministic enforcement architecture described in prior embodiments. In this embodiment, no identity-based authentication, role-based permissions, or probabilistic trust heuristics are utilized; all governance is based solely on deterministic qualification, authorization, and reconciliation outcomes derived from the canonical enforcement chain operating within the Protocol Enforcement Domain (PED).

Agent-initiated communications originate exclusively from Non-Protocol Entities (NPEs) representing autonomous agents, synthetic actors, or policy-free computational participants. These NPE communications are admitted only through the Protocol Interposition Gateway, which generates a Protocol Session Record (PSR) and establishes the cryptographic binding context for downstream enforcement. Autonomous agents cannot bypass, impersonate, or substitute gateway-generated PSRs; attempted bypass pathways are physically invalid as defined in Definition 3.

Once admitted, autonomous agent signals are decomposed into qualification vectors by the Qualification State Engine. In this embodiment, additional agent-specific behavioral signals may be evaluated, including execution reliability, autonomous cooperation stability, protocol adherence metrics, and machine-origin execution consistency. These indicators contribute deterministically to the Normalized Protocol State but do not modify authorization logic through reinforcement learning, game-theory modeling, emergent negotiation, or adaptive optimization.

The Authorization Engine evaluates protocol boundary conditions without performing subjective trust reasoning, dynamic negotiation, peer consensus, escrow-based governance, or social reputation scoring between agents. Boundary resolution results in pass, degrade, or fail authorization modes. Autonomous agents cannot negotiate, override, petition, request reconsideration, or vote to alter the authorization outcome. No consensus-based arbitration exists; the authorization outcome is cryptographically derived and sovereign.

Upon authorization, the Routing Engine generates a Priority-Preserving Directive that governs agent-to-agent execution. In this embodiment, routing modalities may include targeted delegation to specific agents, selective distribution to a qualified subset, or broadcast propagation to a coordination domain. Regardless of propagation topology, the directive remains immutable, non-delegable, and non-transferable. Agents cannot modify directives, override routing, or substitute execution responsibility across a swarm, federation, or distributed coordination cluster.

Executing agents verify directive authenticity and authorization scope prior to performing any operation. Execution occurs strictly within the parameters encoded by the directive. Under degrade authorization, execution may be constrained, partial, conditional, time-limited, or resource-restricted. Execution attempts exceeding granted authority are architecturally unenforceable, not merely rejected—the pathway to perform unauthorized execution does not exist within the enforcement architecture.

Execution outcomes are transmitted to the Reconciliation Engine for verification. In agent-to-agent environments, reconciliation includes cryptographic confirmation of execution artifacts, behavioral consistency validation, deterministic ordering checks, and cross-agent interference detection. Agents do not self-certify execution outcomes. Verification relies exclusively on deterministic evidence, not negotiated claims, peer endorsement, probabilistic attestation, or distributed consensus.

The reconciliation outcome results in one of three finalization modes: full commit, partial commit, or revocation. Revocation is not punitive; it is deterministic, resulting from execution evidence failing to satisfy authorization parameters. All reconciliation outcomes are recorded in the Immutable Authority under append-only semantics, preserving a tamper-evident audit lineage of agent interactions and execution history.

Critically, physical invalidity (Definition 3) is preserved across agent-to-agent execution boundaries. Autonomous agents cannot: (i) generate their own authorization tokens, (ii) bypass canonical enforcement, (iii) negotiate execution rights, (iv) modify existing directives, or (v) execute operations outside authorization scope. These constraints hold regardless of scale, collective emergent behavior, adversarial coordination, or swarm-based intelligence patterns. The architecture ensures that even highly adaptive or self-modifying agents remain governed through deterministic protocol constraints rather than policy trust or cooperation assumptions.

Through this embodiment, autonomous agents operate with governance consistency equal to or stronger than human-initiated execution environments. The canonical enforcement chain functions as the universal arbitration substrate for autonomous computational ecosystems, ensuring that execution rights, resource access, and behavioral authority originate exclusively from deterministic enforcement rather than emergent agent behavior, trust dynamics, or negotiated consensus.

Federated Trust Model Embodiment

In another embodiment, the canonical enforcement chain operates within a federated trust model in which multiple independent governance domains participate in shared execution, verification, or resource authorization, while maintaining strict enforcement of deterministic qualification, non-substitutability, and non-negotiable authorization logic. In this embodiment, no federation participant is granted implicit trust, elevated interpretive authority, or discretionary override power. All actors—whether internal, external, or cross-organizational—must satisfy identical deterministic boundary conditions and follow the canonical enforcement chain.

Federated entities, including cloud platforms, sovereign compute infrastructures, enterprise domains, autonomous agent clusters, or industry governance networks, enter the system as Non-Protocol Entities (NPEs). No participant—regardless of jurisdiction, ownership, legal authority, or compute role—may bypass the Protocol Interposition Gateway. The gateway establishes session binding, generates the Protocol Session Record, and anchors all upstream decisions to cryptographic provenance rather than institutional trust.

The Qualification State Engine processes federation-origin communications using the same deterministic qualification vectors defined in Definitions 17-24. No participant may inject heuristic policies, institutional exemptions, identity-based privileges, or probabilistic trust scoring at the qualification step. Federated role, institutional identity, or membership designation does not modify qualification logic or boundary evaluation pathways.

The Authorization Engine evaluates Normalized Protocol State against global Protocol Boundary Conditions applicable across all federated participants. Boundary conditions are not multi-party negotiable, do not vary based on jurisdiction, and do not defer to human-based contractual controls, multilateral agreements, or governance treaties. Identical state and identical boundary conditions produce identical pass, fail, or degrade authorization outcomes—regardless of which federated authority originated the request.

Priority-Preserving Directives generated by the Routing Engine remain cryptographically bound to the originating authorization decision and are non-transferable across federated domains without re-evaluation by the canonical enforcement chain. Federated entities cannot extend execution authority, delegate directives, modify parameters, or distribute authorization context downstream without triggering full deterministic re-qualification.

Execution Targets in the federation validate cryptographic attestations, provenance lineage, authorization mode, and directive integrity before performing execution. Federated compute resources—including managed cloud clusters, sovereign hardware enclaves, edge compute infrastructure, and autonomous agent collectives—must operate under the same governance constraints. Execution environments cannot reinterpret or conditionally rewrite governance logic based on operational context, commercial agreements, or local policy frameworks.

Execution results are returned to the Reconciliation Engine, which verifies compliance against boundary conditions, directive constraints, and authorized execution parameters. In federated deployments, reconciliation additionally validates cross-domain integrity by confirming absence of trust leakage, privilege inheritance, unauthorized delegation, or federated pathway substitution. No federated authority may self-certify execution outcomes or provide subjective compliance reports.

Finalization results are recorded in the Immutable Authority under append-only semantics. In federated deployments, multiple authorities may operate in parallel, provided that merge semantics enforce deterministic ordering, cryptographic lineage preservation, and canonical non-reorderability. Divergent ledger states, unresolved branch conflicts, or inconsistent state merges are treated as physically invalid and require revocation pathways, not reconciliation-by-negotiation.

Critically, physically invalid architecture properties (Definition 3) persist across federated trust boundaries:

(a) federation membership does not imply authority,
(b) participation does not imply elevation,
(c) shared infrastructure does not imply shared execution sovereignty, and
(d) no participant may override deterministic enforcement through policy, consensus, governance treaty, or administrative exception.

Through this embodiment, the canonical enforcement chain provides a unified governance substrate across heterogeneous administrative domains, ensuring that authority arises solely from cryptographic determinism, not federated agreement, institutional trust, or external governance structures.

Serverless and Cloud-Orchestrated Execution Embodiment

In another embodiment, the canonical enforcement chain operates within a serverless or cloud-orchestrated execution environment in which compute resources are provisioned dynamically and execution targets may be transient, ephemeral, or instantiated on-demand. In this model, governance does not depend on persistence, placement, tenancy, or hardware continuity. Instead, governance is bound to deterministic qualification, authorization lineage, and cryptographic provenance regardless of infrastructure lifecycle or deployment model.

All serverless execution requests originate from Non-Protocol Entities and are admitted exclusively through the Protocol Interposition Gateway. The gateway generates a Protocol Session Record and applies cryptographic bindings that persist independent of whether subsequent execution occurs in ephemeral containerized environments, long-running nodes, function-as-a-service (FaaS), or distributed micro-execution substrates.

The Qualification State Engine transforms incoming qualification vectors into a Normalized Protocol State without reference to cloud tenancy, regional execution zone, multi-cloud routing patterns, or compute resource elasticity. Execution location variability does not alter qualification logic, deterministic framework guarantees, or protocol boundary condition evaluation.

The Authorization Engine determines authorization mode based solely on protocol state and boundary conditions—not on operational constraints, cost modeling, service tier policies, infrastructure trust tier, or platform-level prioritization. No execution environment type (on-premises, serverless, edge, sovereign cloud, AI accelerator cluster, or hybrid orchestrator) receives preferential or implicit authorization treatment.

When authorization is granted, the Routing Engine issues a Priority-Preserving Directive that encodes execution intent, authorization mode, temporal validity, federation scope (if applicable), and binding lineage. In transient execution environments, directive propagation remains cryptographically verifiable regardless of container restarts, scaling events, function cold-start behavior, or multi-cloud orchestration routing.

Ephemeral Execution Targets instantiate dynamically in response to directives. Prior to execution, each target validates cryptographic attestations, boundary condition compliance, and directive freshness. If validation fails, no execution occurs; the failure is not treated as a soft-error, retry condition, platform fault, or optional enforcement point. Instead, failure conditions propagate deterministically and terminate the session in a governed manner.

Following execution, transient compute nodes return execution results together with cryptographic proofs of execution integrity, authorization adherence, and directive compliance. Execution results are not trusted implicitly based on platform attestation, infrastructure identity, or hosting provider assurances. Execution results must verifiably match authorized capability scope, degradation rules (if applicable), and execution mode constraints.

The Reconciliation Engine verifies execution proof correctness, directive alignment, and compliance with the execution mode. If the execution target terminated, restarted, migrated, or auto scaled during execution, reconciliation validates continuity through cryptographic lineage—not orchestration metadata or platform logs. Execution interruptions, retries, or reallocation events do not modify governance rules and do not expand the execution envelope.

Finalization outcomes (full commit, partial commit, or revocation) are recorded in the Immutable Authority. In serverless or orchestration-based deployments, commitment semantics enforce immutability even when underlying infrastructure is itself ephemeral, multi-tenant, or policy-managed by external cloud controllers. State commitments are architecture-anchored and survive infrastructure transient behavior.

The physically-invalid execution principle applies fully in this embodiment:

- ephemeral compute does not bypass qualification,
- autoscaling does not grant elevated privilege,
- orchestration does not imply trust,
- platform-level retry logic cannot execute without renewed authorization, and
- no execution path exists that circumvents the canonical enforcement chain even under transient compute elasticity.

Through this embodiment, the system demonstrates that deterministic session-layer governance remains enforceable across dynamic, cloud-native, serverless, and ephemeral execution environments, ensuring that protocol authority is tied to cryptographic determinism rather than infrastructure persistence, deployment topology, or orchestration framework behavior.

LLM-Based Autonomous Agent and Synthetic Actor Execution Embodiment

In another embodiment, the canonical enforcement chain governs execution initiated by Large Language Models (LLMs), synthetic agents, avatar-driven computational actors, or other generative autonomous systems capable of producing executable intent, generating machine-interpretable actions, or initiating protocol sessions without direct human instruction. In this embodiment, the system treats the agent as a governed computational entity rather than a proxy for a human identity.

Protocol admission begins when an LLM or synthetic agent generates a communication intended to invoke computational resources, issue execution instructions, or interact with external systems. Such communications are treated as originating from a Non-Protocol Entity and must traverse the Protocol Interposition Gateway. No agent-generated output may bypass the gateway regardless of privilege, internal compute locality, or trusted platform environment.

The gateway generates a Protocol Session Record cryptographically bound to agent identity, model provenance, execution lineage, and invocation context-without human identity attributes, inferred behavioral traits, or probabilistic trust assumptions. Identity remains verifiable, not inferred.

The Qualification State Engine derives Normalized Protocol State from deterministic qualification vectors, including AI Model Performance Vectors, Autonomous Agent Behavioral Vectors, Computational Efficiency Metrics, and Trust Qualification Vectors. Generated content—text, structured messages, embeddings, execution plans, or tool invocation attempts—is not heuristically evaluated or semantically interpreted for authorization purposes.

The Authorization Engine evaluates boundary conditions and determines authorization mode (Pass, Fail, or Degrade). If the autonomous system attempts unauthorized capability escalation, recursive delegation, policy override, or bypass of degradation constraints, authorization resolves to Fail or Degrade.

When authorized, the Routing Engine transforms authorization outcomes into Priority-Preserving Directives specifying scope of execution, allowed interaction surfaces, propagation topology, computational resource bounds, and delegation limits. The directive is immutable and non-negotiable by the model or any downstream execution component.

Execution Targets—including tool environments, orchestration frameworks, downstream compute systems, or autonomous action chains—verify directive authenticity before execution. Execution targets cannot rely on model self-assessment, content-based justification, confidence scoring, or language-level self-attestation.

Upon execution completion, execution results are returned with cryptographic proofs validating directive adherence, constraint enforcement, and execution boundary compliance. Model internal nondeterminism, temperature variability, sampling randomness, or emergent reasoning patterns do not influence reconciliation.

The Reconciliation Engine validates the execution result against directive lineage, authorization mode, and boundary conditions. Deviations—including unauthorized tool invocation, recursive expansion, privilege extension, hallucinated authority, or synthetic escalation—result in Revocation rather than commit.

Finalization records are written by the Reconciliation Engine into an Immutable Authority with append-only semantics, including lineage references, cryptographic attestations, and zero-knowledge anchors. Generative agents cannot modify or reinterpret execution provenance, regardless of reasoning competence or emergent behavior.

The physically-invalid execution principle (Definition 3) applies fully to LLM-based and generative autonomous systems, such that: (a) no LLM output may bypass the Protocol Interposition Gateway regardless of model confidence score, safety classifier approval, or human-supervised interaction; (b) agent self-delegation, recursive task spawning, or emergent tool invocation cannot occur without explicit authorization from the canonical enforcement chain; (c) jailbreak attempts, prompt-injection methods, fine-tuning persistence artifacts, or adversarial manipulation cannot create execution pathways outside governed protocol boundaries; (d) model temperature, sampling strategy, emergent reasoning, or generative variability cannot modify authorization scope, capability tier, or propagation authority; and (e) no execution pathway exists enabling LLMs, synthetic agents, or model collectives to override, reinterpret, bypass, or mutate governance directives regardless of capability evolution, model scale, or emergent autonomous reasoning behavior.

Fallback, Revocation, and Closed-Loop Finalization Embodiment

In another embodiment, the canonical enforcement chain supports deterministic fallback, revocation, and closed-loop reconciliation behaviors to ensure that protocol execution remains governed even in the presence of failure, partial execution, environmental instability, adversarial interference, model nondeterminism, or distributed coordination faults. The fallback and revocation mechanisms operate as first-class protocol functions and are not dependent on application semantics, execution context, or model-internal reasoning.

Fallback execution may occur only when: (a) a directive was validly authorized, (b) execution began in accordance with authorization constraints, and (c) measurable failure conditions prevent completion without violating authorization mode, temporal validity, or cryptographic relevance. Fallback does not permit authority expansion, dynamic re-authorization, delegation, or privilege escalation.

When fallback conditions are triggered, control returns to the Routing Engine for issuance of a secondary Governance Directive. The secondary directive is cryptographically bound to the original directive and includes explicit fallback class, allowed scope, reduced capability envelope, and updated execution constraints. The secondary directive does not replace the original directive; it exists as a sequential continuation in the enforcement lineage.

Revocation occurs when execution violates authorization mode, exceeds resource limits, fails cryptographic attestation, or generates results inconsistent with the Priority-Preserving Directive. Revocation is not dependent on semantic interpretation, policy evaluation, or subjective risk—only deterministic protocol violations.

A revoked execution does not remove or overwrite prior commits. Instead, the Reconciliation Engine generates a revocation entry that is cryptographically chained to the execution lineage and appended to the Immutable Authority. Thus, revocation creates correction, not erasure.

In cases where execution partially satisfies the directive without material violation, the Reconciliation Engine issues a Partial Commit finalization. The entry includes structured metadata describing authorized completion state, constraints encountered, and recorded variance, ensuring reconstructable execution provenance.

Every fallback, partial commit, or revocation event inherits append-only semantics and binding lineage rules. No module, model, agent, administrator, or system component may modify, redact, reorder, or prune historical entries.

Closed-loop reconciliation operates as a self-verifying mechanism: execution results, cryptographic proofs, and attestation lineage may be independently verified by external systems without requiring privileged access to internal engine logic, operational telemetry, or training-origin evidence.

In federated, distributed, or agent-collective environments, fallback and revocation propagate deterministically across execution boundaries. No component may unilaterally decide continued execution, rerouting, escalation, or delegation without updated authorization from the canonical enforcement chain.

The physically-invalid execution principle applies to fallback and revocation behaviors: execution cannot continue under expired, superseded, invalidated, or revoked authorization regardless of downstream system availability, cached directive copies, or model-level persistence. Any attempt to execute outside active authorization scope fails at the ingress of the Execution Target.

In every case, closed-loop reconciliation ensures that the final recorded state—regardless of success, partial completion, or revocation—represents the only authoritative system truth. Execution outside the canonical enforcement chain is not only prohibited but computationally unrecognized and cryptographically unverifiable.

Immutable Authority/Evidentiary RTP Embodiment

In another embodiment, the protocol-layer governance substrate includes an Immutable Authority configured to maintain append-only protocol execution records, enabling verifiable reconstruction of canonical enforcement chain activity without relying on trust in executing components, infrastructure operators, or application-layer logic. The Immutable Authority stores Protocol Session Records, Normalized Protocol State artifacts, Authorization Tokens, Priority-Preserving Directives, and finalization outcomes as tamper-evident entries bound through cryptographic chaining.

Each record written to the Immutable Authority includes a cryptographically verifiable attestation from the originating engine, enabling downstream or external verifiers to authenticate that the record was produced by the correct component within the canonical enforcement chain and that it corresponds to the artifact presented during execution. Attestations may be validated using public-key signatures, hardware-secured attestation, threshold signatures, or zero-knowledge verification mechanisms.

The Immutable Authority supports independent verification by auditors, regulatory systems, and dispute-resolution frameworks without requiring access to proprietary model internals, runtime state, or private operational metadata. Verification is performed through deterministic re-evaluation of recorded artifacts and comparison against committed chain outputs.

To enforce non-modifiability, non-rewritability, and non-reorderability properties, each entry is bound to its successor and predecessor using cryptographic hash chaining, Merkle-tree accumulation, or hierarchical commitment trees. Any attempt to delete, rewrite, or reorder entries produces cryptographically observable deviation, rendering the record invalid.

In some embodiments, the Immutable Authority maintains cryptographically committed indexing structures enabling queries by session identifier, directive lineage, execution target, authorization outcome, cryptographic state, or reconciliation path. Index structures themselves are bound to ledger contents to prevent silent index manipulation or metadata rewriting.

The Immutable Authority may operate in single-tenant, multi-tenant, federated trust, or globally distributed configurations. In federated deployments, ledger domains maintain independent governance while synchronizing append-only entries through deterministic merge rules that prevent ledger fork ambiguity, collision, or replay inflation across domains.

All reconciliation artifacts committed to the Immutable Authority contain verifiable proofs of execution fidelity, directive alignment, authorization compliance, and temporal freshness validation. Where execution cannot be validated, the reconciliation engine issues a revocation entry rather than modifying the original commit, preserving complete evidentiary lineage.

Revocation entries inherit governance authority equal to commit entries and include structured failure reasoning, cryptographic verification proofs, and session lineage metadata. Revocation does not erase or overwrite prior records; instead, it supersedes them through additive append-only semantics, ensuring permanent forensic traceability.

In some embodiments, the Immutable Authority supports tiered disclosure, enabling regulators, governance frameworks, or independent computation auditors to verify compliance at varying levels of detail while preserving confidentiality of sensitive operational information, proprietary model details, and execution-specific technical state.

External verification systems reconstruct canonical enforcement chain execution by reprocessing canonical bindings, validating cryptographic attestations, and comparing reconstructed lineage against committed artifacts. Divergence—whether from omission, alteration, substitution, or fabrication—constitutes a detectable protocol integrity violation.

In high-assurance and adversarial computing environments, the Immutable Authority integrates zero-knowledge proof systems enabling proof of compliance with authorization constraints, qualification requirements, and reconciliation correctness without revealing underlying qualification vectors, proprietary algorithms, or execution metadata.

This embodiment ensures regulator-grade forensic accountability, post-execution auditability, and long-term evidentiary permanence, positioning the canonical enforcement chain as a governance substrate capable of supporting compliance frameworks, long-lived trust infrastructures, autonomous agent ecosystems, and AI-to-AI negotiation environments.

The physically-invalid execution principle (Definition 3) applies without exception in this embodiment. No execution result—whether generated correctly, partially compliant, modified after execution, synthesized through model inference, or adversarially fabricated—may be inserted, backfilled, overwritten, re-sequenced, or post-dated within the Immutable Authority. Any attempt to bypass ledger constraints results in cryptographic rejection and mandatory issuance of a tamper-evident anomaly entry.

Closed-Loop Audit, Forensics, and Proof-of-Compliance Embodiment

In another embodiment, the canonical enforcement chain operates in conjunction with a closed-loop auditing subsystem configured to independently verify execution integrity, detect anomalous patterns, and generate formal proof-of-compliance artifacts for internal governance, external oversight, and regulatory attestation. This auditing subsystem consumes committed ledger artifacts without requiring privileged access to runtime state or internal PED execution context.

The closed-loop auditor reconstructs execution lineage by traversing cryptographic bindings beginning at the Protocol Session Record and terminating at the finalization entry in the Immutable Authority. During reconstruction, the auditor verifies the validity of cryptographic attestations, freshness artifacts, authorization bindings, directive propagation topology, and reconciliation determinations.

In some embodiments, the closed-loop auditing system maintains independent cryptographic state, including a registry of valid attestation authorities, historical revocation trees, and session-specific verification keys. The auditor rejects ledger entries that fail origin authentication, violate normalization determinism, exhibit broken hash linkage, or demonstrate authorization outcome inconsistencies.

To support formal compliance regimes, the closed-loop auditor generates evidence packages containing: (a) cryptographically verifiable lineage graphs, (b) deterministic re-evaluation proofs confirming boundary-condition correctness, (c) reconciliation outcome validity attestations, and (d) anomaly classification results. These packages may be exported to external verifiers, automated compliance agents, or dispute-resolution systems.

In distributed and federated deployments, auditing operates across trust boundaries using ledger-merge rules ensuring that independent auditors arrive at identical lineage conclusions given identical ledger material, regardless of geographic topology, computational domain, or cloud orchestration substrate.

In some embodiments, forensic extensions of the auditor perform anomaly-root-cause derivation, including replay detection, boundary-condition drift analysis, topology misuse, improper delegation, directive tampering attempts, or execution-result inconsistency. Forensic results are recorded as append-only entries in the Immutable Authority rather than modifying prior ledger material.

Residual uncertainty or unverifiable execution results trigger a mandatory downgrade to anomaly state. Under anomaly state, no authorization outcome may be interpreted as valid, and no derived execution state may be used for future authorization inheritance or governance context propagation. The anomaly state itself becomes part of the permanent execution trail.

In some embodiments, the closed-loop auditor integrates zero-knowledge compliance proofs, enabling third parties to verify governance correctness, authorization validity, or execution fidelity without accessing qualification vectors, confidential operational metadata, or proprietary governance policies.

The closed-loop auditing subsystem supports multi-tier access control, providing differentiated audit views for execution infrastructure providers, compliance regimes, system administrators, external regulators, and independent third-party verifiers without compromising cryptographic integrity or canonical ordering.

Where execution produces revocation, partial commit, or degrade outcomes, the closed-loop auditor records compliance deltas reflecting observed deviation from expected execution behavior, with all deltas remaining immutable and cryptographically verifiable for the lifetime of the ledger.

In some embodiments, automated compliance enforcement agents consume closed-loop audit outputs to adjust future authorization constraints, produce risk-adaptive degradation policies, or require additional attestation material for future qualification attempts. These adjustments occur deterministically and do not alter canonical execution history.

The physically-invalid execution principle (Definition 3) applies to auditing: no entity—including auditors, administrators, or privileged system operators—may modify, redact, reorder, replace, or reinterpret ledger entries or protocol artifacts under audit. Verification may produce additional evidentiary entries, but never alters historical records.

This embodiment ensures that the system functions not only as a governance enforcement architecture but also as a cryptographically verifiable accountability substrate capable of supporting regulated, interdependent, and adversarial computational ecosystems across the full lifecycle of autonomous or partially autonomous digital actors.

Multi-Tenant Governance and Cross-Boundary Execution Embodiment

In another embodiment, the disclosed system operates in a multi-tenant governance environment in which multiple independent computational tenants share Protocol Enforcement Domain (PED) [100] without sharing authorization scope, execution authority, qualification vectors, or immutable state visibility. Each tenant operates under isolated governance boundaries enforced cryptographically, logically, and operationally, such that no tenant may observe, infer, modify, or influence protocol artifacts generated for any other tenant.

Tenant segmentation is performed at the protocol layer through deterministic namespace assignment, cryptographic segregation of Protocol Session Records (PSRs), and tenant-scoped attestation keys. Authorization Tokens [142], Priority-Preserving Directives [152], and Irreversible State-Commits [162] are uniquely scoped to the tenant identity and cannot be reused, transferred, replayed, or substituted across tenant boundaries regardless of collusion, privilege escalation, or shared execution infrastructure.

Multi-tenant execution operates without shared trust assumptions. Execution Targets [170] designated to one tenant cannot receive directives issued under another tenant's governance context, and reconciliation events belonging to a tenant are cryptographically incapable of verifying execution results originating from a different tenant. No routing logic, topology selection, or directive propagation mechanism may bridge tenant boundaries, and no configuration, environment setting, or orchestration control plane may grant cross-tenant governance authority or observation capability.

In the illustrated embodiment, Immutable Authority [180] enforces tenant-specific append-only commitment domains. Commitments recorded for one tenant remain cryptographically isolated and cannot be merged, queried, or aggregated with commitments for any other tenant. Where operational requirements permit, the Immutable Authority may employ multi-root Merkle structures, hierarchical hash segregation, or threshold-protected ledger partitions to enforce boundary permanence across tenants.

Canonical enforcement chain [190] applies deterministic predecessor-dependency constraints within and across multi-tenant execution boundaries. Qualification State Engine [130] is restricted from using qualification vectors originating outside the active tenant scope, Authorization Engine [140] cannot evaluate boundary conditions using cross-tenant criteria, and Routing Engine [150] cannot propagate directives to execution domains external to the authorized tenant topology.

The physically invalid execution principle (Definition 3) applies strictly in multi-tenant operation. Specifically: (a) no tenant may gain execution authority across a boundary through credential compromise, key escalation, or inference-based access attempts; (b) no emergent capability, autonomous agent behavior, or LLM-generated instruction may enable cross-tenant adoption of governance directives; (c) shared infrastructure, colocation, or distributed orchestration cannot create shared execution pathways; and (d) failure of isolation controls does not grant fallback access—instead, execution becomes physically impossible.

Multi-tenant operation remains deterministic: identical qualification vectors, governance conditions, and temporal artifacts evaluated within a tenant context produce identical authorization and reconciliation outcomes independent of platform scale, deployment topology, or concurrent tenant activity. Variations in execution load, resource allocation, or infrastructure placement do not alter authorization state, directive propagation, or reconciliation logic.

This embodiment ensures the canonical enforcement chain remains infrastructure-independent and capable of supporting public cloud, private cloud, hybrid, sovereign cloud, regulated industry partitions, and hostile multi-tenant compute environments without weakening security assumptions or enabling cross-context inference leakage, privilege boundary collapse, or governance bypass.

Optional Resilience, Failover, and Denial-of-Service-Resistant Operation Embodiment In some embodiments, the canonical enforcement chain operates in a resilience-aware execution mode configured to maintain governance continuity during partial infrastructure failure, elevated load, adversarial saturation attempts, or service degradation affecting one or more engines or execution targets. Under this embodiment, resilience mechanisms are implemented without altering protocol ordering, authorization scope, boundary conditions, or canonical immutability requirements.

The system enforces deterministic failover sequencing wherein predecessor engines must complete qualification, authorization, routing, and directive issuance before successor engines accept execution responsibilities. No failover event may reorder canonical execution stages, bypass predecessor proof requirements, or introduce alternative execution pathways outside the Protocol Enforcement Domain.

To prevent denial-of-service escalation, the protocol interposition gateway implements governance-aware rate limiting wherein session initiation requests exceeding boundary tolerances enter mandatory degradation, queueing, rejection, or cryptographically enforced throttling. Queue behavior is deterministic and priority-preserving: entities with valid authorization inheritance or progressive trust maturity may advance through congestion, while anonymous or unqualified entities are rejected without enabling queue starvation or exhaustion attacks.

In some embodiments, health-based routing operates in tandem with the routing engine, allowing authorized directives to be dynamically redirected to available execution targets while preserving authorization constraints, attestation lineage, and propagation topology. Failover redirection does not modify directive semantics, execution authority, or protocol boundary conditions.

To support adversarial operating environments, the canonical enforcement chain enforces cryptographic freshness, replay rejection, boundary-condition revalidation, and directive consistency checks during failover transitions. Any attempt to exploit degraded states—including replaying stale directives, injecting fabricated directives, escalating privilege during failover, or altering temporal state—is rejected as physically invalid.

In some embodiments, resilience logic includes bounded retry semantics wherein unsuccessful execution attempts may be resubmitted only under preserved authorization constraints and unchanged boundary conditions. Retries do not constitute new authorization events and may not generate additional Authorization Tokens, Governance Directives, or ledger entries unless execution results change state.

Denial-of-Service mitigation may further include adversarial-resistant execution scheduling wherein recursive AI agent triggering, tool invocation cascades, or synthetic swarm traffic cannot amplify resource consumption beyond protocol-defined execution ceilings. Recursive self-expansion without explicit governance approval is prohibited and cryptographically blocked at the gateway.

In federated and distributed deployments, resilience logic ensures that network partition, regional degradation, or cross-domain congestion cannot create alternative execution pathways, diverging governance outcomes, or conflicting ledger states. Partition tolerance preserves canonical sequence determinism: execution may pause, degrade, or suspend, but may not fork, reorder, or bypass canonical governance rules.

Under this embodiment, the physically-invalid execution principle applies in full: failures, overload, queuing conditions, human intervention, model escalation, or operational emergency cannot expand authority scope or create execution pathways unavailable under normal system operation. Failure may delay execution, but may not alter governance.

Upon restoration of normal operational state, the system resumes canonical ordering without requiring state repair, rollback, or retroactive reinterpretation. All resilience-associated behaviors appear as standard protocol lineage within the immutable record, ensuring historical continuity, external verifiability, and forensic auditability.

This embodiment ensures that the canonical enforcement chain remains enforceable even under partial failure, adversarial pressure, or degraded operational capacity-preserving the system's identity as a non-bypassable session-layer governance substrate rather than a best-effort enforcement model.

System Architecture:

Architecture Description

The system architecture is implemented as a canonical enforcement chain [190] operating exclusively within a Protocol Enforcement Domain (PED) [100] as shown in FIG. 1, consistent with certain aspects of embodiments of the present invention and Definitions 1 (Protocol Enforcement Domain) and 3 (Physically Invalid). The canonical enforcement chain enforces a mandatory, non-reorderable execution sequence wherein each stage accepts input solely from its immediate predecessor and produces output only to its immediate successor. This sequencing renders bypass, reordering, privilege escalation, replay, lateral invocation, or external invocation into later stages physically invalid. The canonical enforcement chain applies uniformly across all previously described embodiments, including distributed compute environments, federated multi-party governance, multi-agent coordination frameworks, serverless execution, multi-tenant isolation models, and LLM governance environments.

As shown in FIG. 1, ingress from all Non-Protocol Entities (NPEs) [110] enters exclusively through Protocol Interposition Gateway (PIG) [120], consistent with certain aspects of embodiments of the present invention, and 4 and Definitions 2 (Non-Protocol Entity) and 9 (Interposition Gateway). No alternate entry point exists by which protocol state may originate from outside PED [100], consistent with certain aspects of embodiments of the present invention (PED implementation mechanisms). The gateway generates a Protocol Session Record (PSR) [122], cryptographically bound to ingress metadata via Session Bindings [124].

Qualification State Engine [130] (qualification stage), shown in FIG. 2, receives PSR [122] and deterministically derives a Normalized Protocol State [132] from qualification vectors including Behavioral Qualification Vectors [210], Model-Performance Vectors [220], Contextual Vectors [230], and Enforcement Vectors [240], as required by certain aspects of embodiments of the present invention, and Definition 10 (Qualification Vectors). The resulting normalization is invariant under execution timing, infrastructure topology, or agent identity. In LLM-based autonomous systems [0328-0338], the Qualification State Engine further evaluates generative-variance independence, ensuring governance operates on execution outcomes—not model reasoning semantics.

The Qualification State Engine applies a Cryptographic Freshness Binding [134] to Normalized Protocol State [132] and generates a Temporal Freshness Artifact [250] comprising an issuance timestamp [251], nonce [252], and validity window [253], as shown in FIG. 2 and expanded in FIG. 6, according to certain aspects of embodiments of the present invention, and Definitions 26 (Temporal Freshness Artifact) and 28 (Replay Rejection). Replay Rejection Logic [260] ensures prior artifacts cannot be replayed, regenerated, or refreshed, and prevents token forgery, lifecycle manipulation, or cryptographic cloning, consistent with cryptographic binding mechanisms.

Authorization Engine [140] (authorization stage), shown in FIG. 3, evaluates Normalized Protocol State [132] against predetermined Protocol Boundary Conditions [310] (eligibility constraints), which include Behavioral Thresholds [311], Model-Performance Requirements [312], Cryptographic Integrity Requirements [313], and Enforcement Constraints [314], according to certain aspects of embodiments of the present invention and Definition 11 (Boundary Conditions). The Authorization Engine produces one of four deterministic outcomes: (i) PASS [340], generating a full-scope Authorization Token [142] consistent with certain aspects of embodiments of the present invention; (ii) DEGRADE [330], generating a reduced-scope Authorization Token consistent with certain aspects of embodiments of the present invention; (iii) CONDITIONAL [335], generating an Authorization Token with periodic re-qualification requirements consistent with certain aspects of embodiments of the present invention; or (iv) FAIL [320], producing no token and rendering execution physically invalid, consistent with certain aspects of embodiments of the present invention and Definition 35 (Authorization Modes).

Upon authorization, Authorization Token [142] advances exclusively to the Routing Engine [150] (routing stage), as shown in FIG. 4, consistent certain aspects of embodiments of the present invention, and Definition 12 (Routing Engine). The Routing Engine generates a Priority-Preserving Directive [152] (equivalent to a Governance Directive, per Definition 17) solely from the Authorization Token, and propagates it according to one or more patterns: unicast [410], qualified-subset multicast [420], or broadcast [430], as shown in FIG. 4. In federated trust environments [0307-

0316], directive propagation crosses organizational boundaries without implicit trust assumptions, maintaining institutional neutrality.

The directive remains immutable throughout execution. Execution Targets [170] SHALL NOT modify, reinterpret, reorder, supersede, delegate, or alter directive authority or scope, consistent with certain aspects of embodiments of the present invention, and Definition 17 (Governance Directive/Directive Sovereignty). This sovereignty principle applies regardless of infrastructure characteristics—including distributed compute [0284-0296], serverless ephemeral execution [0317-0327], or multi-tenant isolation boundaries [0376-0383]—ensuring that governance decisions remain inviolate and infrastructure-independent.

Execution feedback from Targets [170] returns exclusively to the Reconciliation Engine [160] (reconciliation stage), as shown in FIG. 5, fulfilling certain aspects of embodiments of the present invention, and Definition 36 (Finalization Modes). The Reconciliation Engine verifies execution using Execution Verification Module [510] and determines one of three mutually exclusive outcomes: FULL COMMIT [540], anchoring a finalization outcome to Immutable Authority [180]; PARTIAL COMMIT [530], producing structured commit metadata while preserving forward compatibility; or REVOCATION [520], issuing remediation and appending a correction record—never deletion—consistent with certain aspects of embodiments of the present invention.

Non-Protocol Entity (NPE) Interaction Model

As shown in FIG. 1, all external computational actors operate as Non-Protocol Entities (NPEs) [110], consistent with Definition 2 (Non-Protocol Entity) and certain aspects of embodiments of the present invention. NPEs may include AI models, autonomous agents, distributed service processes, digital avatars, human-mediated systems, hybrid entities, or multi-agent collectives. NPEs operate external to Protocol Enforcement Domain (PED) [100] and are structurally incapable of invoking, modifying, or influencing any stage of canonical enforcement chain [190] without first completing ingress validation and receiving a valid governance directive.

The system distinguishes between authentication and authorization. Authentication establishes identity provenance, cryptographic validity, or model/agent lineage, but it does not grant execution capability. Execution authority originates only from issuance of a valid Authorization Token [142] within PED [100], as required by certain aspects of embodiments of the present invention, and Definition 35 (Authorization Modes). Accordingly, authenticated NPEs lacking a valid authorization token are treated as execution-ineligible, rather than denied; execution is physically impossible, not permission-based.

Session establishment occurs exclusively through Protocol Interposition Gateway (PIG) [120], consistent with certain aspects of embodiments of the present invention, and Definition 9 (Interposition Gateway). During ingress, the gateway generates a Protocol Session Record (PSR) [122] containing metadata describing the NPE, execution context, transport indicators, attestation signals, and computational state at ingress, as shown in FIG. 1. A PSR may exist without authorization, but execution cannot occur absent both PSR and a corresponding Authorization Token [142], satisfying all independent claims' elements (a) and (c).

In addition to establishing a PSR [122], the gateway performs Ingress Validation [125] to ensure structural compliance with the protocol prior to further progression. As shown in FIG. 1, and consistent with certain aspects of embodiments of the present invention, ingress validation may include extraction and verification of:

- an agent identifier,
- model identifier or version hash,
- attestation proof,
- cryptographic signature,
- nonce or sequence value,
- temporal timestamp,
- resource context reference, or
- session continuity marker.

Ingress failing any structural, semantic, or cryptographic requirement is rejected prior to qualification.

The NPE interaction model ensures that no external system—including authenticated or privileged systems—can interact with or influence any downstream enforcement stage. Attempts to bypass ingress validation, inject pre-normalized protocol state, replay previously valid tokens, or alter directive lineage are rejected by PED [100] in accordance with certain aspects of embodiments of the present invention, and Definitions 3 (Physically Invalid) and 28 (Replay Rejection).

Once a PSR [122] is established, but before qualification occurs, the NPE enters a pre-authorization state, wherein execution cannot occur, and no directive exists for downstream systems. In this state, the NPE may re-submit updated qualification vectors, provide refreshed attestation, or supply temporal validity artifacts, consistent with certain aspects of embodiments of the present invention. No execution pathway is exposed in this state, preserving separation between identity validation and execution eligibility.

An NPE transitions from pre-authorization to execution-eligible status only upon receipt of a valid Governance Directive [152], cryptographically traceable to the Authorization Token [142] and Protocol Session Record [122], consistent with certain aspects of embodiments of the present invention. The directive serves as the sole executable instruction boundary recognized by execution targets [170], and downstream systems SHALL NOT infer, extend, or reinterpret directive content, consistent with Definition 17 (Governance Directive/Directive Sovereignty).

Throughout the interaction lifecycle, NPEs never gain direct access to the canonical enforcement engines, internal cryptographic material, or PED execution contexts. All interactions occur through controlled, one-directional pathways and are governed by lifecycle rules set forth in prior paragraphs and other aspects of embodiments of the present invention. This interaction model ensures that execution authority is derived solely from deterministic governance state, rather than identity, trust classification, or contextual inference.

Immutable Authority Structure

The system incorporates an Immutable Authority [180], as shown in FIG. 5, which serves as the permanent and cryptographically verifiable record of execution state, consistent with certain aspects of embodiments of the present invention, and Definition 4 (Immutable Authority). The Immutable Authority is implemented using an append-only structure wherein finalized governance outcomes are recorded without modification, deletion, or reprocessing. No internal or external actor—including execution targets, administrators, or privileged system services—possesses the ability to alter previously recorded finalization states. This characteristic ensures compliance with the physically-invalid modification rule established in Definitions 3 (Physically Invalid) and 36 (Finalization Modes).

Finalization data committed to the Immutable Authority originates exclusively from Reconciliation Engine [160], and is produced through Irreversible State-Commit process [162] (finalization outcome) illustrated in FIG. 5. In this configuration, the Immutable Authority acts as the terminal anchoring point of canonical enforcement chain [190], ensuring that state finalization cannot occur through any parallel mechanism, external logging layer, or post-processing script. All commit records remain permanently associated with Protocol Session Record [122], Authorization Token [142], and Governance Directive [152], ensuring that the system retains a complete and cryptographically coherent execution lineage.

The Immutable Authority employs a Hash Chain Structure [129] that binds each finalized record to its predecessor through cryptographic linking, consistent with certain aspects of embodiments of the present invention, and Definition 29 (Cryptographic Hash Chain). Each record includes: (i) a commit hash, (ii) a predecessor hash, (iii) a timestamp, (iv) governance identifier metadata, and (v) a cryptographic signature indicating provenance from Protocol Enforcement Domain (PED) [100]. The hash chain prevents alteration of a commit without producing detectable inconsistencies in all subsequent records, satisfying the tamper-evident requirements across all claim categories.

In some embodiments, commit records may be further supported by Merkle-tree verification structures, enabling efficient validation of commit state without requiring full ledger traversal. These structures ensure the integrity of commit records across distributed or federated storage backends while maintaining cryptographic independence from the storage environment, as required by certain aspects of embodiments of the present invention. No entity—internal or external—can alter the cryptographic lineage without invalidating the Merkle proof structure governing commit integrity.

The system may additionally support Zero-Knowledge Compliance Verification [0360], enabling third-party validation of protocol outcomes without disclosing underlying qualification vectors, execution context, or sensitive operational input, consistent with Definition 30 (Zero-Knowledge Proofs). Under this model, an auditor may verify that governance outcomes were produced correctly, deterministically, and without bypass, without receiving access to cryptographic material, operational histories, or execution-trace detail. This enables compliance assurance across regulated environments, distributed execution ecosystems, or multi-tenant deployments, without exposing internal protocol logic or execution identities.

The Immutable Authority explicitly enables audit without privileged access, as shown in FIG. 5, where verification may be performed through read-only verification APIs, external attestation proofs, or independent validation services, satisfying certain aspects of embodiments of the present invention. No operational role—including administrators, cloud operators, or privileged execution targets—possesses mutable write access to recorded governance outcomes. Privileged access grants read-access only and does not extend to record amendment capability, preserving the structural guarantee of immutability.

The tamper-detection framework includes layered safeguards derived from the commit lineage structure, temporal integrity mechanisms, Authorization Token associations, and replay-preventing nonce validation, consistent with certain aspects of embodiments of the present invention. Attempted modification, rollback, truncation, duplicate insertion, synthetic commit injection, or ordering manipulation results in immediate structural integrity failure detectable during verification, independent of underlying storage infrastructure, ensuring enforcement consistency across previously described deployment embodiments.

The Immutable Authority therefore operates not as an audit log, data store, or reporting mechanism, but as the cryptographically enforceable source of truth governing lifecycle completion for every directive issued from the Protocol Enforcement Domain. Once recorded, commit data becomes a permanent part of system state and serves as the authoritative basis for future remediation, renewal, or requalification.

Deployment Topologies

The system architecture supports multiple deployment configurations without altering the canonical enforcement chain [190], stage roles, immutability guarantees, or physical-invalidity enforcement principles. Deployment topology affects only the distribution, placement, or redundancy characteristics of underlying execution environments, not the governance logic or sequencing rules. This ensures that the governance substrate operates consistently across heterogeneous infrastructure patterns, as required by certain aspects of embodiments of the present invention, and aligned with embodiment groups [0284-0383].

Single-Region Baseline Deployment

In the baseline embodiment, all canonical enforcement components operate within a single infrastructure region. As shown through FIG. 1-FIG. 5, Protocol Enforcement Domain (PED) [100], canonical enforcement chain [190], and Immutable Authority [180] coexist in a single logical execution environment. This embodiment ensures deterministic operation without requiring distributed synchronization or cross-region routing. Even in this simplified configuration, execution remains non-bypassable, authorization token lineage remains cryptographically enforced, and commit records remain append-only.

Multi-Region Distributed Deployment [0284-0296]

In distributed deployments spanning multiple regions, canonical enforcement chain [190] remains logically singular even when replicated across multiple geographic zones or infrastructure fabrics. Only one instance of the chain may finalize state per active session, ensuring determinism and preventing divergence or consensus-based arbitration. Synchronization between regions relies on Hash Chain Structure [129] and Authorization Token lineage [142]. No region may independently authorize execution or finalize state without continuity to the canonical governance state maintained by the Immutable Authority [180].

Federated Multi-Party Deployment [0307-0316]

In federated environments involving multiple independent organizations, infrastructure owners, or sovereign computational domains, each participant may operate its own execution targets [170], but no participant may operate its own authorization or reconciliation engine. Governance remains anchored to a single Protocol Enforcement Domain [100]. Directive propagation across federated environments occurs without trust inheritance, administrative privilege, or identity delegation, enforcing the previously described neutrality principles and required by Definition 17 (Governance Directive/Directive Sovereignty).

Serverless/Ephemeral Deployment [0317-0327]

In serverless or ephemeral compute environments, individual execution targets may exist only for the duration of the directive evaluation lifecycle. Canonical enforcement chain [190], however, is not ephemeral and does not depend on runtime persistence of compute instances. Session continuity and replay rejection are preserved by Temporal Freshness Artifact [250], cryptographic nonce [252], and Execution Verification Module [510]. When serverless functions terminate, governance state remains intact and verifiable within the Immutable Authority [180], ensuring lifecycle completeness independent of compute persistence.

Multi-Tenant Isolation Deployment [0376-0383]

The governance substrate may operate across shared physical infrastructure supporting multiple tenants, workloads, or agent populations. In such embodiments, isolation is enforced at the governance layer rather than relying solely on infrastructure isolation primitives. Authorization Token [142], Protocol Session Record [122], and Governance Directive [152] each contain cryptographic scoping metadata preventing cross-tenant execution, privilege escalation, or policy inheritance. No tenant may observe, influence, or derive state information belonging to another tenant, regardless of shared compute locality.

LLM-Specific Execution Deployment [0328-0338]

In LLM-based autonomous execution environments, the canonical enforcement chain governs operational output rather than reasoning pathways, inference weights, or internal token sequences. Deterministic governance ensures that identical governance inputs produce identical authorized outcomes, even when internal LLM processes remain probabilistic. This embodiment relies on Behavioral Vector Inputs [210] and Governance Directives [152]. Immutable Authority [180] anchors execution lineage for LLM outputs without requiring model introspection or access to internal weights.

Topology-Invariant Governance Guarantee

Across all deployment topologies, execution remains bound to the physically non-bypassable canonical enforcement chain [190]. No topology—including distributed, federated, ephemeral, or multi-tenant configurations—permits alternate authorization pathways, directive modification, divergent reconciliation, or independent commit authority. Governance remains deterministic, tokenized, non-delegable, and cryptographically provable.

Physical Invalidity Enforcement Mechanisms

The system enforces physical invalidity as a foundational guarantee that prevents execution, modification, directive propagation, or state influence unless governance requirements have been met in their exact prescribed order. As shown across FIG. 1-FIG. 5, no component-internal or external—may bypass, reorder, shortcut, patch, or infer authorization pathways. Execution is not permitted or denied; rather, it is structurally impossible without a valid Authorization Token [142] and a corresponding Protocol Session Record [122].

Physical invalidity is enforced first during ingress via Protocol Interposition Gateway (PIG) [120], which rejects malformed, unsigned, stale, replayed, or unauthorized submissions prior to normalization and qualification. Enforcement occurs independently from authentication, meaning authenticated actors remain non-executable without authorization lineage. This ensures that identity does not imply privilege or execution proximity.

Temporal Freshness Artifact [250] and cryptographic nonce [252] operate as synchronized expiration and replay controls. Together, these prevent repetition of previously authorized requests, out-of-order evaluation, and cross-context reuse of tokens. Once the artifact expires, the associated Authorization Token [142] becomes structurally invalid rather than denied, eliminating ambiguity over time-bound governance state.

The system employs immutable lineage enforcement through Authorization Token [142] and Governance Directive [152], ensuring that no execution pathway exists without traceable cryptographic lineage. Downstream execution targets [170] do not evaluate policy, interpret metadata, or infer governance—they merely verify lineage. Invalid lineage yields immediate execution impossibility.

Replay rejection is implemented via Temporal Freshness Artifact [250] and Hash Chain Structure [129], ensuring every execution attempt is unique and bound to session-scoped state rather than external reasoning or user-input repetition. Even mathematically identical behavioral submissions cannot re-trigger execution without fresh authorization. This prevents cloning, duplication, or propagation of previously valid directive chains.

The system prohibits synthetic or derivative authorization attempts by enforcing non-delegability and non-replication semantics. Governance authority cannot be forwarded, copied, pooled, wrapped, or embedded in secondary tokens, wrappers, or signed envelopes. Any such operation invalidates authorization lineage and produces enforced execution impossibility.

Tamper detection remains passive and upstream of all execution. The system does not attempt remediation, policy fallback, error negotiation, or best-effort continuation. Instead, intervention manifests as structural rejection enforced by canonical enforcement chain [190]. This eliminates variability in enforcement posture across deployment contexts, legal jurisdictions, infrastructure tiers, or operational environments.

Collectively, these mechanisms establish a governance substrate where execution is possible only when governed, traceable, unambiguous, fresh, and cryptographically anchored. In all other cases—including partial compliance, ambiguous lineage, expired authorization, manipulated signatures, or bypass attempts—the system produces structural impossibility rather than discretionary rejection.

Token Lifecycle and Revocation Logic

Authorization Token [142] functions as the canonical representation of an authorization decision rendered by Authorization Engine [140] (authorization stage) and is the sole mechanism by which execution eligibility is conveyed to downstream components, consistent with certain aspects of embodiments of the present invention and Definition 35 (Authorization Modes). Each Authorization Token [142] is bound to a specific Protocol Session Record [122] and Normalized Protocol State [132], and its lifecycle defines the precise temporal and structural interval during which governed execution may occur.

Each Authorization Token [142] encapsulates (a) a reference to Protocol Session Record [122], (b) a cryptographic binding to Normalized Protocol State [132], (c) a reference to Temporal Freshness Artifact [250] including nonce [252], and (d) linkage material compatible with Hash Chain Structure [129], consistent with certain aspects of embodiments of the present invention. The token does not contain executable logic or policy; it encodes only the outcome of boundary-condition evaluation performed by Authorization Engine [140] as shown in FIG. 3.

The lifecycle of an Authorization Token [142] proceeds through a finite set of states: issued, active, optionally renewable, and then either expired or revoked. Transitions between these states are deterministic and governed exclusively by (a) temporal constraints defined in Temporal Freshness Artifact [250], (b) reconciliation outcomes generated by Reconciliation Engine [160], and (c) commit status recorded in the Immutable Authority [180], consistent with certain aspects of embodiments of the present invention. No additional states, such as "indeterminate," "best-effort," or "partially authorized," are recognized.

Token issuance occurs only when Authorization Engine [140] generates a PASS [340], DEGRADE [330], or CON- DITIONAL [335] outcome for a given Normalized Protocol State [132]. Each issuance event produces a new, unique Authorization Token [142] and associates it with exactly one Protocol Session Record [122]. No component, including execution targets [170], orchestration systems, or external services, may self-issue, clone, or re-mint Authorization Tokens, consistent with certain aspects of embodiments of the present invention.

An Authorization Token [142] remains active only while its associated Temporal Freshness Artifact [250] remains valid and its nonce [252] has not been consumed in a finalized execution attempt. Upon expiration of the validity window [253], or once the nonce [252] is consumed in a reconciliation outcome recorded as an Irreversible State-Commit [162], the token becomes structurally invalid and cannot be reused, replayed, or resurrected, consistent with certain aspects of embodiments of the present invention. Structural invalidity applies irrespective of storage location, cache layer, or serialization format.

Revocation occurs when Reconciliation Engine [160], as shown in FIG. 5, determines that execution should not complete or must be unwound, and issues a REVOCATION [520] outcome. In such cases, the associated Authorization Token [142] is permanently marked as revoked through a corresponding entry in Immutable Authority [180] via Irreversible State-Commit [162], consistent with certain aspects of embodiments of the present invention. A revoked token cannot transition back to any active or renewable state.

Renewal, where permitted, does not extend the life of an existing Authorization Token [142]; instead, it requires a new authorization decision over a current Normalized Protocol State [132] and the issuance of a new token with a fresh Temporal Freshness Artifact [250] and nonce [252], consistent with certain aspects of embodiments of the present invention. Cached, serialized, or checkpoint-restored copies of prior tokens SHALL NOT be interpreted as renewed authorization, even if underlying behavioral inputs appear unchanged.

The combined effect of issuance, activation, expiration, renewal, and revocation rules ensures that Authorization Tokens [142] are strictly session-bounded, time-bounded, and lineage-bounded. No token may outlive its recorded governance state in Immutable Authority [180], and no execution may rely on an Authorization Token whose lifecycle has reached expiration or revocation. Accordingly, any execution attempt that depends on stale, replayed, cloned, or otherwise lifecycle-violating tokens is structurally incapable of satisfying the requirements of certain aspects of embodiments of the present invention.

Exclusionary Operational Boundaries

The following exclusionary conditions apply uniformly across previously described embodiments, including distributed compute, federated trust, serverless infrastructure, multi-agent coordination, LLM governance, and multi-tenant isolation. No deployment topology, infrastructure variation, or operational context permits circumvention of these constraints.

The system expressly prohibits execution pathways that attempt to replicate, approximate, infer, bypass, substitute, or reorder any component or operation of canonical enforcement chain [190]. Any execution attempt that does not originate from a valid Protocol Session Record [122] and does not contain a cryptographically verifiable Authorization Token [142] SHALL be considered structurally invalid, consistent with Definition 3 (Physically Invalid).

No direct invocation, indirect invocation, API relay, library wrapper, proxy service, orchestration layer, automated agent, or synthetic request may execute without governance lineage. The system does not permit local policy overrides, conditional exceptions, fallback logic, platform trust elevation, or administrative privilege substitution. Execution authority remains non-delegable and cannot be transferred, cloned, extended, time-shifted, or inherited, consistent with certain aspects of embodiments of the present invention.

Parallel execution, speculative execution, predictive execution, background execution, or pre-authorization computation SHALL NOT establish or imply execution eligibility. Execution targets [170] perform no inference or policy interpretation and SHALL NOT generate, modify, or reinterpret Governance Directives [152]. Any attempt to execute prior to, parallel to, or outside the canonical enforcement sequence results in structural impossibility.

The system prohibits equivalency substitution. No alternative cryptographic artifact, session identifier, signature format, behavioral attribute, token envelope, or protocol message SHALL substitute for Authorization Token [142] or Governance Directive [152]. Mechanisms including signed configurations, certificates, trusted service identities, or pre-approved roles SHALL NOT be interpreted as execution authorization, consistent with certain aspects of embodiments of the present invention.

No intermediate system, tenant, federated peer, external service, LLM agent, orchestration controller, or workload scheduler may alter governance state, directive meaning, directive priority, or execution routing. Attempts to reorder directives, replay prior directives, apply modified directive content, or generate internally synthesized directives result in non-execution by design and permanent invalidation of lineage.

The enforcement model permits no negotiation, fallback, inference pathway, or context-based reasoning. Authorization cannot be assumed, derived, implied, or inferred through confidence scoring, statistical thresholds, historical precedent, machine-learning output, or agent-to-agent reputation. The system enforces deterministic governance exclusively through canonical mechanism compliance, consistent with certain aspects of embodiments of the present invention.

Collectively, these exclusionary conditions ensure that execution occurs only when fully aligned with canonical enforcement chain [190]. Any attempt to circumvent, emulate, or approximate system operation outside the prescribed authorization sequence is not a degraded version of the system—it is no system at all under the meaning of the claims. These constraints are further reinforced through physical invalidity extensions previously described, above.

BQS Unity Framework Bridge

The canonical enforcement architecture described herein implements the Behavioral Qualification System (BQS) Unity Framework disclosed in provisional applications 63/792,381 and 63/818,574. The BQS Unity Framework provides the foundational structure for deterministic, pre-execution assessment, authorization, routing, and verification of computational actors. The present disclosure generalizes the BQS Unity Framework into a protocol-layer governance substrate operating at OSI Layer 5, enabling applicability across heterogeneous execution environments and distributed computational systems.

The BQS architecture disclosed in the provisional filings defined four core components: a behavioral qualification mechanism, pre-execution gating logic, execution routing, and post-execution verification with immutable recording. These components correspond directly to canonical enforcement chain [190] of the present disclosure: Qualification State Engine [130], Authorization Engine [140], Routing Engine [150], Reconciliation Engine [160], and Immutable Authority [180], as shown in FIGS. 1-6.

Qualification State Engine [130] implements the behavioral qualification evaluation described in the provisional filings. Behavioral Qualification Vectors include historical interaction patterns, trust metadata, actor performance indicators, and contextual properties. These vectors determine whether an actor is sufficiently qualified to initiate or continue execution, consistent with certain aspects of embodiments of the present invention.

Authorization Engine [140] enforces the BQS gating decision originally specified in the provisionals as a pass/fail threshold mechanism. The present disclosure formalizes this mechanism into deterministic authorization modes (PASS [340], DEGRADE [330], FAIL [320]) and binds the final outcome to an Authorization Token [142], which serves as the sole execution-enabling artifact for downstream components.

Routing Engine [150] operationalizes the BQS execution routing concept disclosed in the provisionals by converting authorization outcomes into Governance Directives [152]. These directives determine where and how execution propagates across single-target, multi-target, or distributed execution substrates, consistent with certain aspects of embodiments of the present invention.

Reconciliation Engine [160] corresponds to the BQS post-execution validation described in the provisionals. It evaluates execution results against the originally qualified state and generates one of three finalization outcomes: FULL COMMIT [540], PARTIAL COMMIT [530], or REVOCATION [520]. This ensures execution alignment with the BQS Unity Framework's closed-loop verification model.

Immutable Authority [180] implements the ledger component referenced in the provisionals. Execution results, reconciliation outcomes, and revocation events are recorded as irreversible state commits [162], ensuring traceability, auditability, and long-term enforcement integrity consistent with certain aspects of embodiments of the present invention.

Authorization Token [142] represents the formalized embodiment of the BQS pre-execution credential concept. Unlike transient in-memory gating logic, the Authorization Token forms a cryptographically verifiable execution boundary and lifecycle constraint.

The present disclosure generalizes the BQS Unity Framework beyond initial digital advertising embodiments. While the provisionals demonstrated BQS applied within sponsorship qualification and advertising execution workflows, the underlying mechanisms of qualification, gating, routing, verification, and immutable recording inherently support governance across autonomous agents, LLM ecosystems, distributed computing workloads, device orchestration, transactional systems, and AI-to-AI negotiation.

Accordingly, the BQS Unity Framework shall be understood not as an application-layer heuristic, but as a governance substrate whose behaviors remain invariant across contexts. Specific industries—including advertising, payments, identity management, autonomous robotics, and distributed cloud coordination—represent implementations of the unified model rather than separate inventions.

Canonical enforcement chain [190] therefore represents the domain-agnostic operational implementation of the BQS Unity Framework disclosed in the provisionals. Each component, function, dependency, and execution rule derives directly from the behavioral qualification principles originally described.

In embodiments in which the canonical enforcement chain governs digital advertising systems, Behavioral Qualification Vectors may incorporate audience eligibility data, engagement history, fraud detection signals, or campaign-specific scoring. In embodiments governing autonomous agents, such vectors may incorporate identity proofs, model lineage, safety compliance attributes, or capability thresholds.

Similarly, Authorization Token [142] may embody sponsorship approval credentials in advertising contexts or operational clearance credentials in agent-based computational systems. Both forms are structurally equivalent expressions of the same BQS authorization primitive.

Routing Engine [150] may direct execution to media delivery endpoints in advertising embodiments or to computational workloads, autonomy runtime nodes, or distributed inference clusters in agent-oriented governance environments. The routing logic remains consistent across use cases.

The unification of these mechanisms confirms that the present disclosure constitutes the full architectural realization and domain-independent embodiment of the BQS Unity Framework originally disclosed in the April and June provisional filings. The present implementation therefore maintains priority to those filings under 35 U.S.C. § 119(e) and represents a fully supported evolution of the same inventive concept.

BQS Unity Framework Bridge Section

The canonical enforcement chain disclosed herein is an implementation of the BQS Unity Framework originally described in U.S. Provisional Patent Applications 63/792,381 (filed Apr. 22, 2025) and 63/818,574 (filed Jun. 5, 2025), to which priority is claimed pursuant to 35 U.S.C. § 119(e). The BQS Unity Framework establishes a deterministic protocol-layer governance model in which behavioral qualification, authorization, routing, and reconciliation operate as sequential, non-bypassable enforcement stages rather than policy-driven application-layer logic or identity-based entitlement systems.

In the provisional disclosures, BQS served as a unified behavioral decision substrate governing execution eligibility within digital interaction environments, autonomous commerce systems, and synthetic execution ecosystems. The present disclosure formalizes that same construct at the session layer (OSI Layer 5) as a computational governance substrate that binds execution authority to normalized behavioral qualification rather than to identity credentials, local configuration state, heuristic trust inference, or policy evaluation frameworks.

The BQS Unity Framework components map directly to canonical enforcement chain [190] as follows: Qualification State Engine [130] evaluates behavioral qualification vectors; Authorization Engine [140] generates cryptographically verifiable Authorization Tokens [142]; Routing Engine [150] propagates non-modifiable Governance Directives [152]; Reconciliation Engine [160] verifies execution outcomes and determines finalization mode; and Immutable Authority [180] records irreversible execution lineage, as illustrated in FIGS. 1-6.

The provisional applications disclosed this architecture explicitly. For example, U.S. Provisional Application 63/792,381 states: "The invention implements a revolutionary BQS Unity Framework that transforms multiple independent system variables into a single unified BQS metric that ORCHESTRATES ALL PLATFORM DECISIONS, enabling pre-spend qualification and enforcement mechanisms . . . " [¶20]. This demonstrates that the original conception contemplated orchestration and execution governance—not merely application-specific scoring or preference ranking.

The behavioral qualification vectors referenced in the provisional filings correspond to Qualification Inputs [210] described herein and may include trust signals, operational telemetry, performance stability measures, execution efficiency patterns, or autonomous agent capability indicators. For example, the provisional filings disclosed qualification based on "bid response accuracy, interaction quality scores, engagement consistency metrics, and behavioral trust indicators" [63/792,381 ¶45], demonstrating that authorization was based on behavioral qualification rather than identity. These vectors are normalized into a deterministic protocol state that forms the basis for issuance, rejection, degradation, or renewal of execution authority.

Whereas provisional filings applied the BQS Unity Framework primarily in transactional digital ecosystems, the present invention generalizes the framework as a domain-independent protocol primitive applicable across any distributed computational environment requiring autonomous execution governance, including but not limited to AI model coordination, distributed compute infrastructures, sovereign autonomous agent systems, synthetic execution networks, and federated or multi-tenant system architectures.

Unlike identity-based access control, inference-based trust scoring, or adaptive policy engines, the BQS Unity Framework enforces structural coupling between behavioral qualification, authorization token issuance, directive propagation, and irreversible reconciliation. Execution authority cannot be assumed, inherited, inferred, bypassed, or delegated and exists only when derived through canonical stage progression under the enforcement constraints of Protocol Enforcement Domain [100].

The Protocol Enforcement Domain ensures that the BQS Unity Framework is not advisory, probabilistic, or application-context dependent; rather, it operates as a protocol-layer requirement for execution itself. Attempted invocation without established lineage, without proper predecessor states, or outside canonical ordering is rendered physically invalid by design.

Accordingly, the invention disclosed herein is not a conceptual divergence from the provisional filings but the protocol-layer maturation, structural formalization, and implementation of the same inventive principle: deterministic behavioral qualification governing execution authority across heterogeneous autonomous computational systems.

The provisional filings contain more than 820 occurrences of governance-aligned terminology, including terms such as "authorization," "enforcement," "immutable record," "routing," "protocol," "canonical," "middleware," "qualification, " and "reconciliation." This extensive terminology demonstrates that governance—not application-specific scoring—was the core inventive concept, with the present application providing formalized implementation details, canonical sequencing, execution enforcement mechanisms, and OSI Layer 5 positioning.

Other terms used herein should be given their plain and ordinary meaning as understood by a person of ordinary skill in the art at the time of the invention, unless explicitly defined otherwise. In the event of conflict with external definitions, the definitions provided herein shall control for purposes of claim interpretation, prosecution, and enforcement. The definitions provided herein are intended to clarify usage within this specification and should not be construed as limiting the scope of the claims unless explicitly recited therein.

"Module"—In an aspect of an embodiment of the present invention, the term represents a self-contained hardware or software computational unit containing processors, memory, and executable code operable to perform the functions described. Sub-blocks represent elements or sub-modules executing defined functions under the control of the parent module. In an aspect of an embodiment of the present invention, each system block labeled as Engine, Module, Controller, Gateway, Proxy, Service, or Manager in the accompanying Figures constitutes a 'module' as that term is defined herein.

In an aspect of an embodiment of the present invention, the term "module" may represent self-contained computer hardware. In another aspect of an embodiment of the present invention, the term "module" may represent computer hardware on a designated computer chip or separate computer chips. In yet another aspect of an embodiment of the present invention, the processor may be configured to perform tasks not undertaken by the module(s) disclosed herein. In a further aspect of an embodiment of the present invention, the modules may be hardware resident on one chip, component, separate components, a remote server, database, some or each of which (or all of which, in one aspect of an embodiment of the present invention) may be separate and distinct from the device, or any combination thereof. In one aspect of an embodiment of the present invention, the processor may be configured to coordinate, implement and/or assign tasks to, from and/or among the module(s). In a further aspect of an embodiment of the present invention, module components may also, in an operational context, be components of other modules.

In a further aspect of an embodiment of the present invention, steps, processes, operations or methods undertaken by the modules, systems and/or system components, as discussed above, may be implemented by execution, on one or more servers or processors configured to perform a predefined set of basic operations in response to receiving a corresponding basic instruction selected from a predefined native instruction set of codes. This native instruction set of codes or machine language instruction codes may be built into servers/processors of system components. As such, different operations contemplated by the disclosure above, may be made possible by the selection of machine codes from specific machine language instruction codes. Additional complex operations may be made possible by the combination of different sets of machine language instruction codes.

Further aspects of embodiments of the present invention contemplate the use of non-transitory computer programmable product and computer-implemented methods for the implementation of the different processes outlined in this application, claims, and drawings. The same may be found installed on any or all of the components discussed in this application including, without limitation, the mobile device(s), registries, etc.

Yet further aspects of embodiments of the present invention contemplate execution of computer code resident on devices, system of devices, and communication media such as wide area networks, the internet etc. enabling the contemplated transactions.

Other terms used herein should be given their plain and ordinary meaning as understood by a person of ordinary skill in the art at the time of the invention, unless explicitly defined otherwise. Where industry-standard definitions exist (e.g., IAB specifications, W3C standards), such definitions may be consulted for context. In the event of conflict with external definitions, the definitions provided herein shall control for purposes of claim interpretation, prosecution, and enforcement. The definitions provided herein are intended to clarify usage within this specification and should not be construed as limiting the scope of the claims unless explicitly recited therein.

All defined terms may be implemented in hardware, software, firmware, or any combination thereof, and may be distributed across multiple physical or logical components without departing from the scope of the invention.

What is claimed is:

1. A protocol-layer governance system for governing interactions among distributed computational actors, said system comprising a non-addressable Protocol Enforcement Domain (PED) configured to enforce non-bypassable execution sequencing for communications originating from non-protocol entities (NPEs), comprising:

(a) an exclusive ingress component configured to receive ingress communications and generate a protocol session record for each ingress communication;

(b) a qualification stage within said PED configured to derive a normalized protocol state from qualification vectors and cryptographically bind said normalized protocol state to said protocol session record;

(c) an authorization stage within said PED configured to evaluate said normalized protocol state against boundary conditions and, responsive to satisfaction of said boundary conditions, generate an authorization token cryptographically bound to said protocol session record and said normalized protocol state;

(d) a routing stage within said PED configured to issue a governance directive solely from said authorization token; and (e) a reconciliation stage within said PED configured to verify execution of said governance directive and anchor a finalization outcome to an immutable authority, wherein progression through (a)-(e) is mandatory and non-reorderable.

2. A protocol-layer governance system comprising a Protocol Enforcement Domain (PED) enforcing non-bypassable execution sequencing for communications from Non-Protocol Entities (NPEs), said system comprising:

(a) a protocol interposition gateway comprising hardware serving as an exclusive ingress point and generating a protocol session record for each communication;

(b) a qualification engine executing within an isolated execution context having no externally addressable interfaces, said qualification engine configured to derive a normalized protocol state from qualification vectors and cryptographically bind said normalized protocol state to said protocol session record;

(c) an authorization engine executing within an isolated execution context having no externally addressable interfaces, said authorization engine configured to evaluate said normalized protocol state against eligibility constraints and, responsive to satisfaction of said eligibility constraints, generate an authorization token cryptographically bound to said protocol session record and said normalized protocol state;

(d) a routing engine executing within an isolated execution context having no externally addressable interfaces, said routing engine configured to issue a governance directive solely from said authorization token; and (e) a reconciliation engine executing within an isolated execution context having no externally addressable interfaces, said reconciliation engine configured to verify directive execution and anchor a finalization outcome to an immutable authority, wherein each of said qualification engine, authorization engine, routing engine, and reconciliation engine accepts input exclusively from an immediate predecessor engine via a cryptographically bound internal interface, such that invocation of any engine outside a prescribed execution sequence is computationally invalid.

3. The system of claim 1, wherein said PED is implemented using at least one of: a hardware-backed trusted execution environment, a cryptographically isolated execution context, a virtualization boundary, a containerized execution environment, a service mesh boundary.

4. The system of claim 1, wherein entities external to said PED are prevented from directly invoking at least one of: said qualification stage, said authorization stage, said routing stage, said reconciliation stage, an immutable authority interface, except through said exclusive ingress pathway.

5. The system of claim 1, wherein said qualification vectors comprise at least one of: AI model performance vectors, autonomous agent behavioral vectors, computational efficiency vectors, trust qualification vectors, provenance integrity vectors, anomaly detection vectors.

6. The system of claim 1, wherein said qualification stage deterministically derives said normalized protocol state such that said normalized protocol state is invariant with respect to at least one of: execution timing, infrastructure topology, geographic deployment location, computational actor substitution, execution environment reconfiguration.

7. The system of claim 1, wherein cryptographically binding said normalized protocol state comprises using at least one of: a digital signature using a PED-resident key, a keyed-hash message authentication code, a hash chain, a Merkle commitment, a zero-knowledge proof.

8. The system of claim 1, wherein said authorization token encodes at least one of: an execution scope restriction, an execution target boundary, a delegation restriction, a temporal validity interval, a cryptographic proof linking to said normalized protocol state.

9. The system of claim 1, wherein said authorization stage operates in at least one of: a pass mode issuing full authorization, a fail mode denying authorization, a degraded mode issuing restricted authorization, a conditional mode requiring periodic re-qualification.

10. The system of claim 1, wherein said routing stage rejects at least one of: modification of directive content, superseding of directive authority, injection of an alternative directive, bypass through an out-of-band pathway, replay outside a temporal validity interval.

11. The system of claim 1, wherein said normalized protocol state is cryptographically bound to a temporal freshness artifact comprising at least one of: an issuance timestamp, an expiration timestamp, a temporal validity window, a sequence number, a nonce.

12. The system of claim 1, wherein said reconciliation stage verifies execution using at least one of: cryptographic attestation, behavioral telemetry verification, output validation, temporal compliance verification, resource consumption verification, multi-party verification.

13. The system of claim 1, wherein anchoring to said immutable authority comprises recording to at least one of: a cryptographic hash tree, a Merkleized append-only structure, a distributed ledger, a write-once storage system, a tamper-evident audit log, thereby enforcing append-only tamper-evident finalization semantics.

14. The system of claim 1, wherein said reconciliation stage, responsive to verification failure, initiates at least one of: invalidating said authorization token, issuing a revocation directive, triggering re-qualification, generating immutable audit records, notifying an external monitoring system.

15. The system of claim 2, wherein said qualification vectors comprise at least one of: AI model performance vectors, autonomous agent behavioral vectors, computational efficiency vectors, trust qualification vectors, provenance integrity vectors, anomaly detection vectors.

16. The system of claim 2, wherein said normalized protocol state is cryptographically bound to a temporal freshness artifact comprising at least one of: an issuance timestamp, an expiration timestamp, a temporal validity window, a sequence number, a nonce.

17. The system of claim 2, wherein anchoring to said immutable authority comprises recording to at least one of: a cryptographic hash tree, a Merkleized append-only structure, a distributed ledger, a write-once storage system, a tamper-evident audit log.

18. A computer-implemented method for governing interactions among distributed computational actors, comprising, executing, on at least one processor configured to perform a predefined set of basic operations in response to receiving a corresponding basic computer executable instruction selected from a predefined native instruction set of codes, steps of:

(a) receiving an ingress communication through an exclusive ingress pathway and generating a protocol session record;

(b) deriving, within a Protocol Enforcement Domain (PED), a normalized protocol state from qualification vectors and cryptographically binding said normalized protocol state to said protocol session record;

(c) evaluating, within said PED, said normalized protocol state against boundary conditions and, responsive to satisfaction of said boundary conditions, generating an authorization token cryptographically bound to said protocol session record and said normalized protocol state;

(d) issuing, within said PED, a governance directive solely from said authorization token; and (e) verifying, within said PED, execution of said governance directive and anchoring a finalization outcome to an immutable authority, wherein steps (a)-(e) execute in mandatory, non-reorderable sequence.

19. A computer-implemented method for enforcing non-bypassable execution sequencing for communications from Non-Protocol Entities (NPEs), comprising, executing, on at least one processor configured to perform a predefined set of basic operations in response to receiving a corresponding basic computer executable instruction selected from a predefined native instruction set of codes, steps of:

(a) receiving communications exclusively through a protocol interposition gateway and generating a protocol session record for each communication;

(b) deriving, within a Protocol Enforcement Domain (PED), a normalized protocol state from qualification vectors and cryptographically binding said normalized protocol state to said protocol session record;

(c) evaluating, within said PED, said normalized protocol state against eligibility constraints and, responsive to satisfaction of said eligibility constraints, generating an authorization token cryptographically bound to said protocol session record and said normalized protocol state;

(d) issuing, within said PED, a governance directive solely from said authorization token; and (e) verifying, within said PED, directive execution and anchoring a finalization outcome to an immutable authority, wherein each step accepts inputs exclusively from its immediate predecessor.

20. The computer-implemented method of claim 18, wherein said PED is implemented using at least one of: a hardware-backed trusted execution environment, a cryptographically isolated execution context, a virtualization boundary, a containerized execution environment, a service mesh boundary.

21. The computer-implemented method of claim 18, further comprising preventing direct invocation by entities external to said PED of at least one of: deriving said normalized protocol state, generating said authorization token, issuing said governance directive, verifying execution, anchoring to said immutable authority, except through said exclusive ingress pathway.

22. The computer-implemented method of claim 18, wherein said qualification vectors comprise at least one of: AI model performance vectors, autonomous agent behavioral vectors, computational efficiency vectors, trust qualification vectors, provenance integrity vectors, anomaly detection vectors.

23. The computer-implemented method of claim 18, wherein said step of deriving normalized protocol state is deterministic such that identical qualification vectors produce identical normalized protocol states regardless of at least one of: execution timing, infrastructure topology, geographic deployment location, computational actor substitution, execution environment reconfiguration.

24. The computer-implemented method of claim 18, wherein said step of cryptographically binding normalized protocol state comprises at least one of: applying a digital signature using a PED-resident key, applying a keyed-hash message authentication code, constructing a hash chain, constructing a Merkle commitment, generating a zero-knowledge proof.

25. The computer-implemented method of claim 18, wherein said authorization token encodes at least one of: an execution scope restriction, an execution target boundary, a delegation restriction, a temporal validity interval, a cryptographic proof linking to said normalized protocol state.

26. The computer-implemented method of claim 18, wherein said step of evaluating normalized protocol state results in at least one of: a pass outcome issuing full authorization, a fail outcome denying authorization, a degraded outcome issuing restricted authorization, a conditional outcome requiring periodic re-qualification.

27. The computer-implemented method of claim 18, further comprising rejecting at least one of: modification of directive content, superseding of directive authority, injection of an alternative directive, bypass through an out-of-band pathway, replay outside a temporal validity interval.

28. The computer-implemented method of claim 18, further comprising cryptographically binding said normalized protocol state to a temporal freshness artifact comprising at least one of: an issuance timestamp, an expiration timestamp, a temporal validity window, a sequence number, a nonce.

29. The computer-implemented method of claim 18, wherein said step of verifying execution comprises at least one of: cryptographic attestation, behavioral telemetry verification, output validation, temporal compliance verification, resource consumption verification, multi-party verification.

30. The computer-implemented method of claim 18, wherein said step of anchoring finalization outcome comprises recording to at least one of: a cryptographic hash tree, a Merkleized append-only structure, a distributed ledger, a write-once storage system, a tamper-evident audit log.

31. The computer-implemented method of claim 18, further comprising, responsive to verification failure, initiating at least one of: invalidating said authorization token, issuing a revocation directive, triggering re-qualification, generating immutable audit records, notifying an external monitoring system.

32. The computer-implemented method of claim 19, wherein said qualification vectors comprise at least one of: AI model performance vectors, autonomous agent behavioral vectors, computational efficiency vectors, trust qualification vectors, provenance integrity vectors, anomaly detection vectors.

33. The computer-implemented method of claim 19, further comprising cryptographically binding said normalized protocol state to a temporal freshness artifact comprising at least one of: an issuance timestamp, an expiration timestamp, a temporal validity window, a sequence number, a nonce.

34. The computer-implemented method of claim 19, wherein said step of anchoring finalization outcome comprises recording to at least one of: a cryptographic hash tree, a Merkleized append-only structure, a distributed ledger, a write-once storage system, a tamper-evident audit log.

35. A computer program product comprising a non-transitory computer readable medium having computer executable instructions stored therein to cause performance of operations for governing interactions among distributed computational actors comprising executing, on at least one processor configured to perform a predefined set of basic operations in response to receiving a corresponding basic computer executable instruction selected from a predefined native instruction set of codes, computer readable program code for operational implementation of:

(a) receiving an ingress communication through an exclusive ingress pathway and generating a protocol session record;

(b) deriving, within a Protocol Enforcement Domain (PED), a normalized protocol state from qualification vectors and cryptographically binding said normalized protocol state to said protocol session record;

(c) evaluating, within said PED, said normalized protocol state against boundary conditions and, responsive to satisfaction of said boundary conditions, generating an authorization token cryptographically bound to said protocol session record and said normalized protocol state;

(d) issuing, within said PED, a governance directive solely from said authorization token; and (e) verifying, within said PED, execution of said governance directive and anchoring a finalization outcome to an immutable authority, wherein steps (a)-(e) execute in mandatory, non-reorderable sequence.

36. A computer program product comprising a non-transitory computer readable medium having computer executable instructions stored therein to cause performance of operations for enforcing non-bypassable execution sequencing for communications from Non-Protocol Entities (NPEs), comprising executing, on at least one processor configured to perform a predefined set of basic operations in response to receiving a corresponding basic computer executable instruction selected from a predefined native instruction set of codes, computer readable program code for operational implementation of:

(a) receiving communications exclusively through a protocol interposition gateway and generating a protocol session record for each communication;

(b) deriving, within a Protocol Enforcement Domain (PED), a normalized protocol state from qualification vectors and cryptographically binding said normalized protocol state to said protocol session record;

(c) evaluating, within said PED, said normalized protocol state against eligibility constraints and, responsive to satisfaction of said eligibility constraints, generating an authorization token cryptographically bound to said protocol session record and said normalized protocol state;

(d) issuing, within said PED, a governance directive solely from said authorization token; and (e) verifying, within said PED, directive execution and anchoring a finalization outcome to an immutable authority, wherein each step accepts inputs exclusively from its immediate predecessor.

37. The non-transitory computer-readable medium of claim 35, wherein said PED is implemented using at least one of: a hardware-backed trusted execution environment, a cryptographically isolated execution context, a virtualization boundary, a containerized execution environment, a service mesh boundary.

38. The non-transitory computer-readable medium of claim 35, further comprising computer readable program code for preventing direct invocation by entities external to said PED, said direct invocation prevention comprising at least one of: deriving said normalized protocol state, generating said authorization token, issuing said governance directive, verifying execution, anchoring to said immutable authority, except through said exclusive ingress pathway.

39. The non-transitory computer-readable medium of claim 35, wherein said qualification vectors comprise at least one of: AI model performance vectors, autonomous agent behavioral vectors, computational efficiency vectors, trust qualification vectors, provenance integrity vectors, anomaly detection vectors.

40. The non-transitory computer-readable medium of claim 35, wherein deriving said normalized protocol state is deterministic such that identical qualification vectors produce identical normalized protocol states regardless of at least one of: execution timing, infrastructure topology, geographic deployment location, computational actor substitution, execution environment reconfiguration.

41. The non-transitory computer-readable medium of claim 35, wherein said computer readable code for cryptographically binding said normalized protocol state comprises computer readable code for at least one of: applying a digital signature using a PED-resident key, applying a keyed-hash message authentication code, constructing a hash chain, constructing a Merkle commitment, generating a zero-knowledge proof.

42. The non-transitory computer-readable medium of claim 35, wherein said authorization token encodes at least one of: an execution scope restriction, an execution target boundary, a delegation restriction, a temporal validity interval, a cryptographic proof linking to said normalized protocol state.

43. The non-transitory computer-readable medium of claim 35, wherein evaluating said normalized protocol state results in at least one of: a pass outcome issuing full authorization, a fail outcome denying authorization, a degraded outcome issuing restricted authorization, a conditional outcome requiring periodic re-qualification.

44. The non-transitory computer-readable medium of claim 35, further comprising computer readable code for rejecting at least one of: modification of directive content, superseding of directive authority, injection of an alternative directive, bypass through an out-of-band pathway, replay outside a temporal validity interval.

45. The non-transitory computer-readable medium of claim 35, further comprising computer readable code for cryptographically binding said normalized protocol state to a temporal freshness artifact comprising at least one of: an issuance timestamp, an expiration timestamp, a temporal validity window, a sequence number, a nonce.

46. The non-transitory computer-readable medium of claim 35, wherein computer readable code for verifying execution comprises computer readable code for at least one of: cryptographic attestation, behavioral telemetry verification, output validation, temporal compliance verification, resource consumption verification, multi-party verification.

47. The non-transitory computer-readable medium of claim 35, wherein computer readable code for anchoring said finalization outcome comprises computer readable code for recording to at least one of: a cryptographic hash tree, a Merkleized append-only structure, a distributed ledger, a write-once storage system, a tamper-evident audit log.

48. The non-transitory computer-readable medium of claim 35, wherein responsive to verification failure, further comprising computer readable code for initiating at least one of: invalidating said authorization token, issuing a revocation directive, triggering re-qualification, generating immutable audit records, notifying an external monitoring system.

49. The non-transitory computer-readable medium of claim 36, wherein said qualification vectors comprise at least one of: AI model performance vectors, autonomous agent behavioral vectors, computational efficiency vectors, trust qualification vectors, provenance integrity vectors, anomaly detection vectors.

50. The non-transitory computer-readable medium of claim 36, further comprising computer readable code for cryptographically binding said normalized protocol state to a temporal freshness artifact comprising at least one of: an issuance timestamp, an expiration timestamp, a temporal validity window, a sequence number, a nonce.

51. The non-transitory computer-readable medium of claim 36, wherein computer readable code for anchoring said finalization outcome further comprises computer readable code for recording to at least one of: a cryptographic hash tree, a Merkleized append-only structure, a distributed ledger, a write-once storage system, a tamper-evident audit log.

* * * * *